United States Patent
Sakoh et al.

(10) Patent No.: US 11,001,670 B2
(45) Date of Patent: May 11, 2021

(54) FLUOROPOLYETHER-GROUP-CONTAINING POLYMER, SURFACE TREATMENT AGENT, AND ARTICLE

(71) Applicant: SHIN-ETSU CHEMICAL CO., LTD., Tokyo (JP)

(72) Inventors: Ryusuke Sakoh, Annaka (JP); Takashi Matsuda, Annaka (JP); Yuji Yamane, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 217 days.

(21) Appl. No.: 16/303,439

(22) PCT Filed: May 10, 2017

(86) PCT No.: PCT/JP2017/017636
§ 371 (c)(1),
(2) Date: Nov. 20, 2018

(87) PCT Pub. No.: WO2017/212850
PCT Pub. Date: Dec. 14, 2017

(65) Prior Publication Data
US 2020/0317864 A1 Oct. 8, 2020

(30) Foreign Application Priority Data
Jun. 10, 2016 (JP) .............................. JP2016-116377
Oct. 18, 2016 (JP) .............................. JP2016-204169

(51) Int. Cl.
C08L 71/00 (2006.01)
C08G 65/323 (2006.01)
C09D 171/00 (2006.01)

(52) U.S. Cl.
CPC ......... *C08G 65/323* (2013.01); *C09D 171/00* (2013.01)

(58) Field of Classification Search
None
See application file for complete search history.

(56) References Cited

U.S. PATENT DOCUMENTS

| 2009/0208728 A1 | 8/2009 | Itami et al. |
| 2009/0216035 A1 | 8/2009 | Itami et al. |
| 2012/0077041 A1 | 3/2012 | Yamane et al. |
| 2013/0136928 A1 | 5/2013 | Yamane et al. |
| 2013/0303689 A1 | 11/2013 | Sato et al. |
| 2015/0274889 A1 | 10/2015 | Sakoh et al. |
| 2016/0137878 A1 | 5/2016 | Yamane et al. |

FOREIGN PATENT DOCUMENTS

| JP | 07000793 A | * | 1/1995 | ............. B01F 17/54 |
| JP | 2008-534696 A | | 8/2008 | |
| JP | 2008-537557 A | | 9/2008 | |
| JP | 2012-072272 A | | 4/2012 | |
| JP | 2012-157856 A | | 8/2012 | |
| JP | 2012-197395 A | | 10/2012 | |
| JP | 2013-136833 A | | 7/2013 | |
| JP | 2014-070164 A | | 4/2014 | |
| JP | 2015-199906 A | | 11/2015 | |
| JP | 2015-199910 A | | 11/2015 | |
| JP | 2016-094567 A | | 5/2016 | |

OTHER PUBLICATIONS

Machine translation of JP-07000793, 9 pages, translation generated Jul. 2020. (Year: 2020).*
International Search Report (PCT/ISA/210) issued in PCT/JP2017/017636, dated Aug. 8, 2017.
Written Opinion (PCT/ISA/237) issued in PCT/JP2017/017636, dated Aug. 8, 2017.

* cited by examiner

*Primary Examiner* — Robert S Loewe
(74) *Attorney, Agent, or Firm* — Birch, Stewart, Kolasch & Birch, LLP

(57) ABSTRACT

A surface treatment agent which comprises a fluoropolyether-group-containing polymer represented by the following formula (1) or (2)

$$Rf^1-[N(V)_\beta(E)_\gamma]_\alpha \quad (1)$$

$$Rf^1-[Q-(G)_\delta-(E')_\epsilon-B]_\alpha \quad (2)$$

and/or a product of partial (hydrolytic) condensation of the polymer. The surface treatment agent forms a cured coating film excellent in terms of water and oil repellency and resistance to abrasion with erasers.

(In formulae (1) and (2), $Rf^1$ is a mono- or divalent polymer residue containing a fluorooxyalkylene group; N is C, Si, N, or a tri- to octavalent group optionally substituted by F; V is a monovalent group containing a hydroxy group or hydrolyzable group at the terminal; E is a monovalent group containing an oxyalkylene group; $\alpha$ is 1 or 2; $\beta$ and $\gamma$ are each 1-6, and $\beta+\gamma$ is 2-7; Q is a single bond or a divalent group; G is a divalent group containing a hydroxy group or hydrolyzable group; E' is a divalent group containing an oxyalkylene group; B is H, an alkyl group, or a halogeno; $\delta$ is 0-10; and $\epsilon$ is 1-10.)

12 Claims, No Drawings

FLUOROPOLYETHER-GROUP-CONTAINING POLYMER, SURFACE TREATMENT AGENT, AND ARTICLE

TECHNICAL FIELD

This invention relates to a fluoropolyether group-containing polymer (or compound having a mono- or divalent fluorooxyalkylene group-containing polymer residue in the molecule), and more particularly, to a fluoropolyether group-containing polymer capable of forming a coating having improved water/oil repellency and abrasion resistance, a surface treating agent comprising the polymer and/or a partial (hydrolytic) condensate thereof, and an article having a surface treated with the surface treating agent.

BACKGROUND ART

Recently, there is an accelerating demand to mount touch panels as the screen on mobile phones and other displays. While the touch panel has a screen kept bare, there are many chances of the finger or cheek coming in direct contact with the screen. Undesirably the touch panel is readily fouled with stains like sebum. There is an annually increasing need for technology to attain fingerprint proofness or easy stain removal on a display surface for better appearance or visibility. It is thus desired to have a material capable of meeting these requirements. In particular, for touch panel displays which are readily stained with fingerprints, it is desirable to form a water/oil repellent layer on their surface. Prior art water/oil repellent layers have high water/oil repellency and easy stain wipe-off, but suffer from the problem that the antifouling performance deteriorates during service.

Generally, fluoropolyether group-containing compounds exhibit, by virtue of their extremely low surface free energy, water/oil repellency, chemical resistance, lubricity, parting, antifouling and other properties. Taking advantage of these properties, they find use in a variety of industrial fields as water/oil repellent antifouling agents for paper and textiles, lubricants for magnetic recording media, oil-repellent agents for precision instruments, parting agents, cosmetic ingredients, protective films and the like. Inversely, the same properties indicate non-tackiness or non-adhesion to other substrates. Even if they can be coated to the substrate surface, it is difficult for the coating to tightly adhere thereto.

On the other hand, silane coupling agents are well known for their ability to bond surfaces of glass or fabric substrates to organic compounds. They are widely used as surface coating agents for numerous substrates. The silane coupling agent contains an organic functional group and a reactive silyl group (typically hydrolyzable silyl group such as alkoxysilyl group) in the molecule. In the presence of airborne moisture or the like, the hydrolyzable silyl groups undergo self-condensation reaction to form a coating. The hydrolyzable silyl groups form chemical and physical bonds with the surface of glass or metal, whereby the coating becomes a tough coating having durability.

Patent Documents 1 to 6 (JP-A 2008-534696, JP-A 2008-537557, JP-A 2012-072272, JP-A 2012-157856, JP-A 2013-136833, JP-A 2015-199906) disclose a composition comprising a fluoropolyether group-containing polymer which is obtained by introducing a hydrolyzable silyl group into a fluoropolyether group-containing compound, the composition being tightly adherent to the substrate surface and capable of forming a coating with water/oil repellency, chemical resistance, lubricity, parting, antifouling and other properties on the substrate surface.

When lenses and antireflective coatings are surface treated with a composition comprising the fluoropolyether group-containing polymer obtained by introducing a hydrolyzable silyl group into a fluoropolyether group-containing compound, the cured coatings are improved in slippage, parting properties and durability to abrasion with steel wool, but insufficient in durability to abrasion with erasers.

PRIOR ART DOCUMENTS

Patent Documents

Patent Document 1: JP-A 2008-534696
Patent Document 2: JP-A 2008-537557
Patent Document 3: JP-A 2012-072272
Patent Document 4: JP-A 2012-157856
Patent Document 5: JP-A 2013-136833
Patent Document 6: JP-A 2015-199906

SUMMARY OF INVENTION

Technical Problem

An object of the invention, which has been made under the above-mentioned circumstances, is to provide a fluoropolyether group-containing polymer capable of forming a cured film having improved water/oil repellency and abrasion resistance, a surface treating agent comprising the polymer and/or a partial (hydrolytic) condensate thereof, and an article having a surface treated with the surface treating agent.

Solution to Problem

Making extensive investigations to attain the above object, the inventors have found that among the foregoing fluoropolyether group-containing polymers, a fluoropolyether group-containing polymer having a hydrolyzable group and a polyether group, represented by the general formula (1) or (2), shown below, especially a fluoropolyether group-containing polymer having a hydrolyzable group and a polyether group, represented by the general formula (3), shown below, is effective, and a surface treating agent comprising the polymer and/or a partial (hydrolytic) condensate thereof is capable of forming a cured coating having improved water/oil repellency and eraser abrasion resistance. The present invention is predicated on this finding.

Accordingly, the invention provides a fluoropolyether group-containing polymer (or compound having a mono- or divalent fluorooxyalkylene group-containing polymer residue in the molecule), a surface treating agent, and an article as defined below.

[1]

A fluoropolyether group-containing polymer having a hydrolyzable group and a polyether group, represented by the general formula (1) or (2):

wherein $Rf^1$ is a mono- or divalent fluorooxyalkylene group-containing polymer residue, N is independently a carbon atom, silicon atom, nitrogen atom or a tri- to octavalent organic group which may be substituted with fluorine, V is independently a monovalent group terminated with a hydroxyl or hydrolyzable group, E is independently a monovalent group containing oxyalkylene group, α is 1 or 2, β is an integer of 1 to 6, γ is an integer of 1 to 6, β+γ is an integer of 2 to 7,

 (2)

wherein $Rf^1$ and α are as defined above, Q is independently a single bond or divalent organic group, G is independently a divalent group having a hydroxyl or hydrolyzable group, E' is independently a divalent group containing oxyalkylene group, G and E' are linearly linked, G and E' may be randomly arranged, B is independently hydrogen atom, alkyl or halogen group, δ is each independently an integer of 0 to 10, and ε is each independently an integer of 1 to 10.

[2]
The fluoropolyether group-containing polymer of [1], represented by the general formula (3):

[Chem. 1]

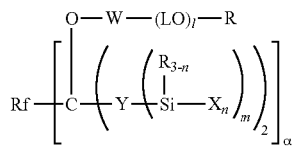 (3)

wherein Rf is a mono- or divalent fluorooxyalkylene group-containing polymer residue, Y is independently a di- to hexavalent hydrocarbon group which may contain a silicon atom and/or siloxane bond, W is independently a single bond, siloxane bond or silylene group, L is independently $C_1$-$C_4$ alkylene group, l is an integer of 1 to 20, R is independently $C_1$-$C_4$ alkyl or phenyl group, X is independently a hydroxyl or hydrolyzable group, n is an integer of 1 to 3, m is an integer of 1 to 5, and α is 1 or 2.

[3]
The fluoropolyether group-containing polymer of [2] wherein in formula (3), α is 1, and Rf is a group having the general formula (4):

[Chem. 2]

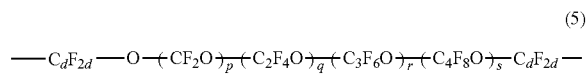 (4)

wherein p, q, r and s each are an integer of 0 to 200, p+q+r+s is 3 to 200, each of the repeating units associated with p, q, r and s may be linear or branched, individual repeating units may be randomly bonded, d is an integer of 1 to 3, the unit associated with d may be linear or branched.

[4]
The fluoropolyether group-containing polymer of [2] wherein in formula (3), α is 2, and Rf is a group having the general formula (5):

[Chem. 3]

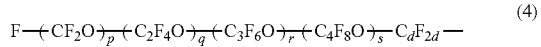 (5)

wherein p, q, r and s each are an integer of 0 to 200, p+q+r+s is 3 to 200, each of the repeating units associated with p, q, r and s may be linear or branched, individual repeating units may be randomly bonded, d is an integer of 1 to 3, the unit associated with d may be linear or branched.

[5]
The fluoropolyether group-containing polymer of any one of [2] to [4] wherein in formula (3), Y is a group selected from the group consisting of a $C_3$-$C_{10}$ alkylene group, an alkylene group containing $C_6$-$C_8$ arylene group, a divalent group having alkylene moieties bonded via a silalkylene structure or silarylene structure, a di- to tetravalent group having a $C_2$-$C_{10}$ alkylene moiety bonded to the valence bond of a di- to tetravalent linear organopolysiloxane residue of 2 to 10 silicon atoms, and a di- to tetravalent group having a $C_2$-$C_{10}$ alkylene moiety bonded to the valence bond of a di- to tetravalent branched or cyclic organopolysiloxane residue of 3 to 10 silicon atoms.

[6]
The fluoropolyether group-containing polymer of any one of [2] to [5] wherein in formula (3), W is a group selected from the group consisting of a single bond, a di- to tetravalent linear organopolysiloxane residue of 2 to 10 silicon atoms, a di- to tetravalent branched or cyclic organopolysiloxane residue of 3 to 10 silicon atoms, a linear silalkylene residue of 2 to 10 silicon atoms, and a silarylene residue of 2 to 10 silicon atoms.

[7]
The fluoropolyether group-containing polymer of any one of [2] to [6] wherein in formula (3), X is each independently selected from the group consisting of hydroxyl group, $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen group.

[8]
The fluoropolyether group-containing polymer of any one of [2] to [7] wherein the polymer having formula (3) is selected from those having the following formulae:

[Chem. 4]

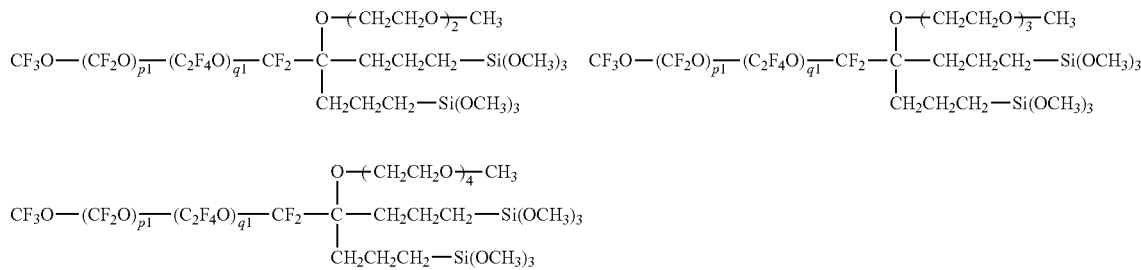

-continued
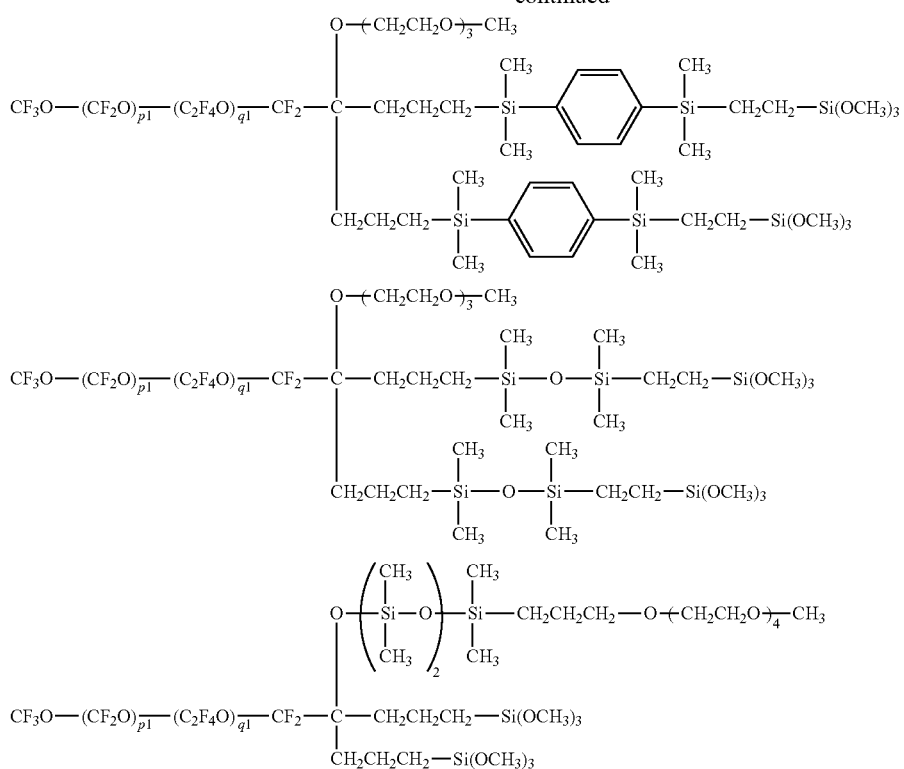
[Chem. 5]
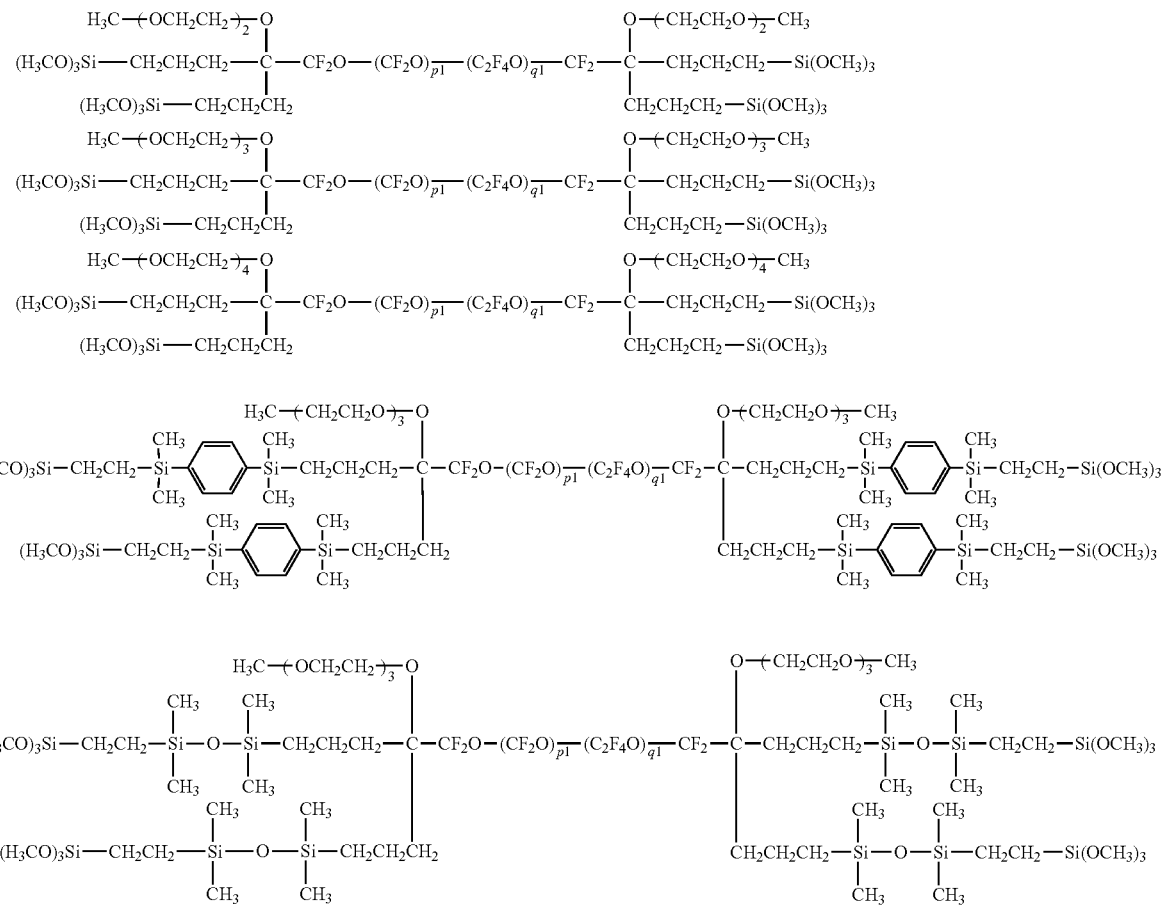

-continued

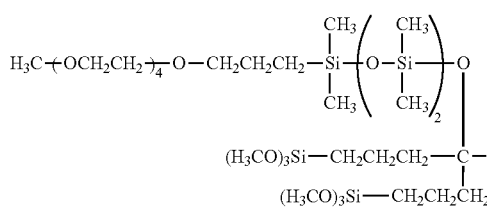 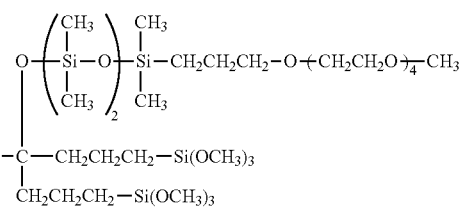

wherein p1 is an integer of 5 to 100, q1 is an integer of 5 to 100, and p1+q1 is an integer of 10 to 105.

[9]

A surface treating agent comprising a fluoropolyether group-containing polymer having a hydrolyzable group and a polyether group and/or a partial (hydrolytic) condensate thereof.

[10]

The surface treating agent of [9] wherein in the fluoropolyether group-containing polymer having a hydrolyzable group and a polyether group, the polyether group is a group containing a monovalent oxyalkylene group at the end of the molecular chain.

[11]

The surface treating agent of [9] wherein the fluoropolyether group-containing polymer having a hydrolyzable group and a polyether group is the fluoropolyether group-containing polymer of any one of [1] to [8].

[12] An article having a surface treated with the surface treating agent of any one of [9] to [11].

Advantageous Effects of Invention

The fluoropolyether group-containing polymer of the invention is improved in substrate adhesion and wettability due to the inclusion of a polyether group in its molecule. An article which is surface treated with a surface treating agent comprising the polymer and/or a partial (hydrolytic) condensate thereof is improved in water/oil repellency and eraser abrasion resistance.

DESCRIPTION OF EMBODIMENTS

A fluoropolyether group-containing polymer having a fluoropolyether group (i.e., mono- or divalent fluorooxyalkylene group-containing polymer residue) and a reactive functional group as well as a polyether group in the molecule is represented by the general formula (1) or (2), or a mixture thereof.

$$Rf^1-[N(V)_\beta(E)_\gamma]_\alpha \quad (1)$$

Herein $Rf^1$ is a mono- or divalent fluorooxyalkylene group-containing polymer residue, N is independently a carbon atom, silicon atom, nitrogen atom or a tri- to octavalent organic group which may be substituted with fluorine, V is independently a monovalent group terminated with a hydroxyl or hydrolyzable group, E is independently a monovalent group containing oxyalkylene group, $\alpha$ is 1 or 2, $\beta$ is an integer of 1 to 6, $\gamma$ is an integer of 1 to 6, $\beta+\gamma$ is an integer of 2 to 7.

$$Rf^1-[Q-(G)_\delta-(E')_\varepsilon-B]_\alpha \quad (2)$$

Herein $Rf^1$ and $\alpha$ are as defined above, Q is independently a single bond or divalent organic group, G is independently a divalent group having a hydroxyl or hydrolyzable group, E' is independently a divalent group containing oxyalkylene group, G and E' are linearly linked, G and E' may be randomly arranged, B is independently hydrogen atom, $C_1$-$C_4$ alkyl or to halogen group, $\delta$ is each independently an integer of 0 to 10, and $\varepsilon$ is each independently an integer of 1 to 10.

The fluoropolyether group-containing polymer of the invention is of the structure that a monovalent fluorooxyalkyl or divalent fluorooxyalkylene group-containing polymer residue (i.e., mono- or divalent fluorooxyalkylene group-containing polymer residue) and a hydrolyzable silyl group such as alkoxysilyl group or hydroxyl group-containing silyl group are bonded via a linking group, and has a polyether group in the molecule. Because of this structure, it is improved in substrate adhesion and wettability and exhibits excellent water/oil repellency and eraser abrasion resistance.

In formulae (1) and (2), $Rf^1$ is a mono- or divalent fluorooxyalkylene group-containing polymer residue, which is represented by A-Rf'—when $\alpha$ is 1 (i.e., $Rf^1$ is a monovalent fluorooxyalkylene group-containing polymer residue), or —Rf'— when $\alpha$ is 2 (i.e., $Rf^1$ is a divalent fluorooxyalkylene group-containing polymer residue).

Herein Rf' is preferably a divalent fluorooxyalkylene group-containing polymer residue having the formula (6):

[Chem. 6]

(6)

wherein p, q, r and s are each independently an integer of 0 to 200, p+q+r+s is 3 to 200, each of repeating units associated with p, q, r and s may be linear or branched, individual repeating units may be randomly bonded, dl is an integer of 0 to 3 independently for each unit, the unit associated with dl may be linear or branched.

In formula (6), p, q, r and s each are an integer of 0 to 200, preferably $\beta$ is an integer of 5 to 100, q is an integer of 5 to 100, r is an integer of 0 to 100, and s is an integer of 0 to 100; p+q+r+s is 3 to 200, preferably 10 to 100; each repeating unit may be linear or branched, and individual repeating units may be randomly bonded. More preferably, p+q is an integer of 10 to 105, especially 15 to 60, and r=s=0. When p+q+r+s is below the upper limit, adhesion and curability are satisfactory. When p+q+r+s is above the lower limit, the characteristics of fluoropolyether group are fully exerted.

Also, "A" is fluorine atom, hydrogen atom, or a monovalent fluorinated group terminated with —$CF_3$ moiety, —$CF_2H$ moiety, or —$CH_2F$ moiety, preferably fluorine atom, —$CF_3$, —$CF_2CF_3$, or —$CF_2CF_2CF_3$ group.

In formula (1), N is independently a carbon atom, silicon atom, nitrogen atom or a tri- to octavalent organic group which may be substituted with fluorine. The tri- to octavalent organic group is represented by the formula: -(J)$_f$-M- wherein J is a divalent organic group, M is selected from a carbon atom, a tri- or tetravalent group containing a silicon atom, and a tri- to octavalent siloxane residue, t is 0 or 1, the combination of J and M is not particularly limited.

J is a divalent organic group which is a linking group between Rf and M.

Preferably J is a substituted or unsubstituted $C_2$-$C_{12}$ divalent organic group which may contain at least one structure selected from an amide bond, ether bond, ester bond, a diorganosilylene group (such as dimethylsilylene, diethylsilylene or diphenylsilylene), a group of the formula: —Si[—OH][—(CH$_2$)$_f$—Si(CH$_3$)$_3$]— wherein f is an integer of 2 to 4, and a diorganosiloxane group, more preferably a substituted or unsubstituted $C_2$-$C_{12}$ divalent hydrocarbon group which may contain said structure.

Examples of the substituted or unsubstituted $C_2$-$C_{12}$ divalent hydrocarbon group include alkylene groups such as methylene, ethylene, propylene (trimethylene, methylethylene), butylene (tetramethylene, methylpropylene), hexamethylene, octamethylene group; arylene groups such as phenylene group; and combinations of at least two of the foregoing (e.g., alkylene-arylene groups), and substituted forms of the foregoing in which one or more or even all of hydrogen atoms are substituted by halogen atoms such as fluorine. Inter alia, unsubstituted or substituted $C_2$-$C_4$ alkylene groups and phenylene groups are preferred.

Examples of J are groups as shown below.

[Chem. 7]

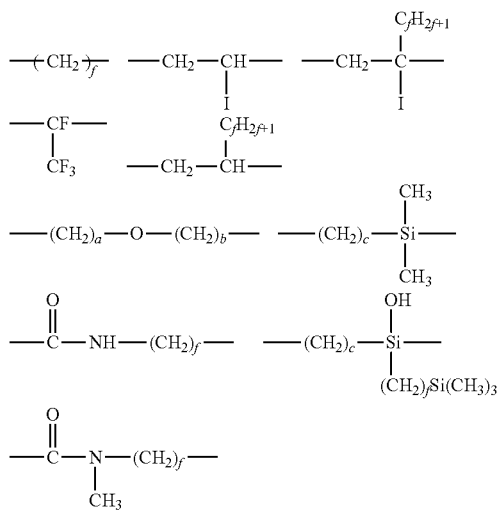

[Chem. 8]

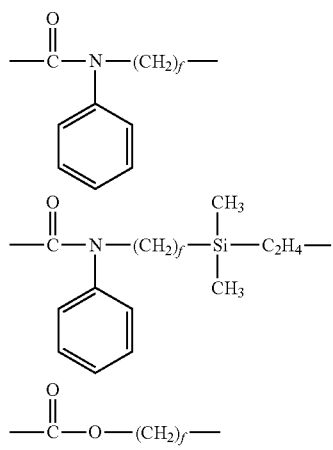

[Chem. 9]

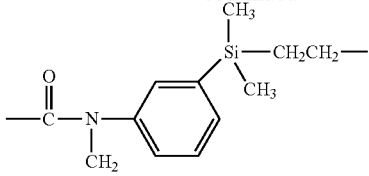

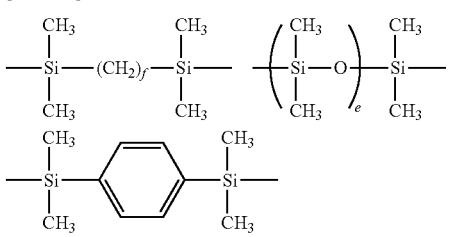

Herein f is an integer of 2 to 4, a, b and c each are an integer of 1 to 4, and e is an integer of 1 to 50.

M is selected from a carbon atom, a tri- or tetravalent group containing a silicon atom, and a tri- to octavalent siloxane residue. Specifically M is selected from among a trivalent group having the formula: -TC= wherein T is independently an alkyl group of preferably 1 to 3 carbon atoms, an alkenyl group of preferably 2 or 3 carbon atoms, a hydroxyl group, a silylether group having the formula: $K_3SiO$— (wherein K is independently hydrogen, alkyl group of preferably 1 to 3 carbon atoms, aryl group such as phenyl, or alkoxy group of preferably 1 to 3 carbon atoms), a trivalent group having the formula: -TSi= wherein T is as defined above, a tetravalent group having the formula: a tetravalent group having the formula: and a tri- to octavalent siloxane residue. Where a siloxane bond is included, M is preferably a linear, branched or cyclic organopolysiloxane residue of 2 to 13 silicon atoms, preferably 2 to 5 silicon atoms. Such a group may contain a silalkylene structure wherein two silicon atoms are linked by an alkylene group, that is, Si—(CH$_2$)$_x$—Si wherein x is an integer of 2 to 6.

Of the organopolysiloxane residues, those containing an alkyl group of 1 to 8 carbon atoms, preferably 1 to 4 carbon atoms such as methyl, ethyl, propyl or butyl, or a phenyl group are desirable. The alkylene group in the silalkylene structure is preferably of 2 to 6 carbon atoms, more preferably 2 to 4 carbon atoms.

Examples of M are groups as shown below.

[Chem. 10]

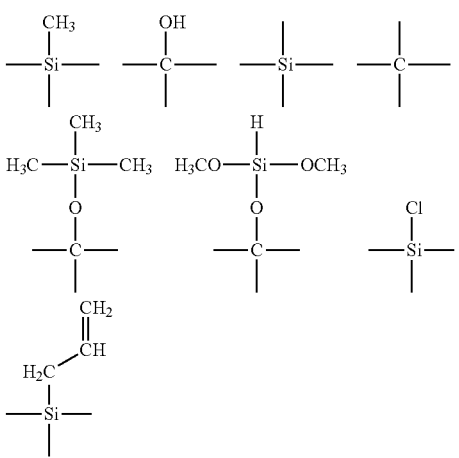

-continued

[Chem. 11]

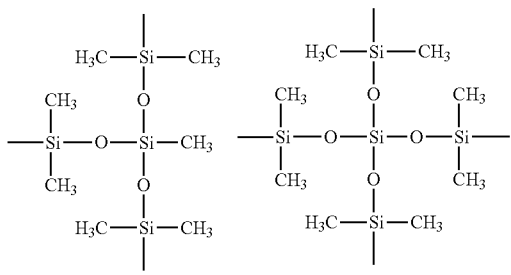

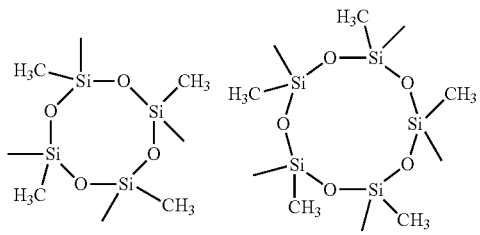

[Chem. 12]

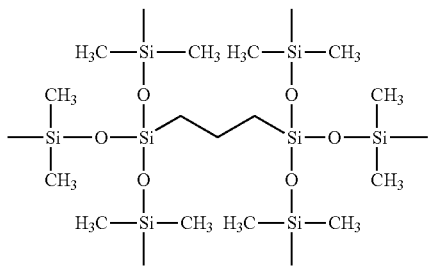

In formula (1), V is independently a monovalent group terminated with a hydroxyl or hydrolyzable group, preferably a monovalent organic group having a plurality of hydroxyl or hydrolyzable groups incorporated therein. Examples of V are groups having the following formulae (7a) to (70.

[Chem. 13]

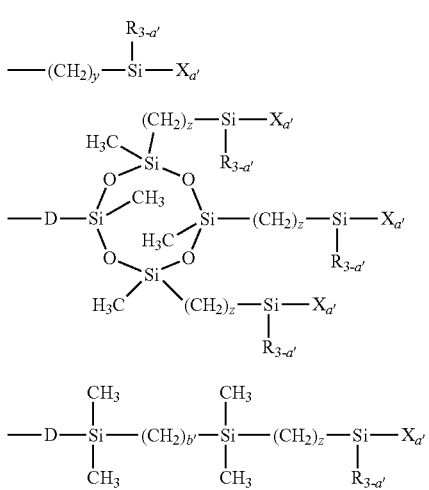

[Chem. 14]

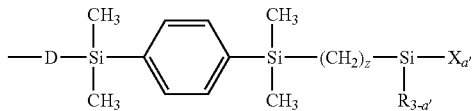

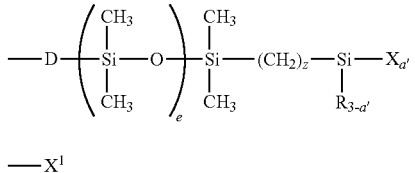

—X¹ (7f)

Herein R is each independently $C_1$-$C_4$ alkyl or phenyl group, X is each independently a hydroxyl or hydrolyzable group, $X^1$ is a hydrolyzable group, a' is 2 or 3, γ is an integer of 0 to 10, z is independently an integer of 1 to 10, D is a single bond or a $C_1$-$C_{20}$ divalent organic group which may be substituted with fluorine, b' is an integer of 2 to 6, and e is an integer of 1 to 50.

In formulae (7a) to (7e), R is a $C_1$-$C_4$ alkyl group such as methyl, ethyl, propyl or butyl, or a phenyl group. X is each independently a hydroxyl or hydrolyzable group. Exemplary groups of X include hydroxyl group, $C_1$-$C_{10}$ alkoxy groups such as methoxy, ethoxy, propoxy, and butoxy group, $C_2$-$C_{10}$ alkoxylalkoxy groups such as methoxymethoxy and methoxyethoxy group, $C_1$-$C_{10}$ acyloxy groups such as acetoxy group, and $C_2$-$C_{10}$ alkenyloxy groups such as isopropenoxy group. Inter alia, methoxy and ethoxy groups are preferred.

In formula (70, $X^1$ is a hydrolyzable group, examples of which are as exemplified for the hydrolyzable group X. Inter alia, methoxy and ethoxy groups are preferred. Preferably, $X^1$ bonds with the (terminal) silicon atom in M to form the structure:

D is a single bond or a divalent organic group of 1 to 20 carbon atoms, preferably 2 to 8 carbon atoms, which may be substituted with fluorine, preferably divalent hydrocarbon group. Examples of the divalent hydrocarbon group include alkylene groups such as methylene, ethylene, propylene (trimethylene, methylethylene), butylene (tetramethylene, methylpropylene), hexamethylene, and octamethylene group, arylene groups such as phenylene group, or combinations of at least two of the foregoing (e.g., alkylene-arylene groups), and substituted forms of the foregoing in which one or more or even all of hydrogen atoms are substituted by fluorine atoms. D is preferably ethylene, propylene or phenylene group.

The subscript γ is an integer of 0 to 10, preferably 2 to 8, z is an integer of 1 to 10, preferably 2 to 8, b' is an integer of 2 to 6, preferably 2 to 4, and e is an integer of 1 to 50, preferably 1 to 10.

In formula (1), E is independently a monovalent group containing oxyalkylene group, represented by the formula: —W'(-(LO)$_l$—R)$_f$, wherein W' is an oxygen atom or a di- or trivalent group which is a combination of X' with an oxygen atom, X' is a di- or trivalent $C_2$-$C_{20}$ group which may contain a silicon atom, siloxane bond, silalkylene bond or silarylene bond and which may contain a hydroxyl or hydrolyzable group on the silicon atom. W' is preferably an oxygen atom. L is independently a $C_1$-$C_4$ alkylene group such as methylene, ethylene, propylene or butylene group, which may be used alone or in admixture, l is an integer of 1 to 20, preferably 1 to 10. R is independently a $C_1$-$C_4$ alkyl group such as methyl, ethyl, propyl or butyl, or a phenyl group, preferably methyl group, and f is 1 or 2.

Examples of E are groups as shown below.

[Chem. 15]

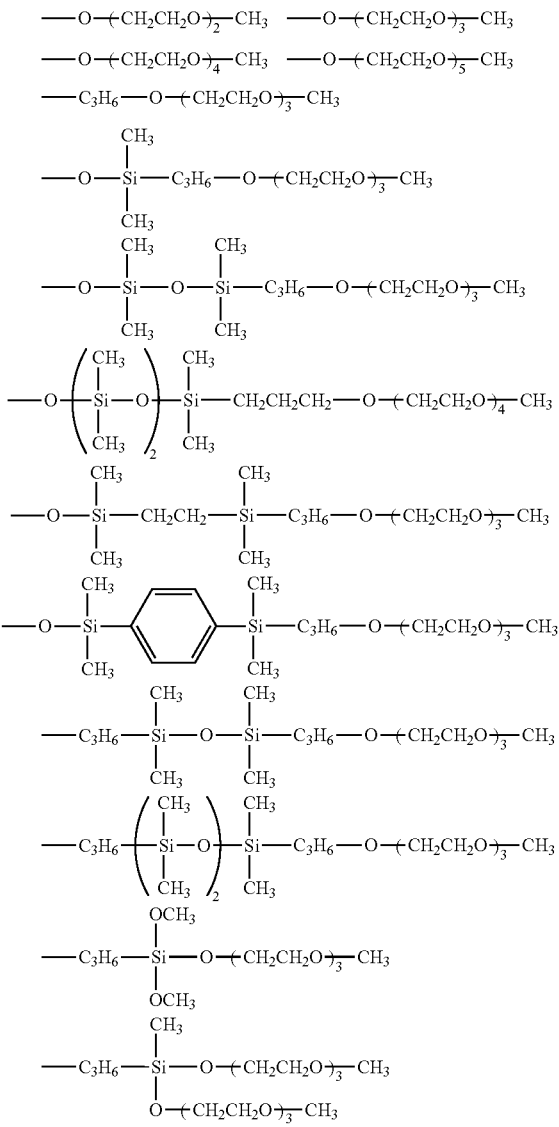

[Chem. 16]

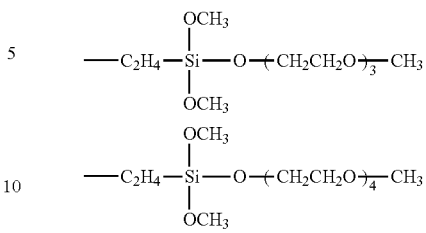

In formula (1), α is 1 or 2, β is an integer of 1 to 6, preferably 1 or 2, γ is an integer of 1 to 6, preferably 1 or 2, and β+γ is an integer of 2 to 7, preferably 2 or 3.

The fluoropolyether group-containing polymer of formula (1) wherein α=1, that is, Rf is a monovalent fluorooxyalkylene group-containing polymer residue or the fluoropolyether group-containing polymer of formula (1) wherein α=2, that is, Rf is a to divalent fluorooxyalkylene group-containing polymer residue may be prepared, for example, by the following method.

A fluoropolyether group-containing polymer having a polyether group and at least one olefin site at one end or both ends of the molecular chain is dissolved in a solvent such as fluorochemical solvent, typically 1,3-bis(trifluoromethyl)benzene. An organosilicon compound having a SiH group and a hydrolyzable terminal group (e.g., halogen atom or alkoxy group) in the molecule such as trichlorosilane or trialkoxysilane is mixed therewith. The mixture is aged in the presence of a hydrosilylation catalyst, for example, chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours. When a halogenated (organo)silicon compound having a SiH group such as trichlorosilane is used as the organosilicon compound having a SiH group and a hydrolyzable terminal group in the molecule, the substituent (e.g., halogen) on the silyl group may be subsequently converted to another hydrolyzable group such as alkoxy group, typically methoxy.

Examples of the fluoropolyether group-containing polymer having a polyether group and at least one olefin site at one end or both ends of the molecular chain are shown below.

[Chem. 77]

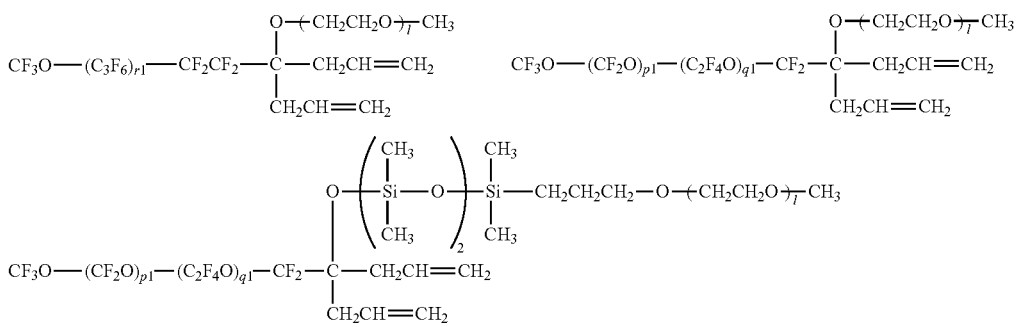

-continued

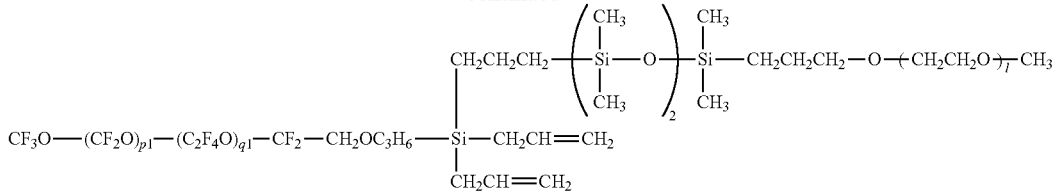

Herein l is as defined above, p1 is an integer of 5 to 100, q1 is an integer of 5 to 100, p1+q1 is an integer of 10 to 105, and r1 is an integer of 0 to 100.

The fluoropolyether group-containing polymer having a polyether group and at least one olefin site at one end or both ends of the molecular chain may be prepared, for example, by mixing a fluoropolyether group-containing polymer having a hydroxyl group and at least one olefin site at one end or both ends of the molecular chain with a polyether-providing agent in such amounts that 1 to 15 equivalents, more preferably 3 to 9 equivalents, most preferably about 6 equivalents of the polyether-providing agent is available per equivalent of the hydroxyl group on the fluoropolyether group-containing polymer having a hydroxyl group and at least one olefin site at one end or both ends of the molecular chain, and aging the mixture in the presence of a base, and optionally a reactivity-enhancing additive and a solvent, at a temperature of 0 to 90° C., preferably 60 to 80° C., and more preferably about 70° C. for 1 to 48 hours, preferably 10 to 40 hours, and more preferably about 25 hours.

An alternative method for preparing the fluoropolyether group-containing polymer having a polyether group and at least one olefin site at one end or both ends of the molecular chain is, for example, by mixing a fluoropolyether group-containing polymer having a hydroxyl group and at least one olefin site at one end or both ends of the molecular chain with an organosilicon compound having at least two SiH groups, but not a hydrolyzable terminal group in the molecule in such amounts that 7 to 30 equivalents, more preferably 5 to 20 equivalents, most preferably about 10 equivalents of the organosilicon compound having at least two SiH groups, but not a hydrolyzable terminal group in the molecule is available per equivalent of the hydroxyl group on the fluoropolyether group-containing polymer having a hydroxyl group and at least one olefin site at one end or both ends of the molecular chain, and subjecting the mixture to dehydrogenation reaction in the presence of a dehydrogenation catalyst and optionally a solvent, at a temperature of 0 to 60° C., preferably 15 to 35° C., and more preferably about 25° C. for 10 minutes to 24 hours, preferably 30 minutes to 2 hours, and more preferably about 1 hour, thereby obtaining a fluoropolyether group-containing polymer having a SiH group and at least one olefin site at one end or both ends of the molecular chain.

Subsequently, the fluoropolyether group-containing polymer having a SiH group and at least one olefin site at one end or both ends of the molecular chain is combined with a polyether compound having an olefin site in the molecule (e.g., polyalkylene oxide compound blocked with an alkenyloxy group at one end of the molecule chain) in such amounts that 1 to 10 equivalents, more preferably 2 to 5 equivalents, most preferably about 3 equivalents of the polyether compound having an olefin site in the molecule is available per equivalent of the SiH group on the fluoropolyether group-containing polymer having a SiH group and at least one olefin site at one end or both ends of the molecular chain. The compounds are dissolved in a solvent such as fluorochemical solvent, typically 1,3-bis(trifluoromethyl)benzene and aged in the presence of a hydrosilylation catalyst such as chloroplatinic acid/vinyl siloxane complex in toluene, at a temperature of 40 to 120° C., preferably 60 to 100° C., and more preferably about 80° C. for 1 to 72 hours, preferably 20 to 36 hours, and more preferably about 24 hours.

A further alternative method for preparing the fluoropolyether group-containing polymer having a polyether group and at least one olefin site at one end or both ends of the molecular chain is, for example, by dissolving a fluoropolyether group-containing polymer having three olefin sites at one end or both ends of the molecular chain in a solvent such as fluorochemical solvent, typically 1,3-bis(trifluoromethyl)benzene, mixing the solution with an organosilicon compound having a SiH group and a polyoxyalkylene group in the molecule in such amounts that ⅓ equivalent of the organosilicon compound having a SiH group and a polyoxyalkylene group in the molecule is available per equivalent of reactive terminal group on the fluoropolyether-containing polymer having three olefin sites at one end or both ends of the molecular chain, and aging the mixture in the presence of a hydrosilylation catalyst such as chloroplatinic acid/vinyl siloxane complex in toluene, at a temperature of 40 to 120° C., preferably 60 to 100° C., more preferably about 80° C. for 1 to 72 hours, preferably 20 to 36 hours, more preferably about 24 hours for effecting reaction of some olefin sites of the fluoropolyether group-containing polymer with the SiH group of the SiH group-containing organosilicon compound.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane. Also included are silanes and siloxane compounds as shown below.

[Chem. 18]

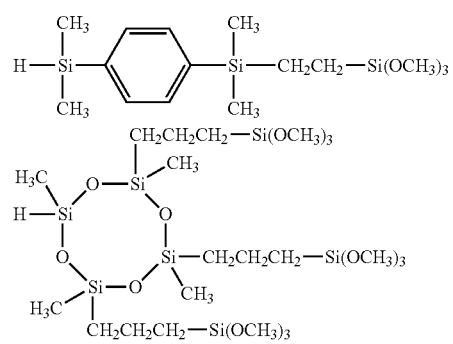

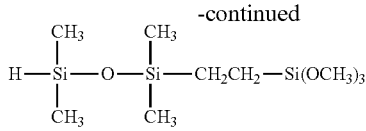

When a fluoropolyether group-containing polymer having a polyether group and at least one olefin site at one end or both ends of the molecular chain is reacted with an organosilicon compound having a SiH group and a hydrolyzable terminal group in the molecule, the organosilicon compound having a SiH group and a hydrolyzable terminal group in the molecule may be used in an amount of 1 to 4 equivalents, preferably 1.5 to 2.5 equivalents, more preferably about 2 equivalents per equivalent of olefin site on the fluoropolyether group-containing polymer.

It is noted that when a halogenated (organo)silicon compound containing a SiH group such as trichlorosilane is used as the organosilicon compound having a SiH group and a hydrolyzable terminal group in the molecule, the substituent (halogen) on the silyl group may be subsequently converted to another hydrolyzable group such as alkoxy group, typically methoxy. Examples of the reagent which can be used in converting the substituent (halogen) on the silyl group to another hydrolyzable group include alcohols of 1 to 10 carbon atoms such as methanol, ethanol, propanol, isopropanol and butanol.

The amount of the reagent used may be 10 to 200 parts by weight, more preferably 40 to 100 parts by weight, more preferably 65 parts by weight per 100 parts by weight of the addition reaction product of the fluoropolyether group-containing polymer having a polyether group and at least one olefin site at one end or both ends of the molecular chain with the halogenated (organo)silicon compound having a SiH group.

Typical of the solvent are fluorochemical solvents. Suitable fluorochemical solvents include 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 10 to 300 parts, preferably 50 to 150 parts, and more preferably about 100 parts by weight per 100 parts by weight of the fluoropolyether group-containing polymer having a polyether group and at least one olefin site at one end or both ends of the molecular chain.

Examples of the hydrosilylation catalyst include platinum group metal based catalysts such as platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluoropolyether group-containing polymer having a polyether group and at least one olefin site at one end or both ends of the molecular chain.

Alternatively, the fluoropolyether group-containing polymer of formula (1) wherein $\alpha=1$, that is, Rf is a monovalent fluorooxyalkylene group-containing polymer residue or the fluoropolyether group-containing polymer of formula (1) wherein $\alpha=2$, that is, Rf is a divalent fluorooxyalkylene group-containing polymer residue may be prepared, for example, by the following method.

A fluoropolyether group-containing polymer having at least one olefin site at one end or both ends of the molecular chain is dissolved in a solvent such as fluorochemical solvent, typically 1,3-bis(trifluoromethyl)benzene. The solution is mixed with a halogenated (organo)silicon compound having a SiH group and a hydrolyzable terminal group in the molecule such as trichlorosilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours. Thereafter, the substituent (e.g., halogen atom) on the silyl group is converted to a polyether group and another hydrolyzable group, typically methoxy group.

Examples of the fluoropolyether group-containing polymer having at least one olefin site at one end or both ends of the molecular chain are shown below.

[Chem. 19]

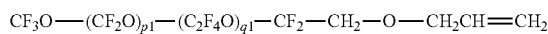

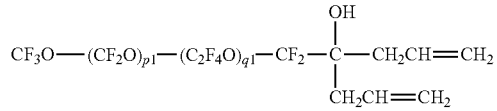

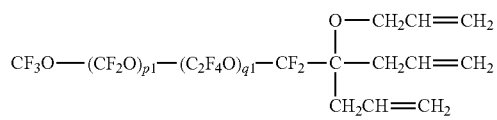

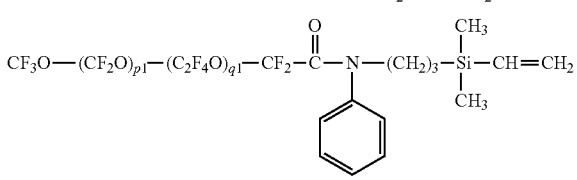

Herein p1 and q1 are as defined above.

Examples of the halogenated (organo)silicon compound having a SiH group and a hydrolyzable terminal group in the molecule include trichlorosilane, tribromosilane and triiodosilane.

The halogenated (organo)silicon compound having a SiH group and a hydrolyzable terminal group in the molecule may be used in an amount of 1 to 4 equivalents, preferably 1.5 to 2.5 equivalents, more preferably about 2 equivalents per equivalent of olefin site on the fluoropolyether group-containing polymer.

Exemplary of the polyether alcohol which can be used in converting the substituent (halogen atom) on the silyl group to a polyether group are polyether alcohols such as polyethylene oxides blocked with a hydroxyl group at one end and with a methoxy group at the other end of the molecular chain, as shown below.

[Chem. 20]

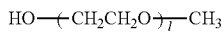

Herein l is as defined above.

Specific examples of the polyether alcohol include Uniox M-200, Uniox M-300 and Uniox M-400 from NOF Corp.

The polyether alcohol may be used in an amount of 5 to 100 parts by weight, preferably 20 to 50 parts by weight, more preferably 35 parts by weight per 100 parts by weight of the addition reaction product of the fluoropolyether group-containing polymer having at least one olefin site at one end or both ends of the molecular chain with the halogenated (organo)silicon compound having a SiH group.

Examples of the reagent which can be used in converting the substituent (halogen atom) on the silyl group to another hydrolyzable group include alcohols of 1 to 10 carbon atoms such as methanol, ethanol, propanol, isopropanol and butanol.

The amount of the reagent used may be 10 to 200 parts by weight, preferably 40 to 100 parts by weight, more preferably 65 parts by weight per 100 parts by weight of the addition reaction product of the fluoropolyether group-containing polymer having at least one olefin site at one end or both ends of the molecular chain with the halogenated (organo)silicon compound having a SiH group.

Typical of the solvent are fluorochemical solvents. Suitable fluorochemical solvents include 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 10 to 300 parts, preferably 50 to 150 parts, and more preferably about 100 parts by weight per 100 parts by weight of the to fluoropolyether group-containing polymer having at least one olefin site at one end or both ends of the molecular chain.

Examples of the hydrosilylation catalyst include platinum group metal based catalysts such as platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluoropolyether group-containing polymer having at least one olefin site at one end or both ends of the molecular chain.

Further alternatively, the fluoropolyether group-containing polymer of formula (1) wherein α=1, that is, Rf is a monovalent fluorooxyalkylene group-containing polymer residue or the fluoropolyether group-containing polymer of formula (1) wherein α=2, that is, Rf is a divalent fluorooxyalkylene group-containing polymer residue may be prepared, for example, by the following method.

A fluoropolyether group-containing polymer having at least two olefin sites at one end or both ends of the molecular chain is dissolved in a solvent such as fluorochemical solvent, typically 1,3-bis(trifluoromethyl)benzene. The solution is mixed with an organosilicon compound having a SiH group and a polyoxyalkylene group in the molecule. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours for effecting reaction of some olefin sites on the fluoropolyether-containing polymer with the SiH group on the organosilicon compound having a polyoxyalkylene group and a SiH group. Subsequently, the reaction product is mixed with an organosilicon compound having a SiH group and a hydrolyzable terminal group (alkoxy group) in the molecule such as trimethoxysilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours for effecting reaction of residual olefin sites on the fluoropolyether group-containing polymer with the SiH group on the organosilicon compound.

It is noted that when a halogenated (organo)silicon compound having a SiH group such as trichlorosilane is used as the organosilicon compound having a SiH group and a hydrolyzable terminal group in the molecule, the substituent (halogen) on the silyl group may be subsequently converted to another hydrolyzable group such as alkoxy group, typically methoxy.

Examples of the fluoropolyether group-containing polymer having at least two olefin sites at one end or both ends of the molecular chain are given below.

[Chem. 21]

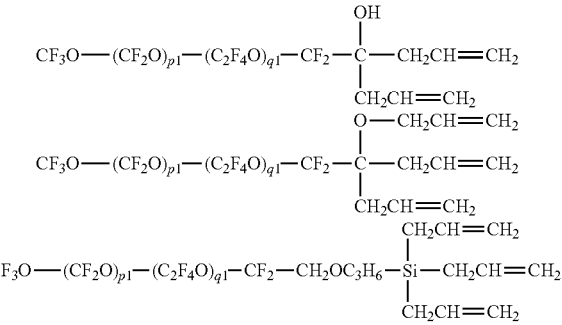

Herein p1 and q1 are as defined above.

Examples of the organosilicon compound having a SiH group and a polyoxyalkylene group in the molecule are given below.

[Chem. 22]

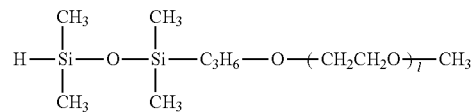

-continued

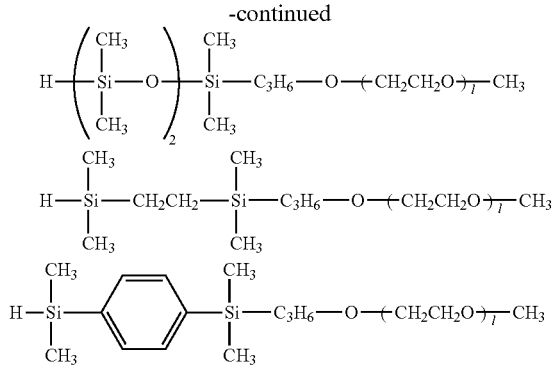

Herein l is as defined above.

The organosilicon compound having a SiH group and a polyoxyalkylene group in the molecule may be used in an amount of 0.1 to 0.9 equivalent, preferably 0.3 to 0.7 equivalent, to more preferably about 0.5 equivalent per equivalent of olefin site on the fluoropolyether group-containing polymer.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane. Also included are silanes and siloxane compounds as shown below.

[Chem. 23]

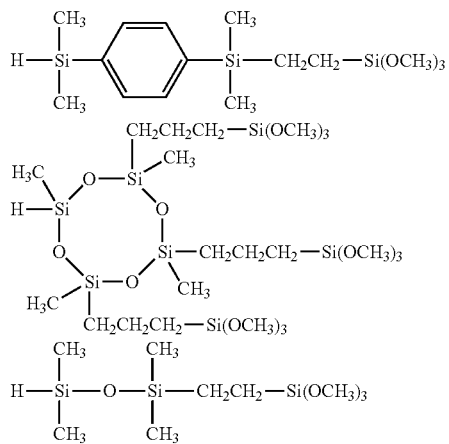

The organosilicon compound having a SiH group and a hydrolyzable terminal group in the molecule may be used in an amount of 0.1 to 0.9 equivalent, preferably 0.3 to 0.7 equivalent, more preferably about 0.5 equivalent per equivalent of olefin site on the fluoropolyether group-containing polymer.

Typical of the solvent are fluorochemical solvents. Suitable fluorochemical solvents include 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 10 to 300 parts, preferably 50 to 150 parts, and more preferably about 100 parts by weight per 100 parts by weight of the fluoropolyether group-containing polymer having at least two olefin sites at one end or both ends of the molecular chain.

Examples of the hydrosilylation catalyst include platinum group metal based catalysts such as platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluoropolyether-containing polymer having at least two olefin sites at one end or both ends of the molecular chain.

Referring to formula (2), Q is independently a single bond or divalent organic group, which is to link the group $Rf^1$ to the group G or E'. The divalent organic group is preferably a substituted or unsubstituted $C_2$-$C_{12}$ divalent organic group which may contain at least one structure selected from the group consisting of an amide bond, ether bond, ester bond, a diorganosilylene group such as dimethylsilylene, a group of the formula: —Si[—OH][—(CH$_2$)$_f$—Si(CH$_3$)$_3$]— wherein f is an integer of 2 to 4, and a diorganosiloxane group, more preferably a substituted or unsubstituted $C_2$-$C_{12}$ divalent hydrocarbon group which may contain the above structure.

Examples of the substituted or unsubstituted $C_2$-$C_{12}$ divalent hydrocarbon group include alkylene groups such as methylene, ethylene, propylene (trimethylene, methylethylene), butylene (tetramethylene, methylpropylene), hexamethylene, octamethylene group; arylene groups such as phenylene group; and combinations of at least two of the foregoing (e.g., alkylene-arylene groups), and substituted forms of the foregoing in which one or more or even all of hydrogen atoms are substituted by halogen atoms such as fluorine. Inter alia, unsubstituted or substituted $C_2$-$C_4$ alkylene groups and phenylene groups are preferred.

Exemplary of the divalent organic group Q are groups as shown below.

[Chem. 24]

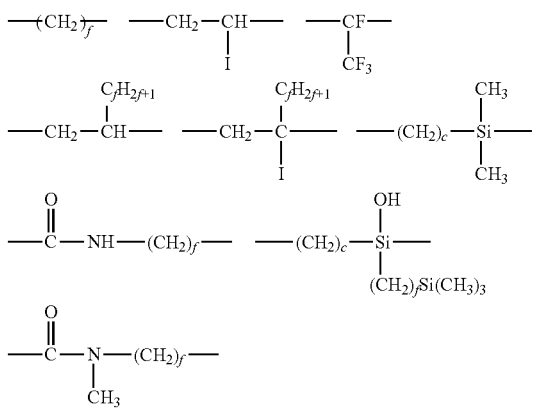

[Chem. 25]

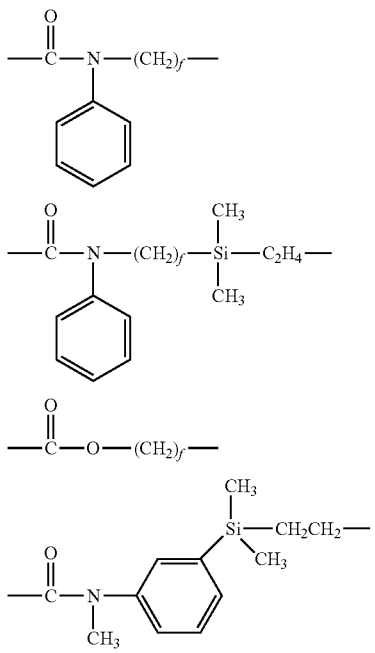

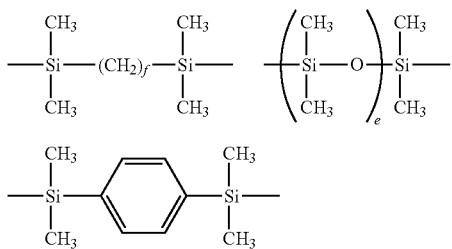

Herein f is an integer of 2 to 4, c is an integer of 1 to 4, and e is an integer of 1 to 50.

In formula (2), G is independently a divalent group having a hydroxyl or hydrolyzable group, examples of which are given below.

[Chem. 27]

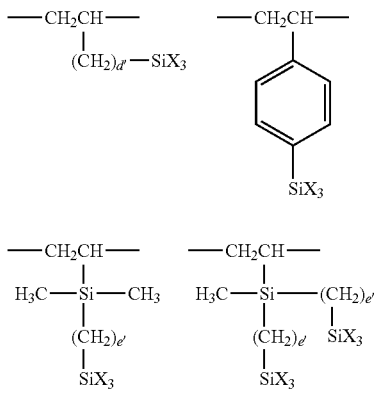

[Chem. 28]

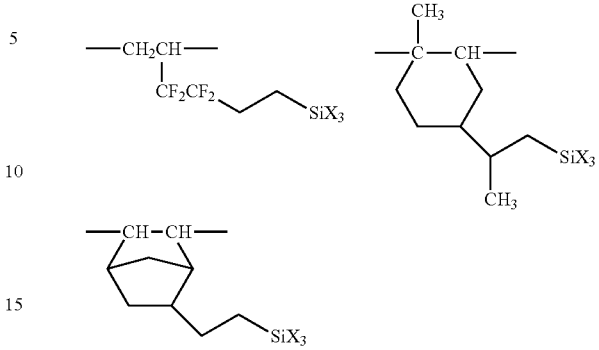

Herein X is as defined above, d' is an integer of 0 to 10, preferably 1 to 8, e' is an integer of 2 to 10, preferably 3 to 8.

In formula (2), E' is independently an oxyalkylene group-containing divalent group which may contain a hydroxyl or hydrolyzable group. Exemplary of the divalent group are groups as shown below.

[Chem. 29]

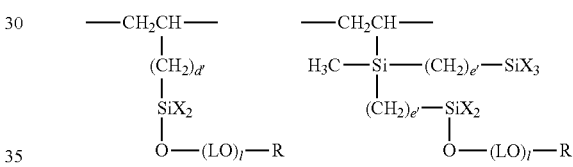

[Chem. 30]

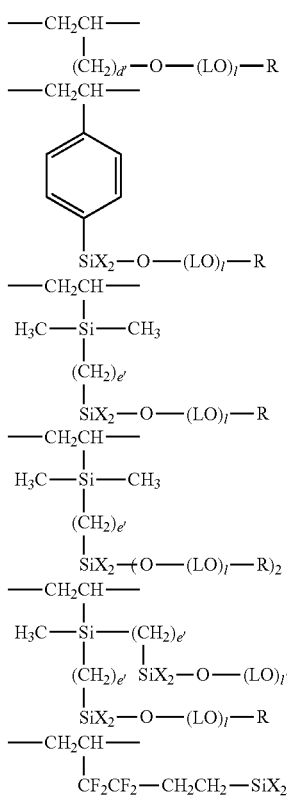

-continued

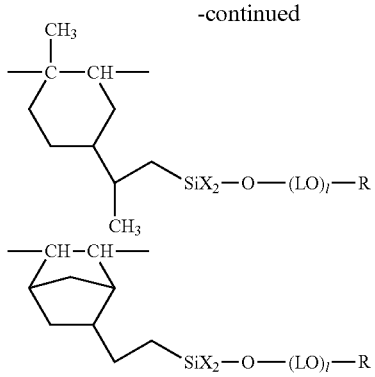

Herein X, L, 1, R, d', and e' are as defined above.

In formula (2), B is independently hydrogen atom, a $C_1$-$C_4$ alkyl group such as methyl, ethyl, propyl or butyl group, or halogen atom such as fluorine, chlorine, bromine or iodine atom.

In formula (2), δ is an integer of 0 to 10, preferably 1 to 4, and ε is an integer of 1 to 10, preferably 1 to 4. It is noted that G is linearly linked to E' while G and E' may be randomly arranged with each other.

The fluoropolyether group-containing polymer of formula (2) wherein α=1, that is, Rf is a monovalent fluorooxyalkylene group-containing polymer residue or the fluoropolyether group-containing polymer of formula (2) wherein α=2, that is, Rf is a divalent fluorooxyalkylene group-containing polymer residue may be prepared, for example, by the following method.

A fluoropolyether group-containing polymer having iodine at one end or both ends of the molecular chain is dissolved in a solvent such as fluorochemical solvent, typically 1,3-bis(trifluoromethyl)benzene. A radical initiator such as di-t-butyl peroxide is added to the solution, after which an organosilicon compound having an olefin site and a hydrolyzable terminal group in the molecule such as vinyltrichlorosilane or vinyltrialkoxysilane and a polyether compound having an olefin site in the molecule are added to and mixed with the solution. The mixture is aged at a reaction temperature of 60 to 180° C., preferably 90 to 150° C., more preferably about 120° C. for a time of 1 to 20 hours, preferably 2 to 10 hours, more preferably about 6 hours, to conduct telomerization reaction between the organosilicon compound having an olefin site and a hydrolyzable terminal group in the molecule and the polyether compound having an olefin site in the molecule, with the reaction starting from the terminal iodine atom of the fluoropolyether group-containing polymer having iodine at one end or both ends of the molecular chain. Herein, the organosilicon compound having an olefin site and a hydrolyzable terminal group in the molecule and the polyether compound having an olefin site in the molecule may be added at the same time. It is also acceptable that either one is first reacted and the other one is later reacted. The polyether compound having an olefin site in the molecule may further have a hydroxyl or hydrolyzable group. In such a case, the target polymer may be prepared by using only the polyether compound having an olefin site and a hydroxyl or hydrolyzable group in the molecule while omitting the organosilicon compound having an olefin site and a hydrolyzable terminal group in the molecule. Thereafter, the terminal iodine of the fluoropolyether group-containing polymer incorporated in the telomer is reduced with a reducing agent such as metallic zinc. It is noted that when a halogenated organosilicon compound having an olefin site such as vinyltrichlorosilane is used as the organosilicon compound having an olefin site and a hydrolyzable terminal group in the molecule, the substituent (halogen atom) on the silyl group may be subsequently converted to another hydrolyzable group such as alkoxy group, typically methoxy.

Examples of the fluoropolyether group-containing polymer having iodine at one end or both ends of the molecular chain are given below.

[Chem. 31]

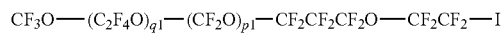

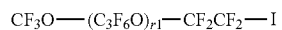

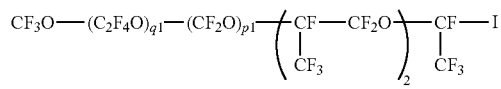

Herein p1 is an integer of 5 to 100, q1 is an integer of 5 to 100, p1+q1 is an integer of 10 to 105, and r1 is an integer of 0 to 100.

Examples of the organosilicon compound having an olefin site and a hydrolyzable terminal group in the molecule include vinyltrimethoxysilane, vinyltriethoxysilane, vinyltripropoxysilane, vinyltriisopropoxysilane, vinyltributoxysilane, vinyltriisopropenoxysilane, vinyltriacetoxysilane, vinyltrichlorosilane, vinyltribromosilane, vinyltriiodosilane, allyltrimethoxysilane, allyltriethoxysilane, allyltripropoxysilane, allyltriisopropoxysilane, allyltributoxysilane, allyltriisopropenoxysilane, allyltriacetoxysilane, allyltrichlorosilane, allyltribromosilane, and allyltriiodosilane as well as a silane as shown below.

[Chem. 32]

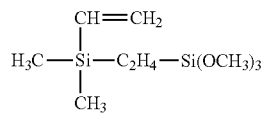

The organosilicon compound having an olefin site and a hydrolyzable terminal group in the molecule may be used in an amount of 1 to 10 equivalents, preferably 1.5 to 3 equivalents, more preferably about 2 equivalents per equivalent of the reactive terminal group on the fluoropolyether group-containing polymer having iodine at one end or both ends of the molecular chain.

The polyether compound having an olefin site in the molecule may further have a hydroxyl or hydrolyzable group. Examples include polyalkylene oxide compounds blocked with an alkenyloxy group at one end of the molecular chain such as polyethylene oxide blocked with an allyloxy group at one end and with a methoxy group at the other end of the molecular chain, and silane compounds having a terminal alkenyl group and a terminal polyether group, as shown below.

[Chem. 33]

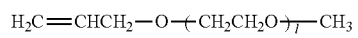

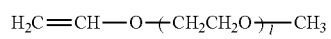

[Chem. 34]

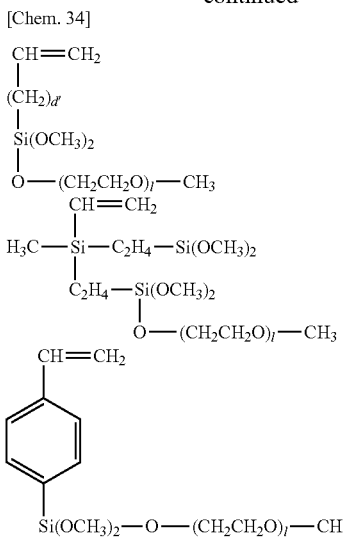

Herein d' and 1 are as defined above.

Examples of the polyether compound having an olefin site in the molecule such as the polyalkylene oxide compound blocked with an alkenyloxy group at one end of the molecular chain include Uniox MA-200, Uniox MA-300, Uniox MA-350S and Uniox MA-500 by NOF Corp.

The polyether compound having an olefin site in the molecule may be used in an amount of 1 to 10 equivalents, preferably 1.5 to 3 equivalents, more preferably about 2 equivalents per equivalent of the reactive terminal group on the fluoropolyether group-containing polymer having iodine at one end or both ends of the molecular chain.

Examples of the radical initiator include azobisisobutyronitrile (AIBN), 1,1'-azobis(cyclohexanecarbonitrile) (ABCN, available as VAZO®), di-t-butyl peroxide, t-butyl hydroperoxide, benzoyl peroxide, and methyl ethyl ketone peroxide.

The radical initiator may be used in an amount of 0.1 to 5 equivalents, preferably 0.5 to 2 equivalents, more preferably about 1 equivalent per equivalent of the reactive terminal group on the fluoropolyether-containing polymer having iodine at one end or both ends of the molecular chain.

Typical of the solvent are fluorochemical solvents. Suitable fluorochemical solvents include 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 50 to 300 parts, preferably 150 to 250 parts, and more preferably about 200 parts by weight per 100 parts by weight of the fluoropolyether group-containing polymer having iodine at one end or both ends of the molecular chain.

Suitable reducing agents include hydrides such as sodium borohydride and lithium aluminum hydride, and metals such as iron, zinc, nickel, aluminum and magnesium.

The reducing agent may be used in an amount of 0.5 to 5 equivalents, preferably 1 to 3 equivalents, and more preferably about 1.5 equivalents per equivalent of reactive terminal group in the fluoropolyether group-containing polymer having iodine at one end or both ends of the molecular chain.

Examples of the reagent which can be used in converting the substituent on the silyl group to a hydrolyzable group include alcohols of 1 to 10 carbon atoms such as methanol, ethanol, propanol, isopropanol and butanol.

The amount of the reagent used may be preferably 10 to 200 parts by weight, more preferably 40 to 100 parts by weight per 100 parts by weight of the reaction product of the fluoropolyether group-containing polymer having iodine at one end or both ends of the to molecular chain with the organosilicon compound and the polyether compound.

The fluoropolyether group-containing polymers having a hydrolyzable group and a polyether group, represented by formulae (1) and (2) encompass the following structures. A series of fluoropolyether group-containing polymers having a hydrolyzable group and a polyether group are available by changing a combination of $Rf^1$, N, V, E, Q, G, E' and B in formula (1) or (2). In the following formulae, p1 is an integer of 5 to 100, q1 is an integer of 5 to 100, p1+q1 is an integer of 10 to 105, r1 is an integer of 0 to 100, s1 is an integer of 0 to 100, and p1+q1+r1+s1 is an integer of 10 to 200. Appropriate values of p1+q1 and p1+q1+r1+s1 for each formula are shown in parentheses.

[Chem. 35]

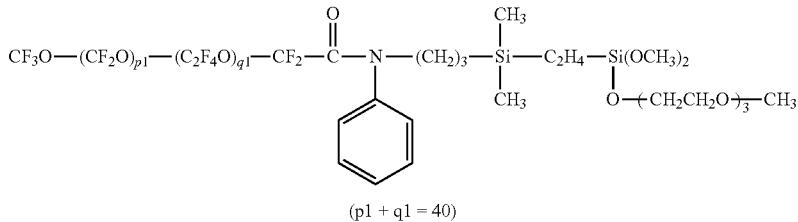

(p1 + q1 = 40)

[Chem. 36]

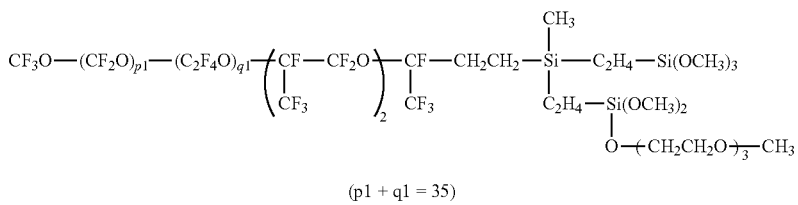

(p1 + q1 = 35)

-continued
[Chem. 37]
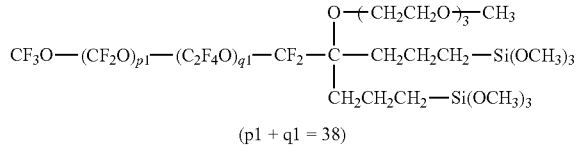
(p1 + q1 = 38)
[Chem. 38]
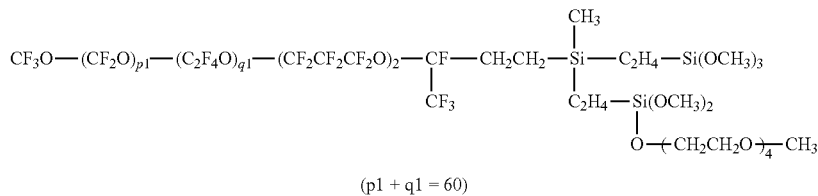
(p1 + q1 = 60)
[Chem. 39]
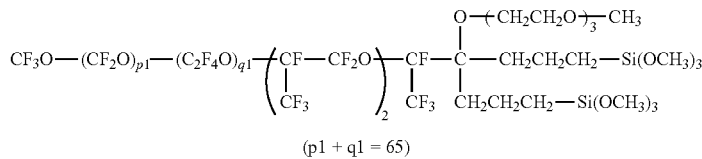
(p1 + q1 = 65)
[Chem. 40]
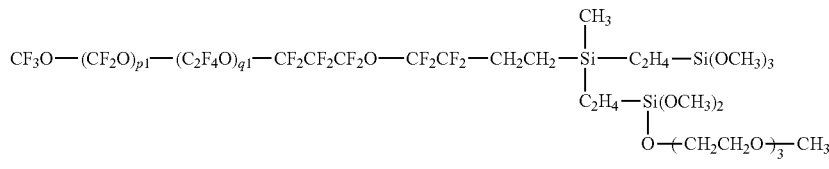
(p1 + q1 = 75)
[Chem. 41]
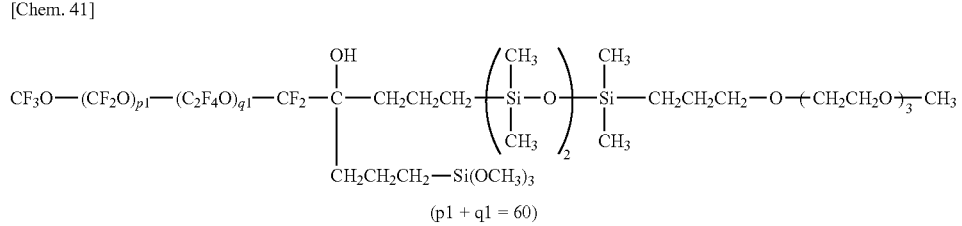
(p1 + q1 = 60)
[Chem. 42]
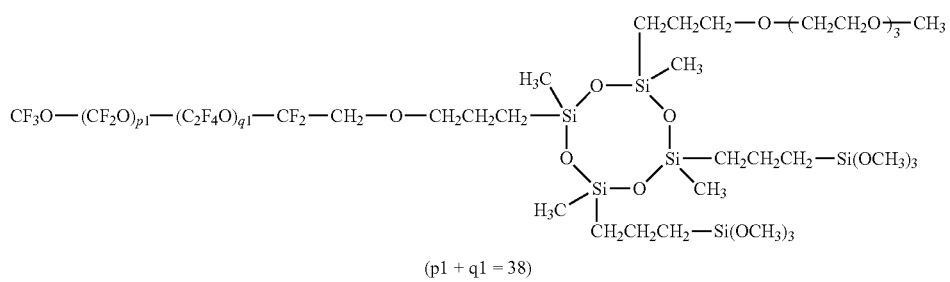
(p1 + q1 = 38)
[Chem. 43]
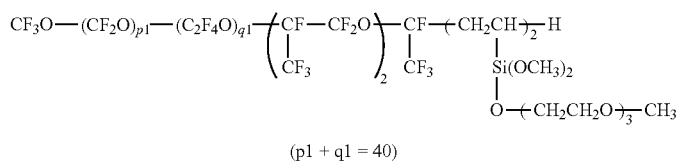
(p1 + q1 = 40)

[Chem. 44]
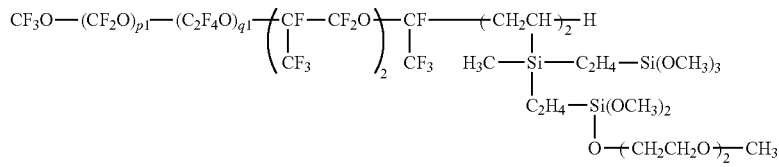
(p1 + q1 = 65)
[Chem. 45]
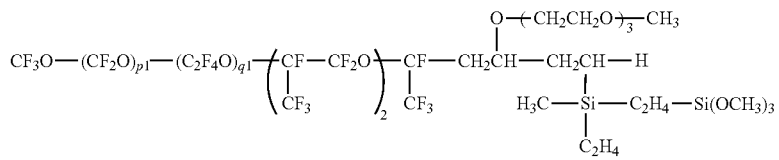
(p1 + q1 = 40)
[Chem. 46]
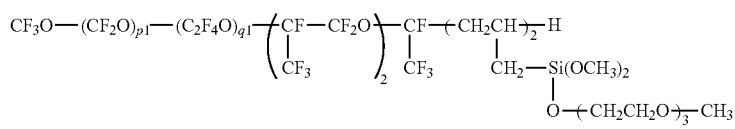
(p1 + q1 = 80)
[Chem. 47]
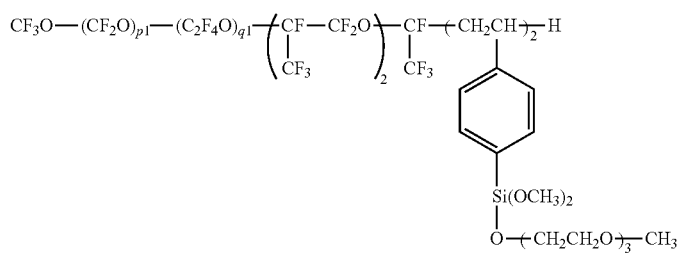
(p1 + q1 = 70)
[Chem. 48]
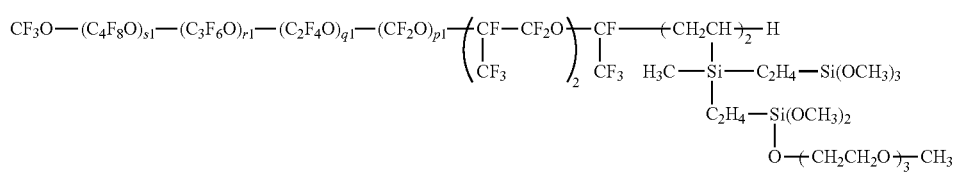
(p1 + q1 + r1 + s1 = 80)
[Chem. 49]
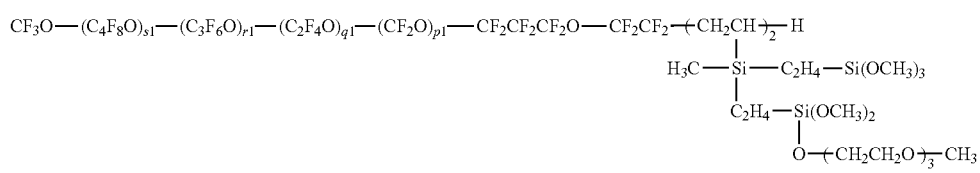
(p1 + q1 + r1 + s1 = 45)
[Chem. 50]
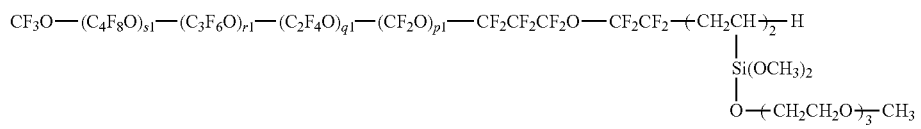
(p1 + q1 + r1 + s1 = 80)

-continued
[Chem. 51]
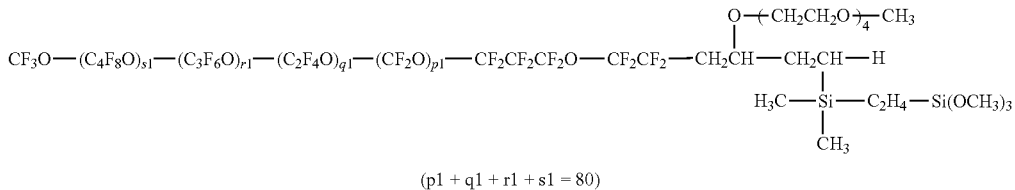
(p1 + q1 + r1 + s1 = 80)
[Chem. 52]
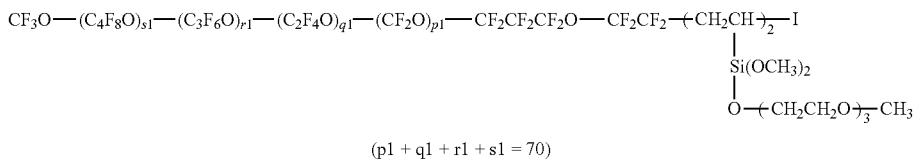
(p1 + q1 + r1 + s1 = 70)
[Chem. 53]
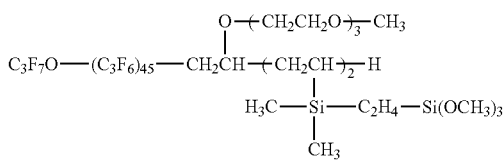
[Chem. 54]
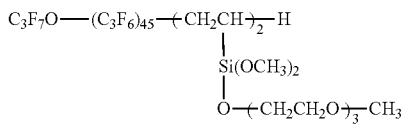
[Chem. 55]
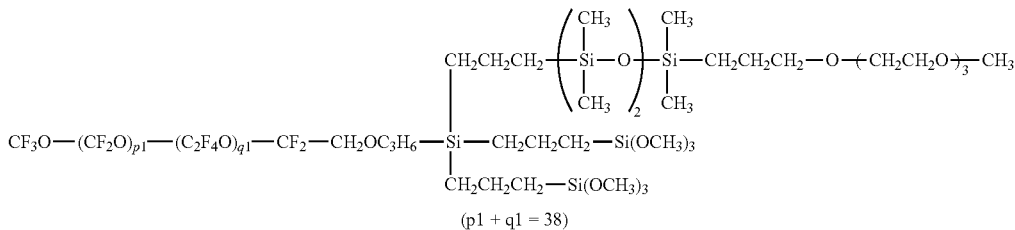
(p1 + q1 = 38)
[Chem. 56]
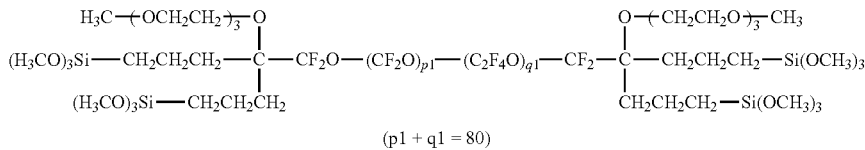
(p1 + q1 = 80)
[Chem. 57]
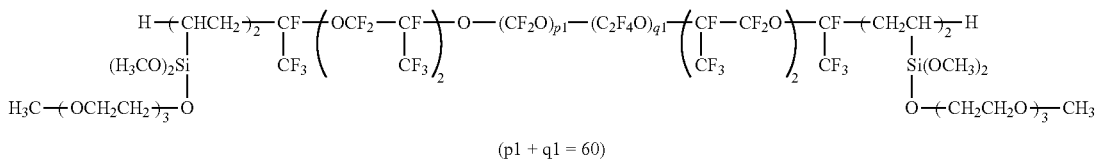
(p1 + q1 = 60)

In the formulae, each unit in parentheses may be randomly bonded.

In a preferred embodiment of the invention, the fluoropolyether group-containing polymer is represented by the general formula (3).

[Chem. 58]

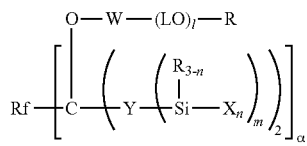

(3)

Herein Rf is a mono- or divalent fluorooxyalkylene group-containing polymer residue, Y is independently a di- to hexavalent hydrocarbon group which may contain a silicon atom and/or siloxane bond, W is independently a single bond, siloxane bond or silylene group, L is independently $C_1$-$C_4$ alkylene group, l is an integer of 1 to 20, R is independently to $C_1$-$C_4$ alkyl or phenyl group, X is independently a hydroxyl or hydrolyzable group, n is an integer of 1 to 3, m is an integer of 1 to 5, and $\alpha$ is 1 or 2.

When $\alpha$ is 1, Rf is preferably a monovalent fluorooxyalkylene group-containing polymer residue having the general formula (4):

[Chem. 59]

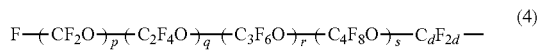

(4)

wherein p, q, r and s each are an integer of 0 to 200, p+q+r+s is 3 to 200, each of the repeating units associated with p, q, r and s may be linear or branched, individual repeating units may be randomly bonded, d is an integer of 1 to 3, the unit associated with d may be linear or branched.

When $\alpha$ is 2, Rf is preferably a divalent fluorooxyalkylene group-containing polymer residue having the general formula (5):

[Chem. 60]

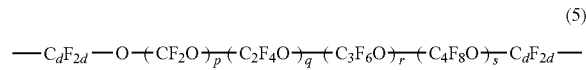

(5)

wherein p, q, r and s each are an integer of 0 to 200, p+q+r+s is 3 to 200, each of the repeating units associated with p, q, r and s may be linear or branched, individual repeating units may be randomly bonded, d is an integer of 1 to 3, the unit associated with d may be linear or branched.

In formulae (4) and (5), p, q, r and s each are an integer of 0 to 200, preferably β is an integer of 5 to 100, q is an integer of 5 to 100, r is an integer of 0 to 100, s is an integer of 0 to 100, p+q+r+s is 3 to 200, preferably 10 to 100, each of the repeating units associated with p, q, r and s may be linear or branched, and individual repeating units may be randomly bonded. More preferably, p+q is an integer of 10 to 105, especially 15 to 60, and r=s=0. A value of p+q+r+s which is no more than the upper limit is preferable because adhesion and curability are satisfactory. A value of p+q+r+s which is no less than the lower limit is preferable because the characteristics of fluoropolyether group (mono- or divalent fluorooxyalkylene group-containing polymer residue) are fully exerted.

In formulae (4) and (5), d is an integer of 1 to 3, preferably 1 or 2, and the unit associated with d may be linear or branched.

Exemplary of Rf are groups as shown below.

[Chem. 61]

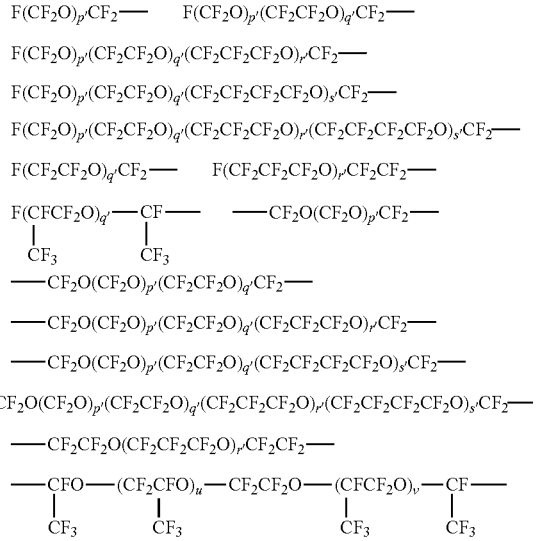

Herein p', q', r' and s' each are an integer of at least 1, their upper limits are the same as the upper limits of p, q, r and s; u is an integer of 1 to 24, v is an integer of 1 to 24, and individual repeating units may be randomly bonded.

In formula (3), Y is a di- to hexavalent, preferably di- to tetravalent, more preferably divalent, hydrocarbon group which may contain a silicon atom and/or siloxane bond. Because of the exclusion of a linking group (such as ether bond) having a low bond energy in the molecule, a coating film having improved abrasion resistance is available.

Specifically, Y is a $C_3$-$C_{10}$ alkylene group such as propylene, butylene or hexamethylene group, an alkylene group containing $C_6$-$C_8$ arylene group like phenylene group (e.g., alkylene-arylene groups of 8 to 16 carbon atoms), a divalent group having to alkylene moieties bonded via a silalkylene structure or silarylene structure, or a di- to hexavalent group having a $C_2$-$C_{10}$ alkylene moiety bonded to the valence bond of a di- to hexavalent linear, branched or cyclic organopolysiloxane residue of 2 to 10 silicon atoms, preferably 2 to 5 silicon atoms; preferably a $C_3$-$C_{10}$ alkylene group, an alkylene group containing phenylene group, a divalent group having alkylene moieties bonded via a silalkylene or silarylene structure, a di- to tetravalent group having a $C_2$-$C_{10}$ alkylene moiety bonded to the valence bond of a di- to tetravalent linear organopolysiloxane residue of 2 to 10 silicon atoms, or a di- to tetravalent group having a $C_2$-$C_{10}$ alkylene moiety bonded to the valence bond of a di- to tetravalent branched or cyclic organopolysiloxane residue of 3 to 10 silicon atoms; most preferably a $C_3$-$C_6$ alkylene group.

The silalkylene or silarylene structure is exemplified by the following structure.

[Chem. 62]

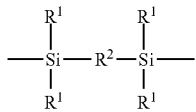

Herein $R^1$ which may be the same or different is a $C_1$-$C_4$ alkyl group such as methyl, ethyl, propyl or butyl group, or a $C_6$-$C_{10}$ aryl group such as phenyl group. $R^2$ is a $C_1$-$C_4$ alkylene group such as methylene, ethylene, or propylene (trimethylene, methylethylene) group, or a $C_6$-$C_{10}$ arylene group such as phenylene group.

Examples of the di- to hexavalent linear, branched or cyclic organopolysiloxane residue of 2 to 10 silicon atoms, preferably 2 to 5 silicon atoms are shown below.

[Chem. 63]

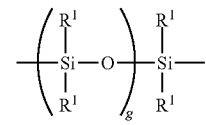

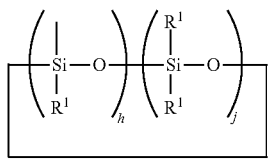

[Chem. 64]

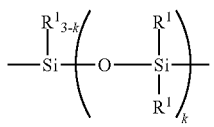

Herein $R^1$ is as defined above, g is an integer of 1 to 9, preferably 1 to 4, h is an integer of 2 to 6, preferably 2 to 4, j is an integer of 0 to 8, preferably 0 or 1, h+j is an integer of 3 to 10, to preferably 3 to 5, and k is an integer of 1 to 3, preferably 2 or 3.

Exemplary of Y are groups as shown below.

[Chem. 65]

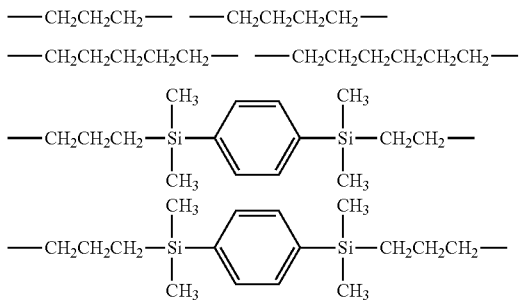

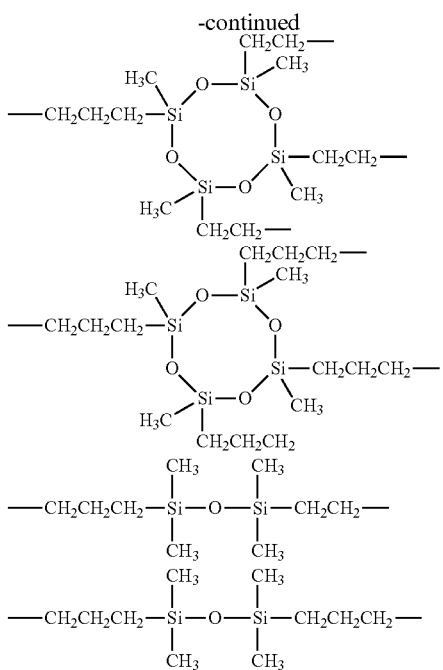

In formula (3), W is independently a single bond, siloxane bond or silylene group, specifically selected from among a single bond, a di- to tetravalent linear organopolysiloxane residue of 2 to 10 silicon atoms, a di- to tetravalent branched or cyclic organopolysiloxane residue of 3 to 10 silicon atoms, a linear silalkylene residue of 2 to 10 silicon atoms, and a silarylene residue of 2 to 10 silicon atoms. Preferably W is a single bond or a linear organopolysiloxane, silalkylene or silarylene residue of 2 to 4 silicon atoms, most preferably a single bond.

The linear organopolysiloxane residue of 2 to 10 silicon atoms, preferably 2 to 4 silicon atoms, di- to tetravalent branched or cyclic organopolysiloxane residue of 2 to 10 silicon atoms, and silalkylene and silarylene structures of 2 to 10 silicon atoms are as exemplified above.

Examples of the siloxane bond and silylene group (inclusive of silalkylene and silarylene structures) represented by W include groups as shown below.

[Chem. 66]

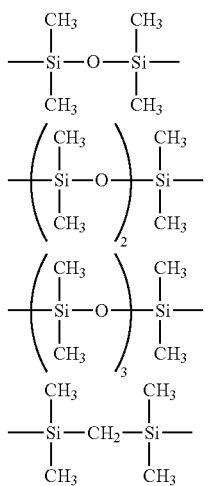

-continued

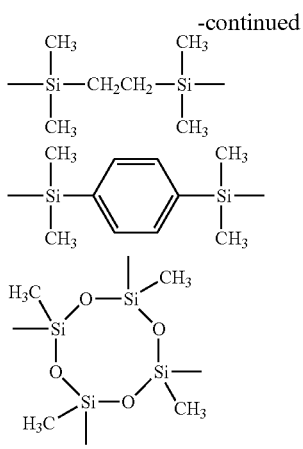

In formula (3), L is a $C_1$-$C_4$ alkylene group such as methylene, ethylene, propylene or butylene group, in which the carbon count may be single or plural. From the standpoint of compatibility with the fluorine chain, l is an integer of 1 to 20, preferably an integer of 1 to 10.

In formula (3), X which may be different is a hydroxyl or hydrolyzable group. Exemplary groups of X include hydroxyl, $C_1$-$C_{10}$ alkoxy groups such as methoxy, ethoxy, propoxy, isopropoxy and butoxy group, $C_2$-$C_{10}$ alkoxylalkoxy groups such as methoxymethoxy and methoxyethoxy group, $C_1$-$C_{10}$ acyloxy groups such as acetoxy group, $C_2$-$C_{10}$ alkenyloxy groups such as isopropenoxy group, and halogen groups such as chloro, bromo and iodo group. Inter alia, methoxy, ethoxy, isopropenoxy and chloro groups are preferred.

In formula (3), R is a $C_1$-$C_4$ alkyl group such as methyl, ethyl, propyl or butyl, or a phenyl group, with methyl group being preferred. The subscript n is an integer of 1 to 3, preferably 2 or 3. It is more preferable from the standpoints of reactivity and adhesion to substrates that n be equal to 3.

The subscript m is an integer of 1 to 5. A value of m of less than 1 leads to poor adhesion to substrates whereas a value of m of equal to or more than 6 gives a too high terminal alkoxy value adversely affecting performance. Preferably m is an integer of 1 to 3, especially equal to 1.

Examples of the fluoropolyether group-containing polymer having formula (3) are shown by the following formulae. In each formula, the number of repetition of repeating units of which the fluorooxyalkyl or fluorooxyalkylene group (mono- or divalent fluorooxyalkylene group-containing polymer residue) is composed, also referred to as degree of polymerization, may be an arbitrary number meeting the above formula (4) or (5).

[Chem. 67]

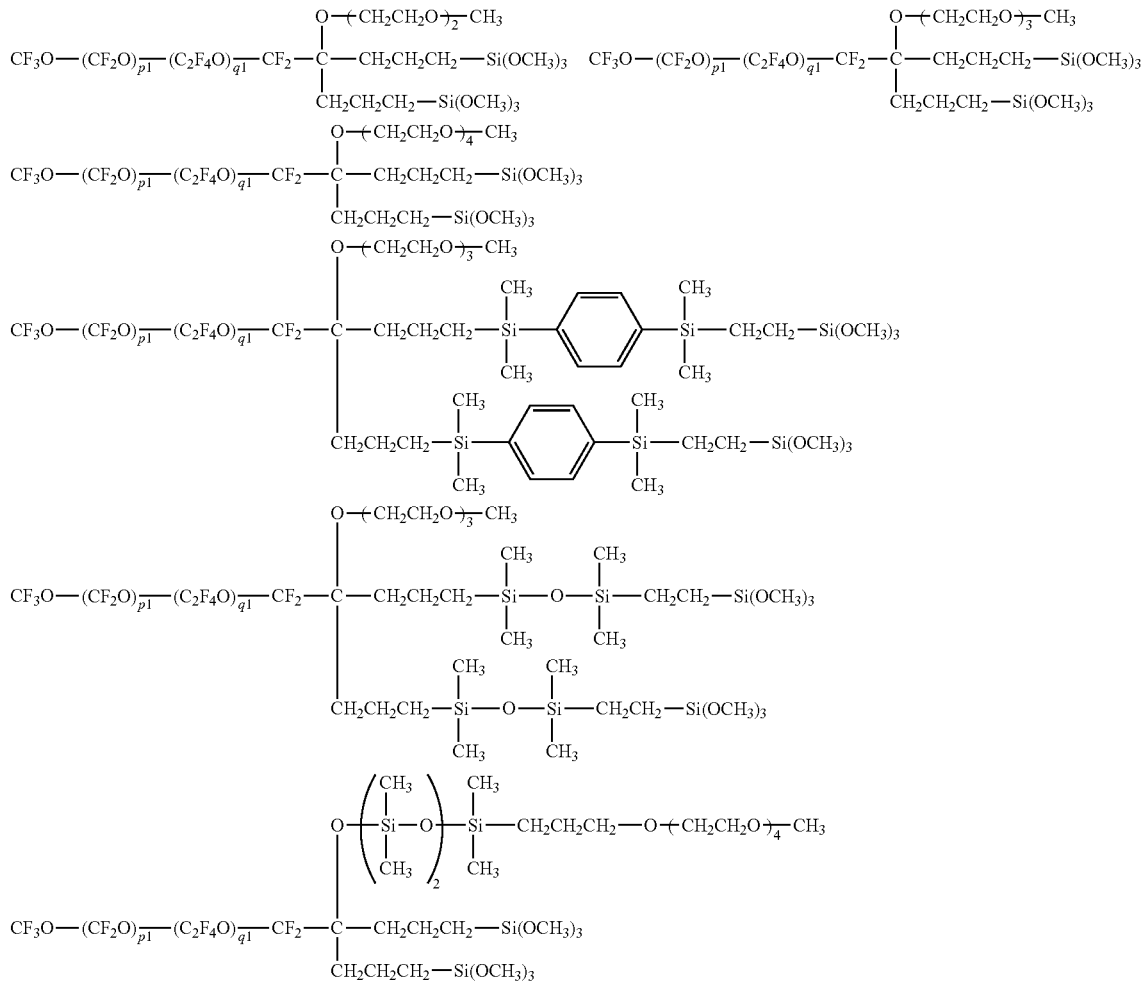

[Chem. 68]

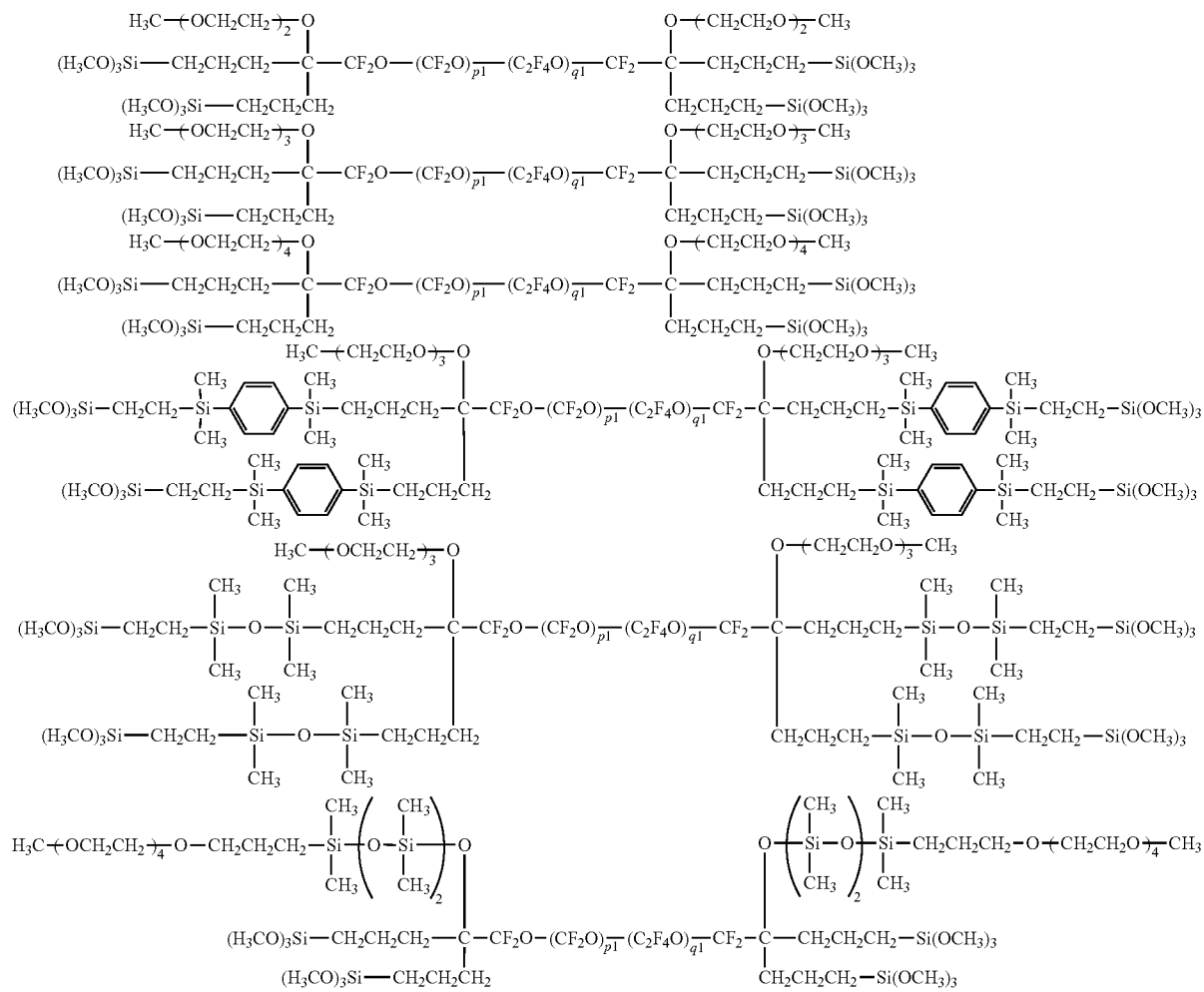

Herein p1 is an integer of 5 to 100, q1 is an integer of 5 to 100, and p1+q1 is an integer of 10 to 105.

The fluoropolyether group-containing polymer of formula (3) wherein α=1 (i.e., Rf is a monovalent fluorooxyalkylene group-containing polymer residue) may be prepared, for example, by the following method.

A fluorooxyalkyl group-containing polymer having two olefin sites and a polyether group at one end of the molecular chain is dissolved in a solvent such as fluorochemical solvent, typically 1,3-bis(trifluoromethyl)benzene. The solution is mixed with an organosilicon compound having a SiH group and a hydrolyzable terminal group in the molecule such as trimethoxysilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours.

Alternatively, the fluoropolyether group-containing polymer of formula (3) wherein α=1 may be prepared, for example, by the following method.

A fluorooxyalkyl group-containing polymer having two olefin sites and a polyether group at one end of the molecular chain is dissolved in a solvent such as fluorochemical solvent, typically 1,3-bis(trifluoromethyl)benzene. The solution is mixed with an organosilicon compound having a SiH group and a hydrolyzable terminal group (halogen atom) in the molecule such as trichlorosilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours. After aging, the substituent (halogen atom) on the silyl group may be converted to a methoxy group, for example.

It is noted that a SiH group-containing organosilicon compound free of a hydrolyzable terminal group may be used instead of the organosilicon compound having a SiH group and a hydrolyzable terminal group in the molecule. In this case, an organosilicon compound containing at least two SiH groups, but not a hydrolyzable terminal group in the molecule may be used as the organosilicon compound. Like the above-described method, the fluorooxyalkyl group-containing polymer having two olefin sites and a polyether group at one end of the molecular chain and the organosilicon compound containing at least two SiH groups, but not a hydrolyzable terminal group in the molecule are reacted to form a reaction product, after which the reaction product having SiH groups at the polymer end is mixed with an organosilicon compound having an olefin site and a hydrolyzable terminal group in the molecule, such as allyltrimethoxysilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours.

Examples of the fluorooxyalkyl group-containing polymer having two olefin sites and a polyether group at one end of the molecular chain include fluorooxyalkyl group-containing polymers having the general formula (8).

[Chem. 69]

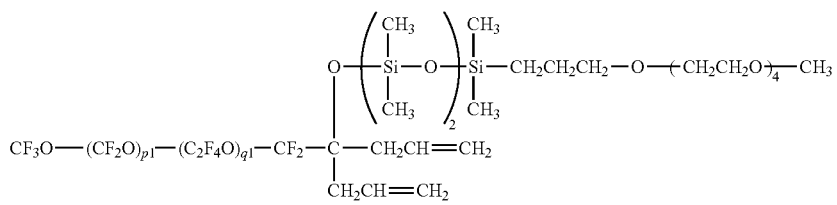

Herein Rf, W, L, 1 and R are as defined above, and Z is a divalent hydrocarbon group which may contain a silicon atom and/or siloxane bond.

In formula (8), Z is a divalent hydrocarbon group, preferably a divalent hydrocarbon group of 1 to 8 carbon atoms, especially 1 to 4 carbon atoms. Examples include $C_1$-$C_8$ alkylene groups such as methylene, ethylene, propylene (trimethylene, methylethylene), butylene (tetramethylene, methylpropylene), hexamethylene, octamethylene group, $C_6$-$C_8$ arylene groups such as phenylene group, and alkylene groups containing $C_6$-$C_8$ arylene group such as phenylene group (e.g., alkylene-arylene groups of 7 to 8 carbon atoms). Z is more preferably a linear $C_1$-$C_4$ alkylene group.

Preferred examples of the fluorooxyalkyl group-containing polymer having formula (8) are shown by the following formulae. In each formula, the repetition number of repeating units of which the fluorooxyalkyl group (monovalent fluorooxyalkylene group-containing polymer residue) is composed, also referred to as degree of polymerization, may be an arbitrary number meeting formula (4) representative of Rf.

[Chem. 70]

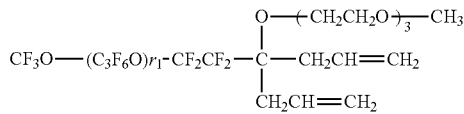

[Chem. 71]

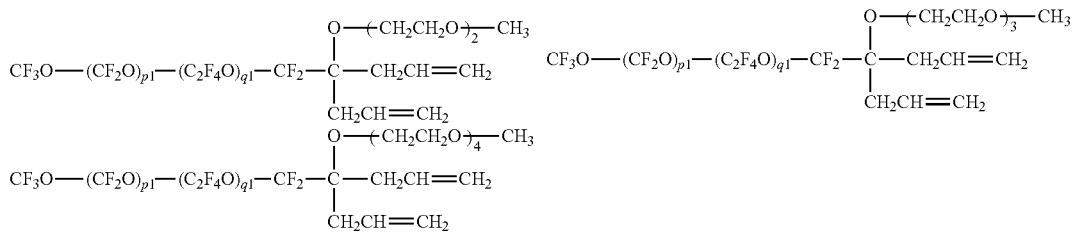

[Chem. 72]

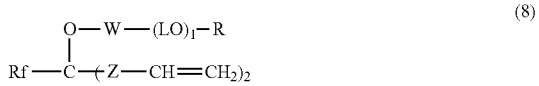

Herein r1, p1 and q1 are as defined above.

The fluorooxyalkyl group-containing polymer having formula (8) may be prepared, for example, by mixing a fluorooxyalkyl group-containing polymer having a hydroxyl group at one end of the molecular chain with a polyether-providing agent, and aging the mixture in the presence of a base, and optionally a reactivity-enhancing additive and a solvent, at a temperature of 0 to 90° C., preferably 60 to 80° C., and more preferably about 70° C. for 1 to 48 hours, preferably 10 to 40 hours, and more preferably about 25 hours.

Alternatively, the fluorooxyalkyl group-containing polymer having formula (8) may to be prepared, for example, by mixing a fluorooxyalkyl group-containing polymer having a hydroxyl group at one end of the molecular chain with an organosilicon compound having at least two SiH groups, but not a hydrolyzable terminal group in the molecule, and subjecting the mixture to dehydrogenation reaction in the presence of a dehydrogenation catalyst and optionally a solvent, at a temperature of 0 to 60° C., preferably 15 to 35° C., and more preferably about 25° C. for 10 minutes to 24 hours, preferably 30 minutes to 2 hours, and more preferably about 1 hour, thereby yielding a fluorooxyalkyl group-containing polymer having a SiH group at one end of the molecular chain.

Subsequently, the fluorooxyalkyl group-containing polymer having a SiH group at one end of the molecular chain and a polyether compound having an olefin site in the molecule (e.g., polyalkylene oxide compound blocked with an alkenyloxy group at one end of the molecular chain) are dissolved in a solvent such as fluorochemical solvent, typically 1,3-bis(trifluoromethyl)benzene. The solution is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours.

Examples of the fluorooxyalkyl group-containing polymer having a hydroxyl group at one end of the molecular chain used in the preparation of the fluorooxyalkyl group-containing polymer having formula (8) are shown by the following formulae.

[Chem. 73]

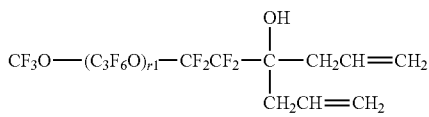

[Chem. 74]

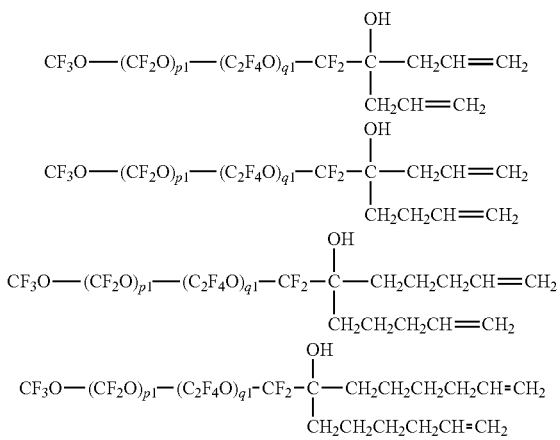

Herein r1, p1 and q1 are as defined above.

The fluorooxyalkyl group-containing polymer having a hydroxyl group at one end of the molecular chain may be prepared, for example, by mixing a perfluorooxyalkyl group-containing polymer having an acid fluoride group (—C(=O)—F) at one end of the molecular chain with a Grignard reagent as a nucleophilic reagent and a solvent such as 1,3-bis(trifluoromethyl)benzene or tetrahydrofuran, and aging the mixture at 0 to 80° C., preferably 50 to 70° C., and more preferably about 60° C. for 1 to 6 hours, preferably 3 to 5 hours, and more preferably about 4 hours.

While the perfluorooxyalkyl group-containing polymer has an acid fluoride group at one end of the molecular chain as mentioned above, an acid halide, acid anhydride, ester, carboxylic acid or amide group may also be used as the group at one end.

Examples of the perfluorooxyalkyl group-containing polymer having such a group at one end of the molecular chain are shown below.

[Chem. 75]

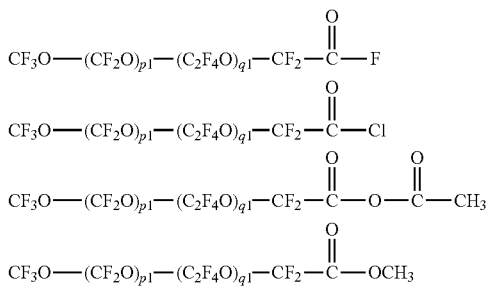

-continued

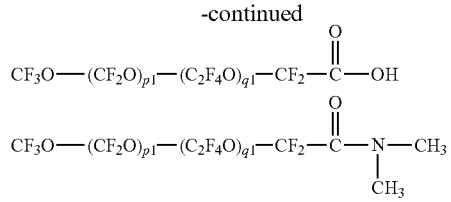

Herein p1 and q1 are as defined above.

The nucleophilic reagent used in the preparation of the fluorooxyalkyl group-containing polymer having a hydroxyl group at one end of the molecular chain may be selected from allylmagnesium halides, 3-butenylmagnesium halides, 4-pentenylmagnesium halides, and 5-hexenylmagnesium halides, for example. Corresponding lithium reagents may also be used.

The nucleophilic reagent may be used in an amount of 2 to 5 equivalents, preferably 2.5 to 3.5 equivalents, and more preferably about 3 equivalents per equivalent of reactive terminal group on the perfluorooxyalkyl group-containing polymer.

As the solvent used in the preparation of the fluorooxyalkyl group-containing polymer having a hydroxyl group at one end of the molecular chain, suitable fluorochemical solvents include 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M). Organic solvents are also useful, for example, ether solvents such as tetrahydrofuran (THF), monoethylene glycol dimethyl ether, diethylene glycol dimethyl ether, triethylene glycol dimethyl ether, tetraethylene glycol dimethyl ether, and dioxane.

The solvent may be used in an amount of 10 to 300 parts, preferably 100 to 200 parts, and more preferably about 150 parts by weight per 100 parts by weight of the perfluorooxyalkyl group-containing polymer.

Subsequently, the reaction is stopped. The reaction solution is separated into a water layer and a fluorochemical solvent layer by separatory operation. The fluorochemical solvent layer is washed with an organic solvent before the solvent is distilled off, yielding a fluorooxyalkyl group-containing polymer having a hydroxyl group at one end of the molecular chain.

The polyether-providing agent used in the preparation of the fluorooxyalkyl group-containing polymer having formula (8) is selected from, for example, polyether halides such as 2-bromoethyl methyl ether, ethylene glycol 2-bromoethyl methyl ether, diethylene glycol 2-bromoethyl methyl ether, and triethylene glycol 2-bromoethyl methyl ether.

The polyether-providing agent may be used in an amount of 1 to 15 equivalents, preferably 3 to 9 equivalents, more preferably about 6 equivalents per equivalent of reactive terminal group on the fluorooxyalkyl group-containing polymer having a hydroxyl group at one end of the molecular chain.

Examples of the base used in the preparation of the fluorooxyalkyl group-containing polymer having formula (8) include amines and alkali metal bases. Specifically, suitable amines include triethylamine, diisopropylethylamine, pyridine, DBU and imidazole. Suitable alkali metal bases include sodium hydroxide, potassium hydroxide, sodium hydride, potassium hydride, alkyl lithium, t-butoxypotassium, lithium diisopropylamide, lithium bis(trimethylsilyl)amide, sodium bis(trimethylsilyl)amide, and potassium bis(trimethylsilyl)amide.

The base may be used in an amount of 1 to 20 equivalents, more preferably 10 to 18 equivalents, even more preferably about 15 equivalents per equivalent of reactive terminal group on the fluorooxyalkyl group-containing polymer having a hydroxyl group at one end of the molecular chain.

In preparing the fluorooxyalkyl group-containing polymer having formula (8), tetrabutylammonium halides and alkali metal base halides may be used as the reactivity-enhancing additive. Specifically, suitable additives include tetrabutylammonium chloride, tetrabutylammonium bromide, tetrabutylammonium iodide, tetrabutylammonium, tetrabutylammonium hydrogensulfate, sodium iodide, potassium iodide, cesium iodide, and crown ethers. These additives enhance reactivity through catalytic halogen exchange with the olefin-providing agent in the reaction system. The crown ethers enhance reactivity through coordination to the metal.

The additive may be used in an amount of 0.005 to 0.1 equivalent, more preferably 0.01 to 0.05 equivalent, even more preferably about 0.02 equivalent per equivalent of reactive terminal group on the fluorooxyalkyl group-containing polymer having a hydroxyl group at one end of the molecular chain.

A solvent may be used in the preparation of the fluorooxyalkyl group-containing polymer having formula (8). The solvent is often used although it is not essential. Suitable fluorochemical solvents include fluorinated aromatic hydrocarbon solvents such as 1,3-bis(trifluoromethyl)benzene and trifluoromethylbenzene, hydrofluoroether (HFE) solvents (trade name: Novec series from 3M) such as 1,1,1,2,3,4,4,5,5,5-decafluoro-3-methoxy-2-(trifluoromethyl)pentane, and perfluoro solvents composed of perfluorinated compounds (trade name: Fluorinert series from 3M). Further, organic solvents may also be used, for example, dimethylformamide, dimethylacetamide, dimethyl sulfoxide, acetonitrile, and THF.

The solvent may be used in an amount of 10 to 300 parts, preferably 30 to 150 parts, and more preferably about 50 parts by weight per 100 parts by weight of the fluorooxyalkyl group-containing polymer having a hydroxyl group at one end of the molecular chain.

While the fluorooxyalkyl group-containing polymer having formula (8) is prepared by reaction of a fluorooxyalkyl group-containing polymer having a hydroxyl group at one end of the molecular chain with an organosilicon compound having at least two SiH groups, but not a hydrolyzable terminal group in the molecule, the organosilicon compound having at least two SiH groups, but not a hydrolyzable terminal group in the molecule is preferably exemplified by those compounds having the general formulae (9) to (11).

[Chem. 76]

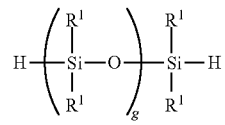

(9)

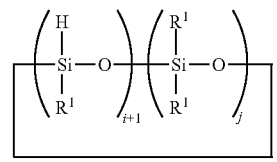

Herein $R^1$, $R^2$, g and j are as defined above, i is an integer of 2 to 9, preferably 2 to 4, and i+j is an integer of 2 to 9.

Examples of the organosilicon compound having at least two SiH groups, but not a hydrolyzable terminal group in the molecule are shown below.

[Chem. 77]

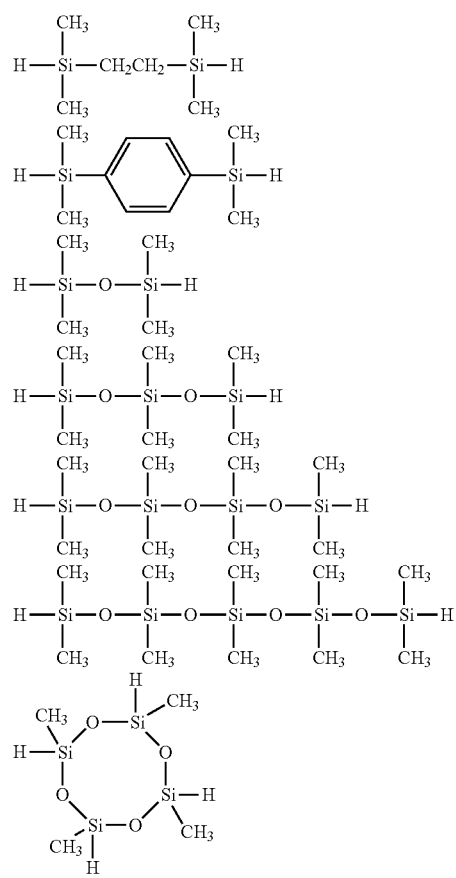

While the fluorooxyalkyl group-containing polymer having formula (8) is prepared by reaction of a fluorooxyalkyl group-containing polymer having a hydroxyl group at one end of the molecular chain with an organosilicon compound having at least two SiH groups, but not a hydrolyzable terminal group in the molecule, the organosilicon compound having at least two SiH groups, but not a hydrolyzable terminal group in the molecule may be used in an amount of 7 to 30 equivalents, preferably 5 to 20 equivalents, more preferably about 10 equivalents per equivalent of reactive terminal group on the fluorooxyalkyl group-containing polymer having a hydroxyl group at one end of the molecular chain.

Examples of the dehydrogenation catalyst used in the preparation of the fluorooxyalkyl group-containing polymer having formula (8) are platinum group metal based catalysts such as rhodium, palladium and ruthenium catalysts, and boron catalysts. Suitable platinum group metal based catalysts include tetrakis(triphenylphosphine)palladium and chlorotris(triphenylphosphine)rhodium, and suitable boron catalysts include tris(pentafluorophenyl)borane.

The dehydrogenation catalyst may be used in an amount of 0.01 to 0.0005 equivalent, preferably 0.007 to 0.001 equivalent, and more preferably about 0.005 equivalent per equivalent of reactive terminal group on the fluorooxyalkyl group-containing polymer having a hydroxyl group at one end of the molecular chain.

Subsequently, the reaction is stopped. The reaction solution is separated into a water layer and a fluorochemical solvent layer by separatory operation. The fluorochemical solvent layer is washed with an organic solvent before the solvent is distilled off, yielding a fluorooxyalkyl group-containing polymer having a SiH group at one end of the molecular chain.

While the fluorooxyalkyl group-containing polymer having formula (8) is prepared by reaction of a fluorooxyalkyl group-containing polymer having a SiH group at one end of the molecular chain with a polyether compound having an olefin site in the molecule, examples of the polyether compound having an olefin site in the molecule include polyalkylene oxide compounds blocked with an alkenyloxy group at one end of the molecular chain such as polyethylene oxides blocked with an allyloxy group at one end and with a methoxy group at the other end of the molecular chain, as shown below.

[Chem. 78]

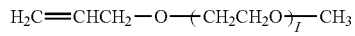

Herein l is as defined above.

Examples of the polyether compounds having an olefin site in the molecule such as polyalkylene oxide compounds blocked with an alkenyloxy group at one end of the molecular chain include Uniox MA-200, Uniox MA-300, Uniox MA-350S and Uniox MA-500 from NOF Corp.

The polyether compound having an olefin site in the molecule may be used in an amount of 1 to 10 equivalents, preferably 2 to 5 equivalents, more preferably about 3 equivalents per equivalent of reactive terminal group on the fluorooxyalkyl group-containing polymer having a SiH group at one end of the molecular chain.

While the fluorooxyalkyl group-containing polymer having formula (8) is prepared by reaction of a fluorooxyalkyl group-containing polymer having a SiH group at one end of the molecular chain with a polyether compound having an olefin site in the molecule, examples of the hydrosilylation catalyst used in the reaction include platinum group metal based catalysts such as platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluorooxyalkyl group-containing polymer having a SiH group at one end of the molecular chain.

As the solvent used in the preparation of the fluoropolyether group-containing polymer of formula (3) wherein α=1 (i.e., Rf is a monovalent fluorooxyalkylene group-containing polymer residue), fluorochemical solvents are suitable, including 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 10 to 300 parts, preferably 50 to 150 parts, and more preferably about 100 parts by weight per 100 parts by weight of the fluorooxyalkyl group-containing polymer having two olefin sites and a polyether group at one end of the molecular chain.

Preferred examples of the organosilicon compound having a SiH group and a hydrolyzable terminal group in the molecule, which is used in the preparation of the fluoropolyether group-containing polymer of formula (3) wherein α=1, include compounds having the general formulae (12) to (15).

[Chem. 79]

  (12)

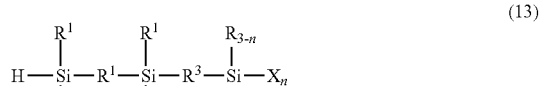  (13)

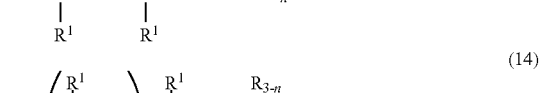  (14)

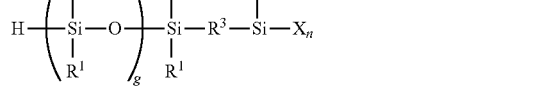  (15)

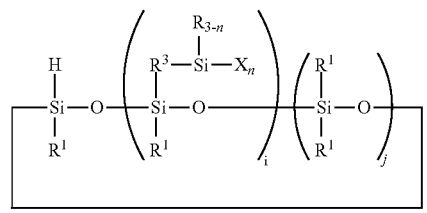

Herein R, χ, n, R', R$^2$, g, i, j, and i+j are as defined above, and R$^3$ is a C$_2$-C$_8$ divalent hydrocarbon group.

Examples of the C$_2$-C$_8$, preferably C$_2$-C$_3$, divalent hydrocarbon group represented by R$^3$ include alkylene groups such as methylene, ethylene, propylene (trimethylene, methylethylene), butylene (tetramethylene, methylpropylene), hexamethylene, octamethylene group, arylene groups such as phenylene group, and combinations of at least two of the foregoing (e.g., alkylene-arylene groups). Inter alia, ethylene and trimethylene groups are preferred.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane. Also included are silanes as shown below.

[Chem. 80]

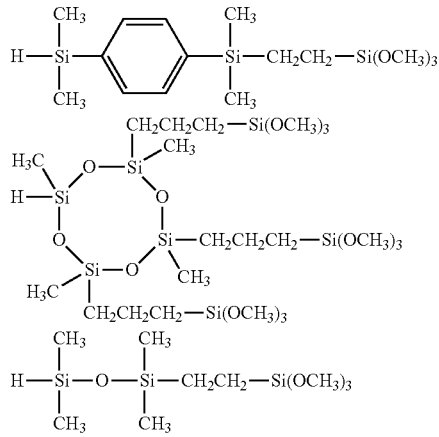

When the fluoropolyether group-containing polymer of formula (3) wherein α=1 is to prepared by reacting a fluorooxyalkyl group-containing polymer having two olefin sites and a polyether group at one end of the molecular chain with an organosilicon compound having a SiH group and a hydrolyzable terminal group in the molecule, the organosilicon compound having a SiH group and a hydrolyzable terminal group in the molecule may be used in an amount of 2 to 8 equivalents, preferably 3 to 5 equivalents, more preferably about 4 equivalents per equivalent of reactive terminal group on the fluorooxyalkyl group-containing polymer having two olefin sites and a polyether group at one end of the molecular chain.

Preferred examples of the organosilicon compound having at least two SiH groups, but not a hydrolyzable terminal group in the molecule, which is used in the preparation of the fluoropolyether group-containing polymer of formula (3) wherein α=1, include compounds having the general formulae (9) to (11).

[Chem. 81]

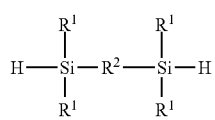 (9)

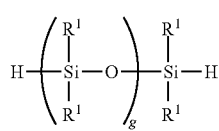 (10)

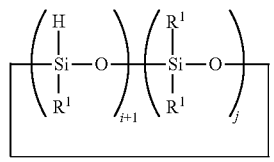 (11)

Herein $R^1$, $R^2$, g, j, i and i+j are as defined above.

Examples of the organosilicon compound having at least two SiH groups, but not a hydrolyzable terminal group in the molecule are shown below.

[Chem. 82]

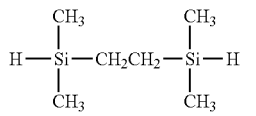

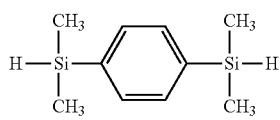

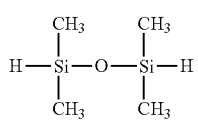

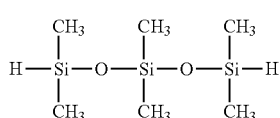

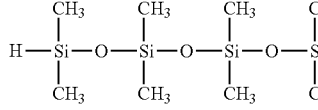

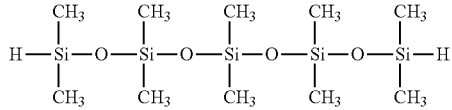

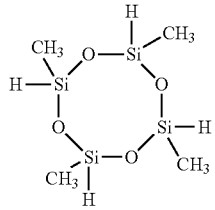

When the fluoropolyether group-containing polymer of formula (3) wherein α=1 is prepared by reacting a fluorooxyalkyl group-containing polymer having two olefin sites and a polyether group at one end of the molecular chain with an organosilicon compound having at least two SiH groups, but not a hydrolyzable terminal group in the molecule, the organosilicon compound having at least two SiH groups, but not a hydrolyzable terminal group in the molecule may be used in an amount of 7 to 30 equivalents, preferably 5 to 20 equivalents, more preferably about 10 equivalents per equivalent of reactive terminal group on the fluorooxyalkyl group-containing polymer having two olefin sites and a polyether group at one end of the molecular chain.

Preferred examples of the organosilicon compound having an olefin site and a hydrolyzable terminal group in the molecule, which is used in the preparation of the fluoropolyether group-containing polymer of formula (3) wherein α=1, include compounds having the general formula (16).

[Chem. 83]

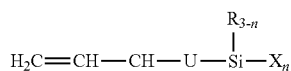

(16)

Herein R, X and n are as defined above, and U is a single bond or a $C_1$-$C_6$ divalent hydrocarbon group.

In formula (16), U is a single bond or a $C_1$-$C_6$ divalent hydrocarbon group, examples of which include alkylene groups such as methylene, ethylene, propylene (trimethylene, methylethylene), butylene (tetramethylene, methylpropylene) and hexamethylene group, and phenylene group. Preferably U is a single bond or methylene.

In the reaction of the reaction product between the fluorooxyalkyl group-containing polymer having two olefin sites and a polyether group at one end of the molecular chain and the organosilicon compound having at least two SiH groups, but not a hydrolyzable terminal group in the molecule with the organosilicon compound having an olefin site and a hydrolyzable terminal group in the molecule for preparation of the fluoropolyether group-containing polymer having formula (3) wherein α=1, the organosilicon compound having an olefin site and a hydrolyzable terminal group in the molecule may be used in an amount of 2 to 8 equivalents, preferably 3 to 5 equivalents, and more preferably about 4 equivalents per equivalent of reactive terminal group on the reaction product between the fluorooxyalkyl group-containing polymer having two olefin sites and a polyether group at one end of the molecular chain and the organosilicon compound having at least two SiH groups, but not a hydrolyzable terminal group in the molecule.

Typical of the hydrosilylation catalyst used in the preparation of a fluoropolyether group-containing polymer having formula (3) wherein α=1 are platinum group metal based catalysts including platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluorooxyalkyl group-containing polymer having two olefin sites and a polyether group at one end of the molecular chain or the reaction product between the polymer and the organosilicon compound having at least two SiH groups, but not a hydrolyzable terminal group in the molecule.

Thereafter, the solvent and unreacted reactants are distilled off in vacuum, yielding the target compound.

For example, when the fluorooxyalkyl group-containing polymer having two olefin sites and a polyether group at one end of the molecular chain is a compound having the formula:

[Chem. 84]

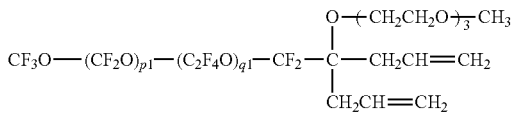

p1:q1 = 47:53, p1 + q1 ≈ 43 and the organosilicon compound having a SiH group and a hydrolyzable terminal group in the molecule is trimethoxysilane, a compound of the following formula is obtained.

[Chem. 85]

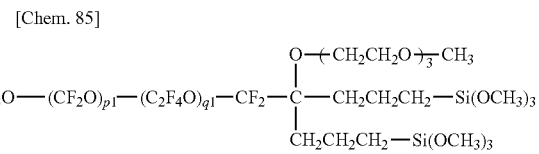

p1:q1 = 47:53, p1 + q1 ≈ 43

The fluoropolyether group-containing polymer having formula (3) wherein α=2 (i.e., Rf is a divalent fluorooxyalkylene group-containing polymer residue) may be prepared, for example, by the following method.

A fluorooxyalkylene group-containing polymer having two olefin sites and a polyether group at both ends of the molecular chain is dissolved in a solvent such as fluorochemical solvent, typically 1,3-bis(trifluoromethyl)benzene. The solution is mixed with an organosilicon compound having a SiH group and a hydrolyzable terminal group in the molecule such as trimethoxysilane. The mixture is aged in the presence of a hydrosilylation catalyst such as chloroplatinic acid/vinyl siloxane complex in toluene at a temperature of 40 to 120° C., preferably 60 to 100° C., and more preferably about 80° C. for 1 to 72 hours, preferably 20 to 36 hours, and more preferably about 24 hours.

Alternatively, the fluoropolyether group-containing polymer having formula (3) wherein α=2 may be prepared, for example, by the following method.

A fluorooxyalkylene group-containing polymer having two olefin sites and a polyether group at both ends of the molecular chain is dissolved in a solvent such as fluorochemical solvent, typically 1,3-bis(trifluoromethyl)benzene. The solution is mixed with an organosilicon compound having a SiH group and a hydrolyzable terminal group (halogen) in the molecule such as trichlorosilane. The mixture is aged in the presence of a hydrosilylation catalyst such as chloroplatinic acid/vinyl siloxane complex in toluene, at a temperature of 40 to 120° C., preferably 60 to 100° C., and more preferably about 80° C. for 1 to 72 hours, preferably 20 to 36 hours, and more preferably about 24 hours. Notably, after aging, the substituent (halogen) on the silyl group may be converted to methoxy, for example.

It is noted that an organosilicon compound containing a SiH group, but not a hydrolyzable terminal group may be used instead of the organosilicon compound having a SiH group and a hydrolyzable terminal group in the molecule. In this case, an organosilicon compound containing at least two SiH groups, but not a hydrolyzable terminal group in the molecule may be used as the organosilicon compound. Like the above-described method, the fluorooxyalkylene group-containing polymer having two olefin sites and a polyether group at both ends of the molecular chain is reacted with the organosilicon compound containing at least two SiH groups, but not a hydrolyzable terminal group in the molecule to form a reaction product having SiH groups at the polymer end, after which the reaction product is mixed with an organosilicon compound having an olefin site and a hydrolyzable terminal group in the molecule, such as allyltrimethoxysilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours.

Examples of the fluorooxyalkylene group-containing polymer having two olefin sites and a polyether group at both ends of the molecular chain include fluorooxyalkylene group-containing polymers having the general formula (17).

[Chem. 86]

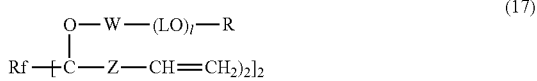

(17)

Herein Rf, W, L, 1, R, and Z are as defined above.

Preferred examples of the fluorooxyalkylene group-containing polymer having formula (17) are those of the formulae shown below. In each formula, the repetition number of repeating units of which the fluorooxyalkylene group (divalent fluorooxyalkylene group-containing polymer residue) is composed, also referred to as degree of polymerization, may be an arbitrary number meeting formula (5) representative of Rf.

Herein p1 and q1 are as defined above.

The method for preparing the fluorooxyalkylene group-containing polymer having formula (17) is, for example, by combining a fluorooxyalkylene group-containing polymer having a hydroxyl group at both ends of the molecular chain with a polyether-providing agent, and aging the mixture in the presence of a base and optionally a reactivity-enhancing additive and a solvent at a temperature of 0 to 90° C., preferably 60 to 80° C., and more preferably about 70° C. for 1 to 48 hours, preferably 10 to 40 hours, and more preferably about 25 hours.

An alternative method for preparing the fluorooxyalkylene group-containing polymer having formula (17) is by combining a fluorooxyalkylene group-containing polymer having a hydroxyl group at both ends of the molecular chain with an organosilicon compound having at least two SiH groups, but not a hydrolyzable terminal group in the molecule, and effecting dehydrogenation reaction in the presence of a dehydrogenation catalyst and optionally a solvent at a temperature of 0 to 60° C., preferably 15 to 35° C., and more preferably about 25° C. for 10 minutes to 24 hours, preferably 30 minutes to 2 hours, and more preferably about 1 hour. There is obtained a fluorooxyalkylene group-containing polymer having a SiH group at both ends of the molecular chain.

Subsequently, the fluorooxyalkylene group-containing polymer having a SiH group at both ends of the molecular chain and a polyether compound having an olefin site in the molecule (e.g., polyalkylene oxide compound blocked with an alkenyloxy group at one end of the molecule chain) are dissolved in a solvent such as fluorochemical solvent, typically 1,3-bis(trifluoromethyl)benzene. The solution is aged in the presence of a hydrosilylation catalyst such as chloroplatinic acid/vinyl siloxane complex in toluene, at a tem

[Chem. 87]

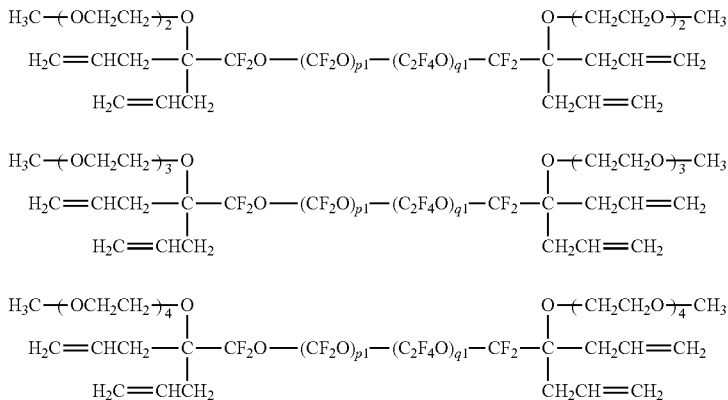

[Chem. 88]

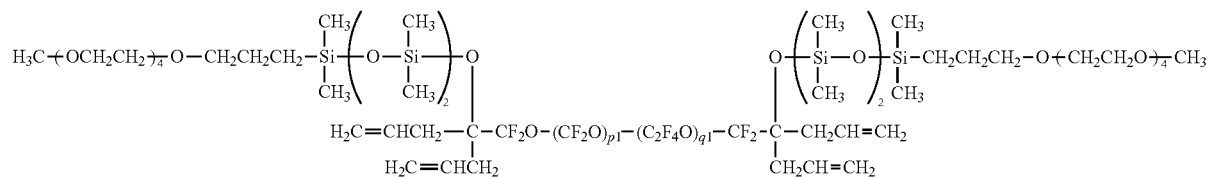

perature of 40 to 120° C., preferably 60 to 100° C., and more preferably about 80° C. for 1 to 72 hours, preferably 20 to 36 hours, and more preferably about 24 hours.

Examples of the fluorooxyalkylene group-containing polymer having a hydroxyl group at both ends of the molecular chain, which is used in the preparation of the fluorooxyalkylene group-containing polymer having formula (17) include those of the following formulae.

[Chem. 89]

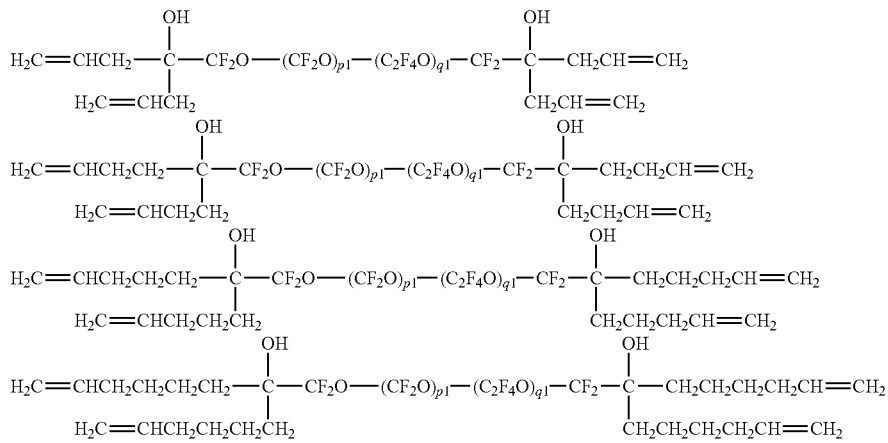

Herein p1 and q1 are as defined above.

The fluorooxyalkylene group-containing polymer having a hydroxyl group at both ends of the molecular chain may be prepared, for example, by mixing a perfluorooxyalkylene group-containing polymer having an acid fluoride group (—C(=O)—F) at both ends of the molecular chain with a Grignard reagent as a nucleophilic reagent and a solvent such as 1,3-bis(trifluoromethyl)benzene or tetrahydrofuran, and aging the mixture at 0 to 80° C., preferably 50 to 70° C., and more preferably about 60° C. for 1 to 6 hours, preferably 3 to 5 hours, and more preferably about 4 hours.

While the perfluorooxyalkylene group-containing polymer has an acid fluoride group at both ends of the molecular chain as mentioned above, an acid halide, acid anhydride, ester, carboxylic acid or amide group may also be used as the group at both ends.

Examples of the perfluorooxyalkylene group-containing polymer having such a group at both ends of the molecular chain are shown below.

[Chem. 90]

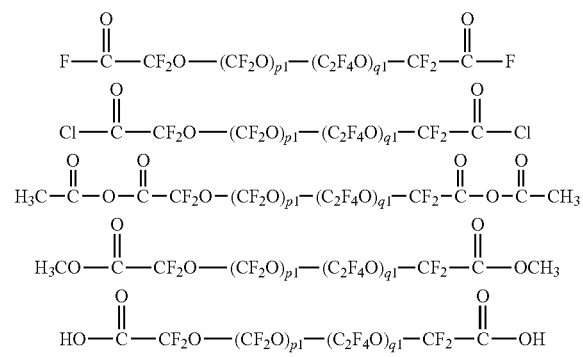

-continued

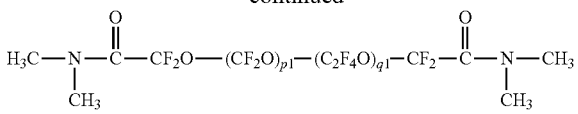

Herein p1 and q1 are as defined above.

The nucleophilic reagent used in the preparation of the fluorooxyalkylene group-containing polymer having a hydroxyl group at both ends of the molecular chain may be selected from allylmagnesium halides, 3-butenylmagnesium halides, 4-pentenylmagnesium halides, and 5-hexenylmagnesium halides, for example. Corresponding lithium reagents may also be used.

The nucleophilic reagent may be used in an amount of 2 to 5 equivalents, preferably 2.5 to 3.5 equivalents, and more preferably about 3 equivalents per equivalent of reactive terminal group on the perfluorooxyalkylene group-containing polymer.

As the solvent used in the preparation of the fluorooxyalkylene group-containing polymer having a hydroxyl group at both ends of the molecular chain, fluorochemical solvents are suitable, including 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M). Organic solvents are also useful, for example, ether solvents such as tetrahydrofuran (THF), monoethylene glycol dimethyl ether, diethylene glycol dimethyl ether, triethylene glycol dimethyl ether, tetraethylene glycol dimethyl ether, and dioxane.

The solvent may be used in an amount of 10 to 300 parts, preferably 100 to 200 parts, and more preferably about 150 parts by weight per 100 parts by weight of the perfluorooxyalkylene group-containing polymer.

Subsequently, the reaction is stopped. The reaction solution is separated into a water layer and a fluorochemical solvent layer by separatory operation. The fluorochemical solvent layer is washed with an organic solvent before the solvent is distilled off, yielding a fluorooxyalkylene group-containing polymer having a hydroxyl group at both ends of the molecular chain.

The polyether-providing agent used in the preparation of the fluorooxyalkylene group-containing polymer having formula (17) is selected from, for example, polyether halides such as 2-bromoethyl methyl ether, ethylene glycol 2-bromoethyl methyl ether, diethylene glycol 2-bromoethyl methyl ether, and triethylene glycol 2-bromoethyl methyl ether.

The polyether-providing agent may be used in an amount of 1 to 15 equivalents, preferably 3 to 9 equivalents, more preferably about 6 equivalents per equivalent of reactive terminal group on the fluorooxyalkylene group-containing polymer having a hydroxyl group at both ends of the molecular chain.

Examples of the base used in the preparation of the fluorooxyalkylene group-containing polymer having formula (17) include amines and alkali metal bases. Specifically, suitable amines include triethylamine, diisopropylethylamine, pyridine, DBU and imidazole. Suitable alkali metal bases include sodium hydroxide, potassium hydroxide, sodium hydride, potassium hydride, alkyl lithium, t-butoxypotassium, lithium diisopropylamide, lithium bis(trimethylsilyl)amide, sodium bis(trimethylsilyl)amide, and potassium bis(trimethylsilyl)amide.

The base may be used in an amount of 1 to 20 equivalents, more preferably 10 to 18 equivalents, even more preferably about 15 equivalents per equivalent of reactive terminal group on the fluorooxyalkylene group-containing polymer having a hydroxyl group at both ends of the molecular chain.

In preparing the fluorooxyalkylene group-containing polymer having formula (17), tetrabutylammonium halides and alkali metal base halides may be used as the reactivity-enhancing additive. Specifically, suitable additives include tetrabutylammonium chloride, tetrabutylammonium bromide, tetrabutylammonium iodide, tetrabutylammonium, tetrabutylammonium hydrogensulfate, sodium iodide, potassium iodide, cesium iodide, and crown ethers. These additives enhance reactivity through catalytic halogen exchange with the olefin-providing agent in the reaction system. The crown ethers enhance reactivity through coordination to the metal.

The additive may be used in an amount of 0.005 to 0.1 equivalent, more preferably 0.01 to 0.05 equivalent, even more preferably about 0.02 equivalent per equivalent of reactive terminal group on the fluorooxyalkylene group-containing polymer having a hydroxyl group at both ends of the molecular chain.

A solvent may be used in the preparation of a fluorooxyalkylene group-containing polymer having formula (17). Although the solvent is not essential, fluorochemical solvents are suitable. Suitable fluorochemical solvents include fluorinated aromatic hydrocarbon solvents such as 1,3-bis(trifluoromethyl)benzene and trifluoromethylbenzene, hydrofluoroether (HFE) solvents (trade name: Novec series from 3M) such as 1,1,1,2,3,4,4,5,5,5-decafluoro-3-methoxy-2-(trifluoromethyl)pentane, and perfluoro solvents composed of perfluorinated compounds (trade name: Fluorinert series from 3M). Further, organic solvents may also be used, for example, dimethylformamide, dimethylacetamide, dimethyl sulfoxide, acetonitrile, and THF.

The solvent may be used in an amount of 10 to 300 parts, preferably 30 to 150 parts, and more preferably about 50 parts by weight per 100 parts by weight of the fluorooxyalkylene group-containing polymer having a hydroxyl group at both ends of the molecular chain.

While the fluorooxyalkylene group-containing polymer having formula (17) is prepared by reaction of a fluorooxyalkylene group-containing polymer having a hydroxyl group at both ends of the molecular chain with an organosilicon compound having at least two SiH groups, but not a hydrolyzable terminal group in the molecule, preferred examples of the organosilicon compound having at least two SiH groups, but not a hydrolyzable terminal group in the molecule include those compounds having the general formulae (9) to (11).

[Chem. 91]

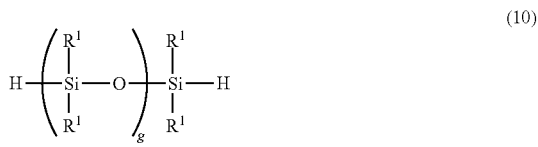

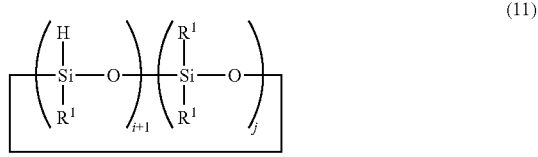

Herein $R^1$, $R^2$, g, j, i and i+j are as defined above.

Examples of the organosilicon compound having at least two SiH groups, but not a hydrolyzable terminal group in the molecule are shown below.

[Chem. 92]

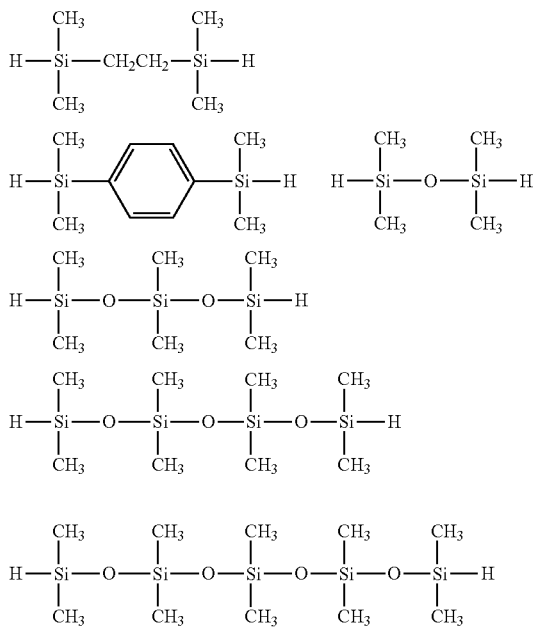

-continued

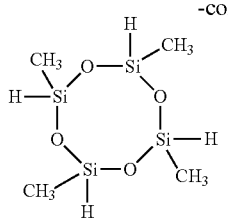

While the fluorooxyalkylene group-containing polymer having formula (17) is prepared by reaction of a fluorooxyalkylene group-containing polymer having a hydroxyl group at both ends of the molecular chain with an organosilicon compound having at least two SiH groups, but not a hydrolyzable terminal group in the molecule, the organosilicon compound having at least two SiH groups, but not a hydrolyzable terminal group in the molecule may be used in an amount of 7 to 30 equivalents, preferably 5 to 20 equivalents, more preferably about 10 equivalents per equivalent of reactive terminal group on the fluorooxyalkylene group-containing polymer having a hydroxyl group at both ends of the molecular chain.

Examples of the dehydrogenation catalyst used in the preparation of the fluorooxyalkylene group-containing polymer having formula (17) are platinum group metal based catalysts such as rhodium, palladium and ruthenium catalysts, and boron catalysts. Suitable platinum group metal based catalysts include tetrakis(triphenylphosphine)palladium and chlorotris(triphenylphosphine)rhodium, and suitable boron catalysts include tris(pentafluorophenyl)borane.

The dehydrogenation catalyst may be used in an amount of 0.01 to 0.0005 equivalent, preferably 0.007 to 0.001 equivalent, and more preferably about 0.005 equivalent per equivalent of reactive terminal group on the fluorooxyalkylene group-containing polymer having a hydroxyl group at both ends of the molecular chain.

Subsequently, the reaction is stopped. The reaction solution is separated into a water layer and a fluorochemical solvent layer by separatory operation. The fluorochemical solvent layer is washed with an organic solvent before the solvent is distilled off, yielding a fluorooxyalkylene group-containing polymer having a SiH group at both ends of the molecular chain.

While the fluorooxyalkylene group-containing polymer having formula (17) is prepared by reaction of a fluorooxyalkylene group-containing polymer having a SiH group at both ends of the molecular chain with a polyether compound having an olefin site in the molecule, examples of the polyether compound having an olefin site in the molecule include polyalkylene oxide compounds blocked with an alkenyloxy group at one end of the molecular chain such as polyethylene oxides blocked with an allyloxy group at one end and with a methoxy group at the other end of the molecular chain, as shown below.

[Chem. 93]

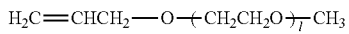

Herein l is as defined above.

Examples of the polyether compounds having an olefin site in the molecule such as polyalkylene oxide compounds blocked with an alkenyloxy group at one end of the molecular chain include Uniox MA-200, Uniox MA-300, Uniox MA-350S and Uniox MA-500 from NOF Corp.

The polyether compound having an olefin site in the molecule may be used in an amount of 1 to 10 equivalents, preferably 2 to 5 equivalents, more preferably about 3 equivalents per equivalent of reactive terminal group on the fluorooxyalkylene group-containing polymer having a SiH group at both ends of the molecular chain.

While the fluorooxyalkylene group-containing polymer having formula (17) is prepared by reaction of a fluorooxyalkylene group-containing polymer having a SiH group at both ends of the molecular chain with a polyether compound having an olefin site in the molecule, examples of the hydrosilylation catalyst used in the reaction include platinum group metal based catalysts such as platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluorooxyalkylene group-containing polymer having a SiH group at both ends of the molecular chain.

As the solvent used in the preparation of the fluoropolyether group-containing polymer of formula (3) wherein α=2 (i.e., Rf is a divalent fluorooxyalkylene group-containing polymer residue), fluorochemical solvents are suitable, including 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 10 to 300 parts, preferably 50 to 150 parts, and more preferably about 100 parts by weight per 100 parts by weight of the fluorooxyalkylene group-containing polymer having two olefin sites and a polyether group at both ends of the molecular chain.

Preferred examples of the organosilicon compound having a SiH group and a hydrolyzable terminal group in the molecule, which is used in the preparation of the fluoropolyether group-containing polymer of formula (3) wherein α=2, include compounds having the general formulae (12) to (15).

[Chem. 94]

(12)

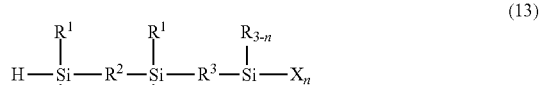
(13)

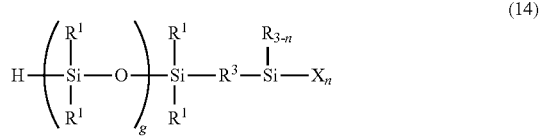
(14)

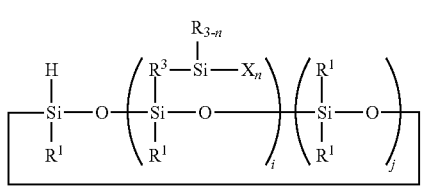 (15)

Herein R, X, n, R$^1$, R$^2$, R$^3$, g, i, j, and i+j are as defined above.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane. Also included are silanes as shown below.

[Chem. 95]

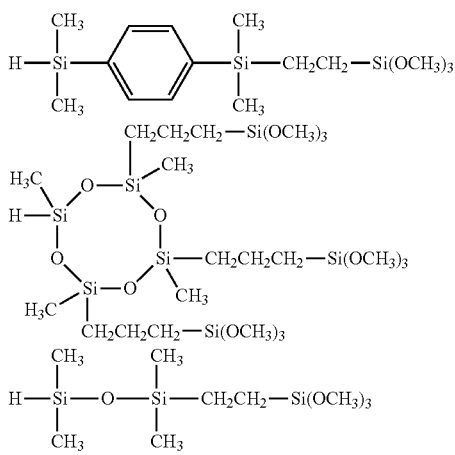

When the fluoropolyether group-containing polymer of formula (3) wherein α=2 is to prepared by reacting a fluorooxyalkylene group-containing polymer having two olefin sites and a polyether group at both ends of the molecular chain with an organosilicon compound having a SiH group and a hydrolyzable terminal group in the molecule, the organosilicon compound having a SiH group and a hydrolyzable terminal group in the molecule may be used in an amount of 2 to 8 equivalents, preferably 3 to 5 equivalents, more preferably about 4 equivalents per equivalent of reactive terminal group on the fluorooxyalkylene group-containing polymer having two olefin sites and a polyether group at both ends of the molecular chain.

Preferred examples of the organosilicon compound having at least two SiH groups, but not a hydrolyzable terminal group in the molecule, which is used in the preparation of the fluoropolyether group-containing polymer of formula (3) wherein α=2, include compounds having the general formulae (9) to (11).

[Chem. 96]

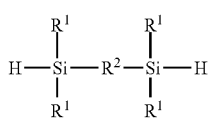 (9)

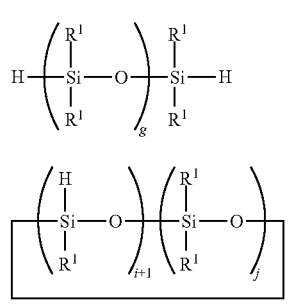

Herein R$^1$, R$^2$, g, j, i and i+j are as defined above.

Examples of the organosilicon compound having at least two SiH groups, but not a hydrolyzable terminal group in the molecule are shown below.

[Chem. 97]

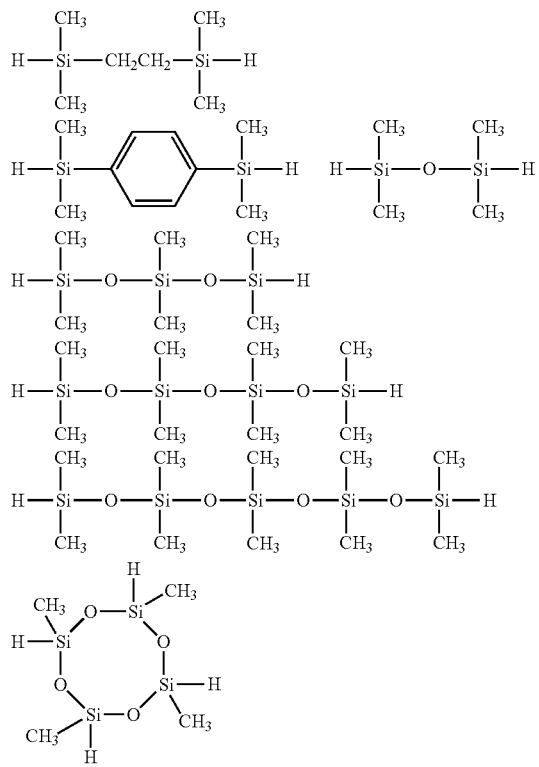

When the fluoropolyether group-containing polymer of formula (3) wherein α=2 is prepared by reacting a fluorooxyalkylene group-containing polymer having two olefin sites and a polyether group at both ends of the molecular chain with an organosilicon compound having at least two SiH groups, but not a hydrolyzable terminal group in the molecule, the organosilicon compound having at least two SiH groups, but not a hydrolyzable terminal group in the molecule may be used in an amount of 7 to 30 equivalents, preferably 5 to 20 equivalents, more preferably about 10 equivalents per equivalent of reactive terminal group on the fluorooxyalkylene group-containing polymer having two olefin sites and a polyether group at both ends of the molecular chain.

Preferred examples of the organosilicon compound having an olefin site and a hydrolyzable terminal group in the molecule, which is used in the preparation of the fluoropolyether group-containing polymer of formula (3) wherein α=2, include compounds having the general formula (16).

[Chem. 98]

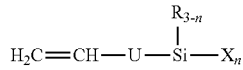   (16)

Herein R, X, n and U are as defined above.

both ends of the molecular chain is a compound having the formula:

[Chem. 99]

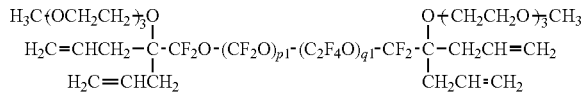

p1:q1 = 47:53, p1 + q1 ≈ 43 and the organosilicon compound having a SiH group and a hydrolyzable terminal group in the molecule is trimethoxysilane, a compound of the following formula is obtained.

[Chem. 100]

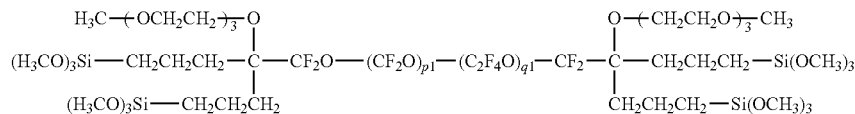

p1:q1 = 47:53, p1 + q1 ≈ 43

In the reaction of the reaction product between the fluorooxyalkylene group-containing polymer having two olefin sites and a polyether group at both ends of the molecular chain and the organosilicon compound having at least two SiH groups, but not a hydrolyzable terminal group in the molecule with the organosilicon compound having an olefin site and a hydrolyzable terminal group in the molecule for preparation of the fluoropolyether group-containing polymer having formula (3) wherein α=2, the organosilicon compound having an olefin site and a hydrolyzable terminal group in the molecule may be used in an amount of 2 to 8 equivalents, preferably 3 to 5 equivalents, and more preferably about 4 equivalents per equivalent of reactive terminal group on the reaction product between the fluorooxyalkylene group-containing polymer having two olefin sites and a polyether group at both ends of the molecular chain and the organosilicon compound having at least two SiH groups, but not a hydrolyzable terminal group in the molecule.

Typical of the hydrosilylation catalyst used in the preparation of a fluoropolyether group-containing polymer having formula (3) wherein α=2 are platinum group metal based catalysts including platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluorooxyalkylene group-containing polymer having two olefin sites and a polyether group at both ends of the molecular chain or the reaction product between the polymer and the organosilicon compound having at least two SiH groups, but not a hydrolyzable terminal group in the molecule.

Thereafter, the solvent and unreacted reactants are distilled off in vacuum, yielding the target compound.

For example, when the fluorooxyalkylene group-containing polymer having two olefin sites and a polyether group at Another embodiment of the invention is a surface treating agent comprising a fluoropolyether group-containing polymer having a hydrolyzable group and a polyether group, preferably the polymer in which the polyether group is a monovalent oxyalkylene group-containing polymer residue at the end of the molecular chain, especially the fluoropolyether group-containing polymer defined above. The surface treating agent may also comprise a partial (hydrolytic) condensate of the fluoropolyether group-containing polymer obtained by condensing its hydroxyl group, or a hydroxyl group resulting from partial hydrolysis of the hydrolyzable terminal group on the fluoropolyether group-containing polymer in a well-known manner.

To the surface treating agent, a hydrolytic condensation catalyst may be added if necessary. Suitable hydrolytic condensation catalysts include organotin compounds such as dibutyltin dimethoxide and dibutyltin dilaurate, organotitanium compounds such as tetra-n-butyl titanate, organic acids such as acetic acid, methanesulfonic acid, and fluorine-modified carboxylic acids, and inorganic acids such as hydrochloric acid and sulfuric acid. Of these, acetic acid, tetra-n-butyl titanate, dibutyltin dilaurate, and fluorine-modified carboxylic acids are desirable.

The hydrolytic condensation catalyst may be added in a catalytic amount, typically 0.01 to 5 parts, more preferably 0.1 to 1 part by weight per 100 parts by weight of the fluoropolyether group-containing polymer and/or its partial (hydrolytic) condensate.

The surface treating agent may further comprise a solvent. Suitable solvents include fluorine-modified aliphatic hydrocarbon solvents such as perfluoroheptane and perfluorooctane; fluorine-modified aromatic hydrocarbon solvents such as 1,3-bis(trifluoromethyl)benzene; fluorine-modified ether solvents such as methyl perfluorobutyl ether, ethyl perfluorobutyl ether, and perfluoro(2-butyltetrahydrofuran); fluorine-modified alkylamine solvents such as perfluorotributylamine and perfluorotripentylamine; hydrocarbon solvents such as petroleum benzine, toluene, and xylene; ketone solvents such as acetone, methyl ethyl ketone, and methyl isobutyl ketone. Of these, fluorine-modified solvents are desirable for solubility and wettability, with 1,3-bis (trifluoromethyl)benzene, perfluoro(2-butyltetrahydrofuran), perfluorotributylamine, and ethyl perfluorobutyl ether being more desirable.

The solvents may be used in admixture of two or more while it is preferred that the fluoropolyether group-containing polymer and its partial (hydrolytic) condensate be uniformly dissolved in the solvent. An optimum concentration of the fluoropolyether group-containing polymer and its partial (hydrolytic) condensate in the solvent varies with a particular treating mode. The amount which is easy to weigh may be chosen. When the agent is applied directly, the concentration may preferably be 0.01 to 10 parts by weight, more preferably 0.05 to 5 parts by weight per 100 parts by weight of the solvent and the fluoropolyether group-containing polymer (and its partial (hydrolytic) condensate) combined. When the agent is applied by evaporation, the concentration may preferably be 1 to 100 parts by weight, more preferably 3 to 30 parts by weight per 100 parts by weight of the solvent and the fluoropolyether group-containing polymer (and its partial (hydrolytic) condensate) combined.

The surface treating agent may be applied to a substrate by any well-known techniques such as brush coating, dipping, spraying and evaporation. In the case of evaporation, the heating mode may be either resistance heating or EB heating and is not particularly limited. The curing temperature varies with a particular curing technique. For example, in the case of direct coating (brush coating, dipping or spraying), suitable curing conditions include a temperature of 25 to 200° C., especially 25 to 80° C. for 30 minutes to 36 hours, especially 1 to 24 hours. When the coating technique is evaporation, the curing temperature is in a range of 20 to 200° C. Humid curing conditions are also useful. The cured coating typically has a thickness of 0.1 to 100 nm, desirably 1 to 20 nm although the thickness depends on the type of substrate. Also, in the case of spray coating, for example, a procedure involving diluting the agent with a fluorochemical solvent having water previously added thereto, for thereby effecting hydrolysis to generate Si—OH, and thereafter, spraying the dilution is recommended because the coating rapidly cures.

The substrate to be treated with the surface treating agent is not particularly limited, and may be made of any desired materials including paper, fabric, metals, metal oxides, glass, plastics, ceramics, and quartz. The surface treating agent is effective for endowing the substrate with water/oil repellency. In particular, the surface treating agent is advantageously used for the treatment of $SiO_2$-deposited glass and film.

Preferred articles which may be treated with the surface treating agent include car navigation systems, mobile phones, smart phones, digital cameras, digital video cameras, PDA, portable audio players, car audio players, game consoles, eyeglass lenses, camera lenses, lens filters, sunglasses, medical instruments (e.g., gastroscopes), copiers, personal computers, LC displays, organic EL displays, plasma displays, touch panel displays, protective film, antireflective film, and other optical articles. The surface treating agent of the invention is effective for preventing fingerprints and sebum from adhering to the articles and also for imparting scratch resistance. Therefore, it is particularly useful as a water/oil repellent layer on touch panel displays and antireflective films.

The surface treating agent is used for anti-staining coatings on sanitary ware such as bathtubs and washbowls; anti-staining coatings on glazing or strengthened glass and head lamp covers in transport vehicles such as automobiles, trains and aircraft; water/oil repellent coatings on building exteriors; coatings for preventing oil contamination on kitchen ware; anti-staining, anti-sticking, anti-graffiti coatings in telephone booths; anti-fingerprint coatings on artistic objects; anti-fingerprint coatings on compact discs and DVD's; mold parting agents; paint additives; and resin modifiers. The agent is also effective for modifying the flow and dispersion of inorganic fillers, and for improving the lubricity of tape and film.

EXAMPLES

Examples and Comparative Examples are given below for illustrating the invention, but the invention is not limited by Examples.

Example 1

In a reactor, 27.9 g ($6.6 \times 10^{-3}$ mol) of a compound having the formula (A):

[Chem. 101]

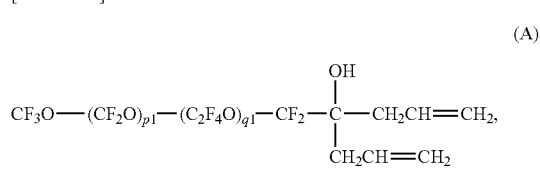

(A)

$$CF_3O-(CF_2O)_{p1}-(C_2F_4O)_{q1}-CF_2-\underset{\underset{CH_2CH=CH_2}{|}}{\overset{\overset{OH}{|}}{C}}-CH_2CH=CH_2,$$

p1:q1 = 47:53, p1 + q1 ≈ 43

3 g ($1.3 \times 10^{-2}$ mol) of diethylene glycol 2-bromoethyl methyl ether, and 0.05 g ($1.3 \times 10^{-4}$ mol) of tetrabutylammonium iodide were mixed. Then 1.8 g ($3.3 \times 10^{-2}$ mol) of potassium hydroxide was added to the mixture, which was heated at 60° C. for 6 hours. Subsequently, 3 g ($1.3 \times 10^{-2}$ mol) of diethylene glycol 2-bromoethyl methyl ether and 1.8 g ($3.3 \times 10^{-2}$ mol) of potassium hydroxide were added again to the solution, which was heated at 60° C. for 14 hours. Further, 3 g ($1.3 \times 10^{-2}$ mol) of diethylene glycol 2-bromoethyl methyl ether and 1.8 g ($3.3 \times 10^{-2}$ mol) of potassium hydroxide were added to the solution, which was heated at 60° C. for 4 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 22 g of a fluoropolyether group-containing polymer having the following formula (B).

[Chem. 102]

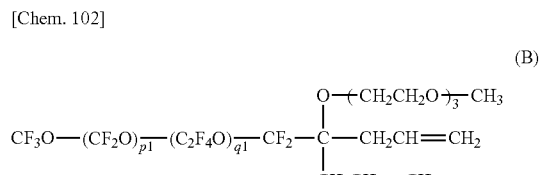

(B)

$$CF_3O-(CF_2O)_{\overline{p1}}-(C_2F_4O)_{\overline{q1}}-CF_2-\underset{\underset{CH_2CH=CH_2}{|}}{\overset{\overset{O-(CH_2CH_2O)_{\overline{3}}-CH_3}{|}}{C}}-CH_2CH=CH_2$$

p1:q1 = 47:53, p1 + q1 = 43

-continued $^1$H—NMR
δ 2.3-2.5 (C—C$\underline{H_2}$CH═CH$_2$) 4H
δ 3.1-3.2 (—O—(CH$_2$CH$_2$O)$_3$—O—C$\underline{H_3}$) 3H
δ 3.3-3.7 (—O—(C$\underline{H_2}$C$\underline{H_2}$O)$_3$—O—CH$_3$) 12H
δ 4.9-5.0 (—CH$_2$CH═C$\underline{H_2}$) 4H
δ 5.7-5.8 (—CH$_2$C$\underline{H}$═CH$_2$) 2H In a reactor, 23.2 g (5.3×10$^{-3}$ mol) of the compound having the formula (B):

[Chem. 103]

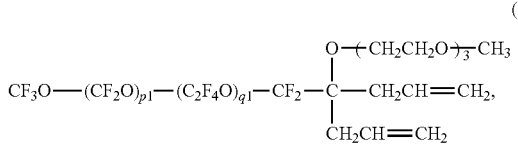

(B)

p1:q1 = 47:53, p1 + q1 ≈ 43

10 g of 1,3-bis(trifluoromethyl)benzene, 2.6 g (2.1×10$^{-2}$ mol) of trimethoxysilane, and 2.0×10$^{-2}$ g of a toluene solution of chloroplatinic acid/vinyl siloxane complex (containing 6.0×10$^{-8}$ mol of Pt) were mixed. The solution was aged at 80° C. for 24 hours. Thereafter, the solvent and unreacted reactants were distilled off in vacuum, obtaining 20 g of a liquid product.

On $^1$H-NMR analysis, the compound was identified to have a structure of the following formula (C).

[Chem. 104]

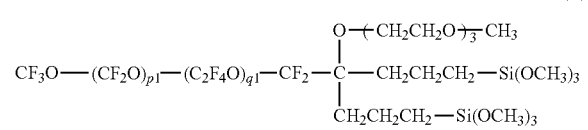

(C)

p1:q1 = 47:53, p1 + q1 ≈ 43

$^1$H—NMR
δ 0.4-0.6 (—CH$_2$CH$_2$C$\underline{H_2}$—Si) 4H
δ 1.4-1.8 (—C$\underline{H_2}$C$\underline{H_2}$CH$_2$—Si) 8H
δ 3.1-3.2 (—O—(CH$_2$CH$_2$O)$_3$—O—C$\underline{H_3}$) 3H
δ 3.3-3.7 (—O—(C$\underline{H_2}$C$\underline{H_2}$O)$_3$—O—CH$_3$, —Si(OC$\underline{H_3}$)$_3$) 30H Example 2

In a reactor, 27.9 g (6.6×10$^{-3}$ mol) of a compound having the formula (A):

[Chem. 105]

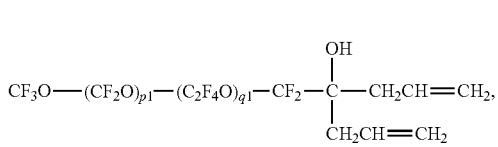

(A)

p1:q1 = 47:53, p1 + q1 ≈ 43

3.5 g (1.3×10$^{-2}$ mol) of triethylene glycol 2-bromoethyl methyl ether, and 0.05 g (1.3×10$^{-4}$ mol) of tetrabutylammonium iodide were mixed. Then 1.8 g (3.3×10$^{-2}$ mol) of potassium hydroxide was added to the mixture, which was heated at 60° C. for 6 hours. Subsequently, 3.5 g (1.3×10$^{-2}$ mol) of triethylene glycol 2-bromoethyl methyl ether and 1.8 g (3.3×10$^{-2}$ mol) of potassium hydroxide were added again to the solution, which was heated at 60° C. for 14 hours. Further, 3.5 g (1.3×10$^{-2}$ mol) of triethylene glycol 2-bromoethyl methyl ether and 1.8 g (3.3×10$^{-2}$ mol) of potassium hydroxide were added to the solution, which was heated at 60° C. for 4 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 21 g of a fluoropolyether group-containing polymer having the following formula (D).

[Chem. 106]

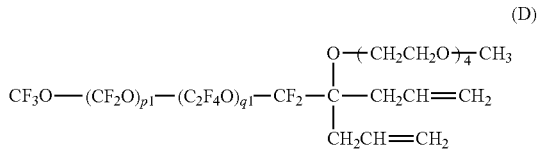

(D)

p1:q1 = 47:53, p1 + q1 ≈ 43

$^1$H—NMR
δ 2.2-2.4 (C—C$\underline{H_2}$CH═CH$_2$) 4H
δ 3.0-3.1 (—O—(CH$_2$CH$_2$O)$_4$—O—C$\underline{H_3}$) 3H
δ 3.2-3.6 (—O—(C$\underline{H_2}$C$\underline{H_2}$O)$_4$—O—CH$_3$) 16H
δ 4.8-5.0 (—CH$_2$CH═C$\underline{H_2}$) 4H
δ 5.6-5.8 (—CH$_2$C$\underline{H}$═CH$_2$) 2H In a reactor, 23.4 g (5.3×10$^{-3}$ mol) of the compound having the formula (D):

[Chem. 107]

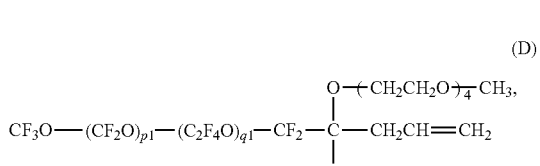

(D)

p1:q1 = 47:53, p1 + q1 ≈ 43

10 g of 1,3-bis(trifluoromethyl)benzene, 2.6 g (2.1×10$^{-2}$) of trimethoxysilane, and 2.0×10$^{-2}$ g of a toluene solution of chloroplatinic acid/vinyl siloxane complex (containing 6.0×10$^{-8}$ mol of Pt) were mixed. The solution was aged at 80° C. for 24 hours. Thereafter, the solvent and unreacted reactants were distilled off in vacuum, obtaining 19 g of a liquid product.

On ¹H-NMR analysis, the compound was identified to have a structure of the following formula (E).

[Chem. 108]

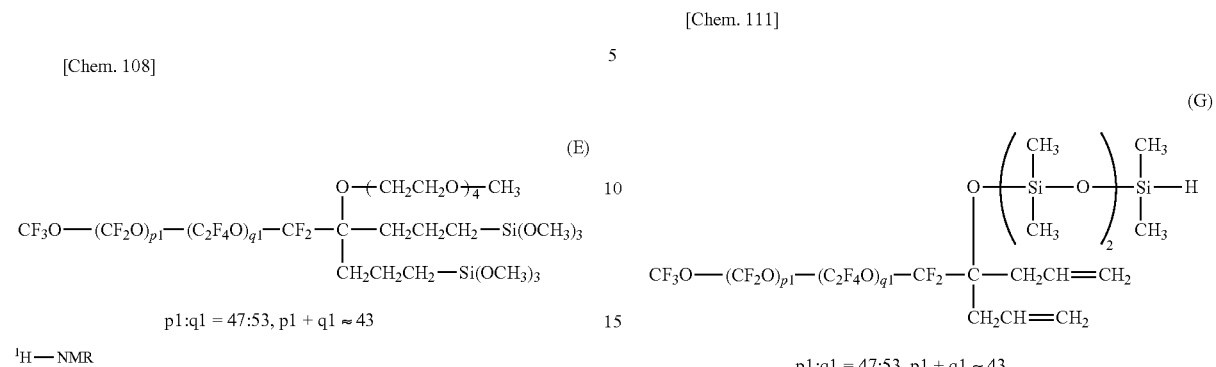

(E)

$p1{:}q1 = 47{:}53$, $p1 + q1 \approx 43$

¹H—NMR
δ 0.3-0.6 (—CH₂CH₂C$\underline{H_2}$—Si) 4H
δ 1.4-1.8 (—$\underline{CH_2CH_2}$CH₂—Si) 8H
δ 3.0-3.1 (—O—(CH₂CH₂O)₃—O—C$\underline{H_3}$) 3H
δ 3.2-3.6 (—O—($\underline{CH_2CH_2}$O)₃—O—C$\underline{H_3}$, —Si(OC$\underline{H_3}$)₃) 34H

Example 3

In a reactor, 50 g of 1,3-bis(trifluoromethyl)benzene, 0.014 g ($2.6 \times 10^{-5}$ mol) of tris(pentafluorophenyl)borane and 54.9 g ($1.3 \times 10^{-2}$) of a compound of the following formula (A) were mixed.

[Chem. 109]

(A)

$$CF_3O\text{—}(CF_2O)_{p1}\text{—}(C_2F_4O)_{q1}\text{—}CF_2\text{—}\underset{\underset{CH_2CH=CH_2}{|}}{\overset{\overset{OH}{|}}{C}}\text{—}CH_2CH=CH_2$$

$p1{:}q1 = 47{:}53$, $p1 + q1 \approx 43$

To the mixture, 28 g ($1.3 \times 10^{-1}$ mol) of a siloxane having the formula (F):

[Chem. 110]

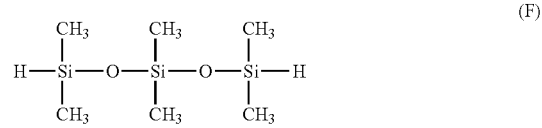

(F)

was slowly added dropwise. The solution was heated at 25° C. for 1 hour. Water was added dropwise to the solution. The lower layer or fluoro compound layer was recovered by separatory operation and washed with acetone. The lower layer or fluoro compound layer after washing was recovered again. The residual solvent was distilled off in vacuum, yielding 48 g of a fluoropolyether group-containing polymer of the following formula (G).

[Chem. 111]

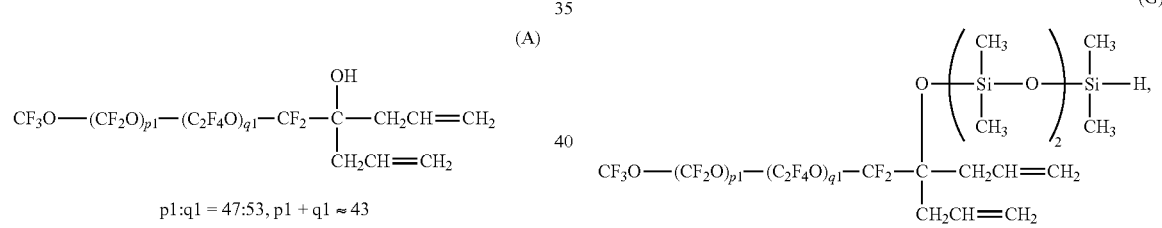

(G)

$p1{:}q1 = 47{:}53$, $p1 + q1 \approx 43$

¹H—NMR
δ 0-0.2 (—Si—(CH₃)₂—) 18H
δ 2.4-2.6 (—C$\underline{H_2}$CH=CH₂) 4H
δ 4.7-4.8 (—Si—$\underline{H}$) 1H
δ 5.0-5.1 (—CH₂CH=C$\underline{H_2}$) 4H
δ 5.8-5.9 (—CH₂C$\underline{H}$=CH₂) 2H In a reactor, 23.9 g ($5.4 \times 10^{-3}$ mol) of the compound having the formula (G):

[Chem. 112]

(G)

24 g of 1,3-bis(trifluoromethyl)benzene, 3.2 g ($1.4 \times 10^{-2}$ mol) of Uniox MA-200 (polyethylene oxide blocked with allyloxy at one end and with methoxy at the other end of the molecular chain, shown below, by NOF Corp.), and $2.4 \times 10^{-2}$ g of a toluene solution of chloroplatinic acid/vinyl siloxane complex (containing $7.2 \times 10^{-8}$ mol of Pt) were mixed. The solution was aged at 80° C. for 24 hours. Thereafter, the solvent and unreacted reactants were distilled off in vacuum, obtaining 23 g of a liquid product.

[Chem. 113]

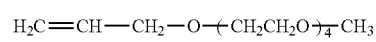

On ¹H-NMR analysis, the compound was identified to have a structure of the following formula (H).

[Chem. 114]

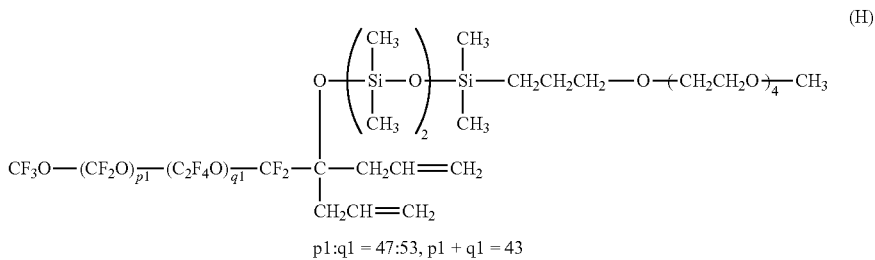

p1:q1 = 47:53, p1 + q1 = 43

$^1$H—NMR
δ 0-0.3 (—Si—(C$\underline{H}_3$)$_2$—) 18H
δ 0.5-0.7 (—C$\underline{H}_2$CH$_2$CH$_2$—O—) 2H
δ 1.5-1.7 (—CH$_2$C$\underline{H}_2$CH$_2$—O—) 2H
δ 2.5-2.7 (—C$\underline{H}_2$CH═CH$_2$) 4H
δ 3.1-3.2 (—O—(CH$_2$CH$_2$O)$_4$—O—C$\underline{H}_3$) 3H
δ 3.3-3.6 (—CH$_2$CH$_2$C$\underline{H}_2$—O—, (—O—(C$\underline{H}_2$C$\underline{H}_2$O)$_4$—O—CH$_3$) 18H
δ 5.0-5.1 (—CH$_2$CH═C$\underline{H}_2$) 4H
δ 5.8-6.0 (—CH$_2$C$\underline{H}$═CH$_2$) 2H In a reactor, 21.0 g (4.5×10$^{-3}$ mol) of the compound having the formula (H):

[Chem. 115]

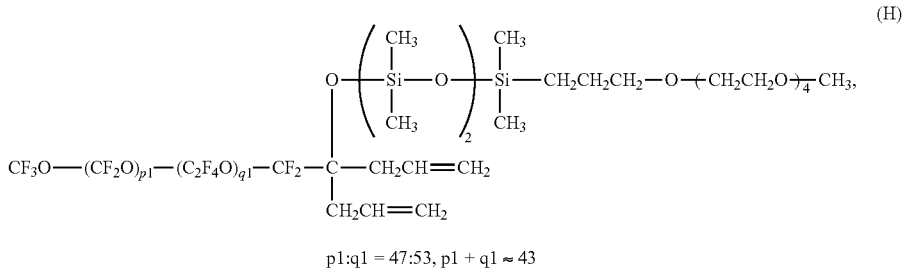

p1:q1 = 47:53, p1 + q1 ≈ 43

10 g of 1,3-bis(trifluoromethyl)benzene, 2.2 g (1.8×10$^{-2}$ mol) of trimethoxysilane, and 2.0×10$^{-2}$ g of a toluene solution of chloroplatinic acid/vinyl siloxane complex (containing 6.0×10$^{-8}$ mol of Pt) were mixed. The solution was aged at 80° C. for 24 hours. Thereafter, the solvent and unreacted reactants were distilled off in vacuum, obtaining 20 g of a liquid product.

On $^1$H-NMR analysis, the compound was identified to have a structure of the following formula (I).

[Chem. 116]

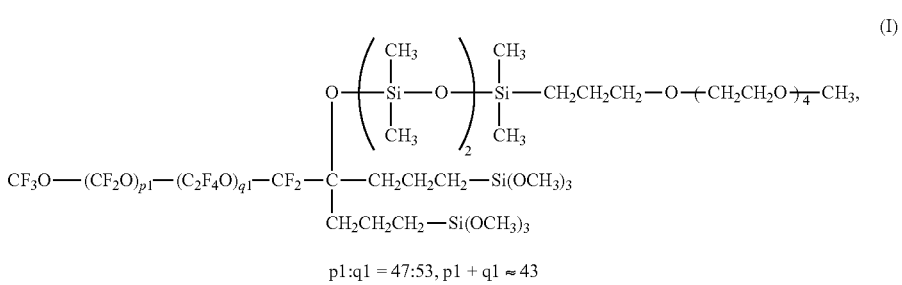

p1:q1 = 47:53, p1 + q1 ≈ 43

$^1$H—NMR
δ 0-0.3 (—Si—(C$\underline{H_3}$)$_2$—) 18H
δ 0.5-0.7 (—Si—C$\underline{H_2}$CH$_2$CH$_2$—O—CH$_2$CH$_2$C$\underline{H_2}$—Si) 6H
δ 1.5-1.9 (—Si—CH$_2$C$\underline{H_2}$CH$_2$—O—, —C$\underline{H_2}$CH$_2$CH$_2$—Si) 10H
δ 3.1-3.2 (—O—(CH$_2$CH$_2$O)$_4$—O—C$\underline{H_3}$) 3H
δ 3.3-3.7 (—Si—CH$_2$CH$_2$C$\underline{H_2}$—O—, —O—(C$\underline{H_2}$C$\underline{H_2}$O)$_4$—O—CH$_3$, —Si(OC$\underline{H_3}$)$_3$) 36H

Example 4

In a reactor, 25 g ($5.8 \times 10^{-3}$ mol) of a compound having the formula (J):

[Chem. 117]

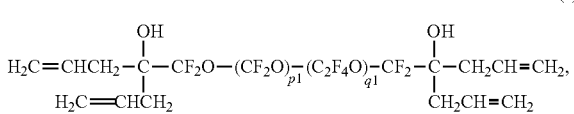

p1:q1 = 47:53, p1 + q1 ≈ 43

6 g ($2.6 \times 10^{-2}$ mol) of diethylene glycol 2-bromoethyl methyl ether, and 0.09 g ($2.6 \times 10^{-4}$ mol) of tetrabutylammonium iodide were mixed. Then 3.6 g ($6.5 \times 10^{-2}$) of potassium hydroxide was added to the mixture, which was heated at 60° C. for 6 hours. Subsequently, 6 g ($2.6'10^{-2}$ mol) of diethylene glycol 2-bromoethyl methyl ether and 3.6 g ($6.5 \times 10^{-2}$ mol) of potassium hydroxide were added again to the solution, which was heated at 60° C. for 14 hours. Further, 6 g ($2.6 \times 10^{-2}$ mol) of diethylene glycol 2-bromoethyl methyl ether and 3.6 g ($6.5 \times 10^{-2}$ mol) of potassium hydroxide were added to the solution, which was heated at 60° C. for 4 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 25 g of a fluoropolyether group-containing polymer having the following formula (K).

[Chem. 118]

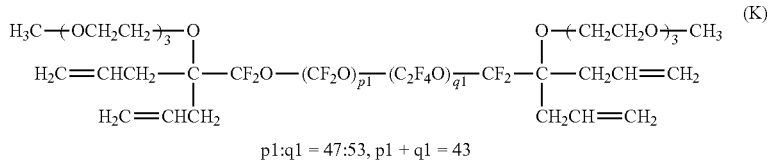

p1:q1 = 47:53, p1 + q1 = 43

$^1$H—NMR
δ 2.2-2.4 (C—C$\underline{H_2}$CH=CH$_2$) 8H
δ 3.1-3.2 (—O—(CH$_2$CH$_2$O)$_4$—O—C$\underline{H_3}$) 6H
δ 3.2-3.6 (—O—(C$\underline{H_2}$C$\underline{H_2}$O)$_4$—O—CH$_3$) 32H
δ 4.7-4.9 (—CH$_2$CH=C$\underline{H_2}$) 8H
δ 5.6-5.8 (—CH$_2$C$\underline{H}$=CH$_2$) 4H In a reactor, 20 g ($4.3 \times 10^{-3}$ mol) of the compound having the formula (K):

[Chem. 119]

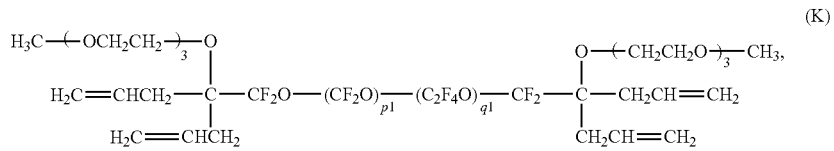

p1:q1 = 47:53, p1 + q1 ≈ 43

20 g of 1,3-bis(trifluoromethyl)benzene, 4.9 g ($4.0 \times 10^{-2}$ mol) of trimethoxysilane, and $4.0 \times 10^{-2}$ g of a toluene solution of chloroplatinic acid/vinyl siloxane complex (containing $1.2 \times 10^{-7}$ mol of Pt) were mixed. The solution was aged at 80° C. for 24 hours. Thereafter, the solvent and unreacted reactants were distilled off in vacuum, obtaining 19 g of a liquid product.

On $^1$H-NMR analysis, the compound was identified to have a structure of the following formula (L).

[Chem. 120]

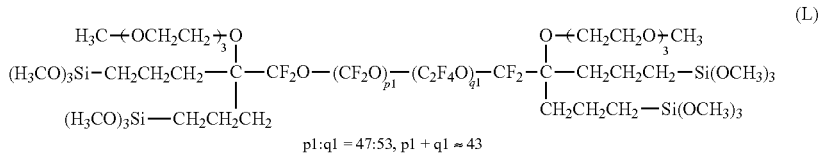

(L)

$p1:q1 = 47:53, p1 + q1 \approx 43$ $^1$H—NMR
δ 0.4–0.6 (—CH$_2$CH$_2$CH$_2$—Si) 8H
δ 1.4–1.9 (—CH$_2$CH$_2$CH$_2$—Si) 16H
δ 3.0–3.1 (—O—(CH$_2$CH$_2$O)$_3$—O—CH$_3$) 6H
δ 3.2–3.6 (—O—(CH$_2$CH$_2$O)$_3$—O—CH$_3$, —Si(OCH$_3$)$_3$) 68H

Example 5

In a reactor, 60.1 g ($1.3 \times 10^{-2}$ mol) of a compound having the formula (M):

[Chem. 121]

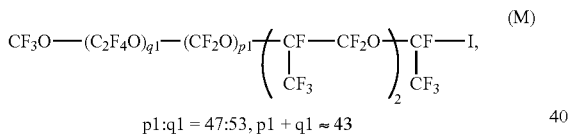

(M)

$p1:q1 = 47:53, p1 + q1 \approx 43$ 25 g of 1,3-bis(trifluoromethyl)benzene, 5.9 g ($2.6 \times 10^{-2}$ mol) of Uniox MA-200 (polyethylene oxide blocked with allyloxy at one end and with methoxy at the other end of the molecular chain, by NOF Corp.) having the following formula:

[Chem. 122]

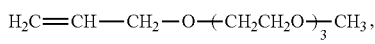

and 6.1 g ($2.6 \times 10^{-2}$ mol) of vinylsilane having the following formula:

[Chem. 123]

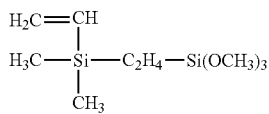

were mixed. Then 1.9 g ($1.3 \times 10^{-2}$ mol) of di-t-butyl peroxide was added to the mixture, which was heated at 110° C. for 6 hours. At the end of heating, the solution was cooled to room temperature. Thereafter, 1.3 g ($2.0 \times 10^{-2}$ mol) of zinc powder and 25 g of methanol were added to the solution. With vigorous stirring, reaction run at 60° C. for 12 hours. The reaction solution was filtered through a filter to remove the solids, the solvent and unreacted reactants were distilled off in vacuum. After washing 3 times with 12.5 g of methanol, 24 g of a product was obtained.

On $^1$H-NMR analysis, the compound was identified to have a structure of the following formula (N).

[Chem. 124]

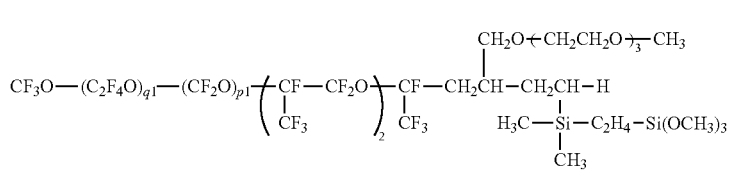

(N)

$p1:q1 = 47:53, p1 + q1 \approx 43$ $^1$H—NMR
δ 0-0.3 (—Si—(C$\underline{H_3}$)$_2$—) 6H
δ 0.4–0.6 (—CH—C$\underline{H_2}$C$\underline{H_2}$—Si,—Si—C$\underline{H_2}$C$\underline{H_2}$—Si) 6H
δ 1.5–2.0 (—CF—C$\underline{H_2}$—C$\underline{H}$—C$\underline{H_2}$C$\underline{H_2}$—Si) 6H
δ 3.0–3.1 (—O—(C$\underline{H_2}$C$\underline{H_2}$O)$_3$—O—C$\underline{H_3}$) 3H
δ 3.2–3.6 (—CF—C$\underline{H_2}$—C$\underline{H}$—C$\underline{H_2}$C$\underline{H_2}$C$\underline{H_2}$—Si, —O—(C$\underline{H_2}$C$\underline{H_2}$O)$_3$—O—C$\underline{H_3}$, —Si(OC$\underline{H_3}$)$_3$) 22H

Example 6

In a reactor, 54.9 g ($1.3 \times 10^{-2}$ mol) of a compound having the formula (A):

[Chem. 125]

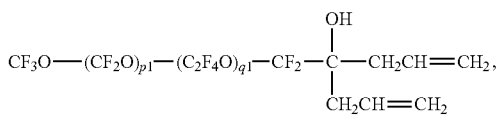

$p1:q1 = 47:53$, $p1 + q1 \approx 43$ 25 g of 1,3-bis(trifluoromethyl)benzene, and $4.0 \times 10^{-2}$ g of a toluene solution of chloroplatinic acid/vinyl siloxane complex (containing $1.2 \times 10^{-7}$ mol of Pt) were mixed and heated at 80° C. Then 3.0 g ($6.5 \times 10^{-3}$ mol) of a polyether group-containing siloxane having the following formula:

[Chem. 126]

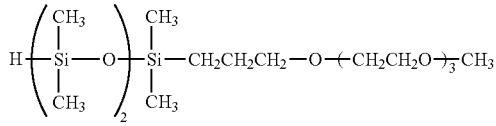

was slowly added dropwise to the mixture, which was heated at 80° C. for 6 hours. Thereafter, the solvent and unreacted reactants were distilled off in vacuum, obtaining 47 g of a liquid product.

On $^1$H-NMR analysis, the compound was identified to have a structure of the following formula (O).

[Chem. 127]

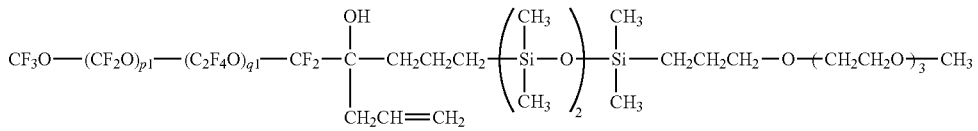

$p1:q1 = 47:53$, $p1 + q1 = 43$ $^1$H—NMR
δ 0-0.2 (—Si—(C$\underline{H_3}$)$_2$—) 18H
δ 0.4-0.6 (—C—C$\underline{H_2}$C$\underline{H_2}$C$\underline{H_2}$—Si, O—Si—C$\underline{H_2}$C$\underline{H_2}$C$\underline{H_2}$—O) 4H
δ 1.4-1.9 (—C—C$\underline{H_2}$C$\underline{H_2}$C$\underline{H_2}$—Si, O—Si—C$\underline{H_2}$C$\underline{H_2}$C$\underline{H_2}$—O) 6H
δ 2.2-2.4 (—C—C$\underline{H_2}$CH═CH$_2$) 2H
δ 3.1-3.2 (—O—(CH$_2$CH$_2$O)$_3$—O—C$\underline{H_3}$) 3H
δ 3.2-3.6 (O—Si—C$\underline{H_2}$C$\underline{H_2}$C$\underline{H_2}$—O, —O—(C$\underline{H_2}$C$\underline{H_2}$O)$_3$—O—CH$_3$) 14H
δ 4.9-5.0 (—CH$_2$CH═C$\underline{H_2}$) 2H
δ 5.6-5.8 (—CH$_2$C$\underline{H}$═CH$_2$) 1H In a reactor, 30.1 g ($6.5 \times 10^{-3}$ mol) of the compound having the formula (O):

[Chem. 128]

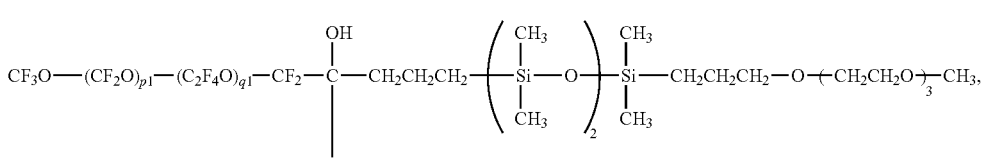

$p1:q1 = 47:53$, $p1 + q1 \approx 43$ 25 g of 1,3-bis(trifluoromethyl)benzene, 1.2 g ($9.8\times10^{-3}$ mol) of trimethoxysilane, and $4.0\times10^{-2}$ g of a toluene solution of chloroplatinic acid/vinyl siloxane complex (containing $1.2\times10^{-7}$ mol of Pt) were mixed and heated at 80° C. Thereafter, the solvent and unreacted reactants were distilled off in vacuum, obtaining 23 g of a liquid product.

On $^1$H-NMR analysis, the compound was identified to have a structure of the following formula (P).

[Chem. 129]

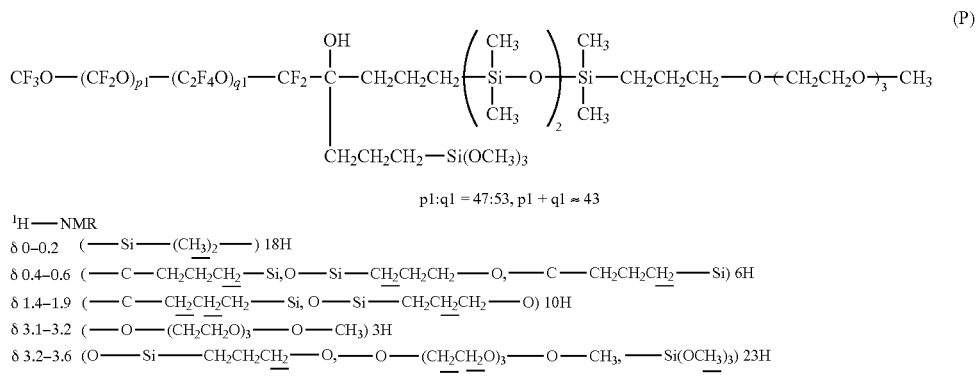

$^1$H—NMR
δ 0–0.2 (—Si—(CH$_3$)$_2$—) 18H
δ 0.4–0.6 (—C—CH$_2$CH$_2$CH$_2$—Si,O—Si—CH$_2$CH$_2$CH$_2$—O,—C—CH$_2$CH$_2$CH$_2$—Si) 6H
δ 1.4–1.9 (—C—CH$_2$CH$_2$CH$_2$—Si, O—Si—CH$_2$CH$_2$CH$_2$—O) 10H
δ 3.1–3.2 (—O—(CH$_2$CH$_2$O)$_3$—O—CH$_3$) 3H
δ 3.2–3.6 (O—Si—CH$_2$CH$_2$CH$_2$—O,—O—(CH$_2$CH$_2$O)$_3$—O—CH$_3$,—Si(OCH$_3$)$_3$) 23H

For comparison, the following polymers were used.

[Comparative Example 1]

[Chem. 130]

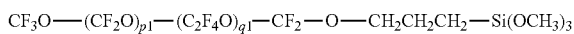

p1:q1 = 47:53, p1 + q1 ≈ 43

[Comparative Examle 2]

[Chem. 131]

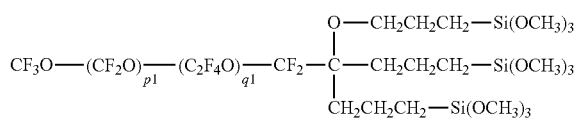

p1:q1 = 47:53, p1 + q1 ≈ 43

[Comparative Examle 3]

[Chem. 132]

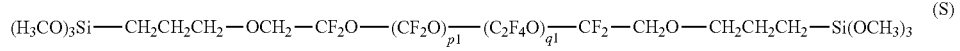

p1:q1 = 47:53, p1 + q1 ≈ 43

Preparation of Surface Treating Agent and Formation of Cured Film

Surface treating agents were prepared by dissolving the fluoropolyether group-containing polymers obtained in Examples 1 to 6 or the polymers of Comparative Examples 1 to 3 in solvent Novec 7200 (ethyl perfluorobutyl ether by 3M) in a concentration of 20 wt %. Onto glass having an outermost surface treated with SiO$_2$ of 10 nm (Gorilla by Corning), 4 μL of each surface treating agent was deposited by vacuum evaporation under conditions including pressure $2.0\times10^{-2}$ Pa and heating temperature 700° C. The deposit was cured in an atmosphere of 25° C. and humidity 50% for 12 hours, obtaining a cured film of 8 nm thick.

Evaluation of Water/Oil Repellency

[Evaluation of Initial Water/Oil Repellency]

Using a contact angle meter Drop Master (Kyowa Interface Science Co., Ltd.), the cured film on glass was measured for a contact angle with water as an index of water repellency (droplet 24, temperature 25° C., humidity 40%). The results (initial contact angle with water) are shown in Table 1.

At the initial, all the films of Examples and Comparative Examples showed excellent water repellency.

[Evaluation of Abrasion Resistance]

Using a friction tester (Shinto Scientific Co., Ltd.), the cured film on glass was rubbed 3,000 cycles under the conditions shown below. Thereafter, the cured film was similarly measured for a contact angle with water (water repellency) as an index of abrasion resistance. The test environmental conditions included temperature 25° C. and humidity 40%. The results (contact angle with water after abrasion) are shown in Table 1.

Eraser abrasion resistance
Eraser: by Minoan Co.
Contact area: 6 mm diameter
Moving distance (one way): 30 mm
Moving speed: 3,600 mm/min
Load: 1 kg/6 mm diameter The polymers of Examples 1 to 6 are improved in substrate adhesion and wettability due to the presence of polyether groups in the molecule. The cured films of the surface treating agents using the polymers of Examples 1 to 6 maintained a contact angle of more than 100° even after 3,000 cycles of eraser abrasion in contrast to the polymers of Comparative Examples 1 to 3, indicating improved abrasion resistance.

TABLE 1

| | Initial contact angle with water (°) | Contact angle with water after abrasion (°) |
|---|---|---|
| Example 1 | 117 | 110 |
| Example 2 | 117 | 111 |
| Example 3 | 116 | 107 |
| Example 4 | 112 | 103 |
| Example 5 | 114 | 106 |
| Example 6 | 113 | 105 |
| Comparative Example 1 | 115 | 78 |
| Comparative Example 2 | 110 | 93 |
| Comparative Example 3 | 109 | 85 |

The invention claimed is:

1. A fluoropolyether group-containing polymer having a hydrolyzable group and a polyether group, represented by the general formula (1) or (2):

wherein $Rf^1$ is a mono- or divalent fluorooxyalkylene group-containing polymer residue, N is independently a carbon atom, silicon atom, nitrogen atom or a tri- to octavalent organic group which may be substituted with fluorine, V is independently a monovalent group terminated with a hydroxyl or hydrolyzable group, E is independently a monovalent group containing oxyalkylene group, α is 1 or 2, β is an integer of 1 to 6, γ is an integer of 1 to 6, β+γ is an integer of 2 to 7,

wherein $Rf^1$ and α are as defined above, Q is independently a single bond or divalent organic group, G is independently a divalent group having a hydroxyl or hydrolyzable group, E' is independently a divalent group containing oxyalkylene group, G and E' are linearly linked, G and E' may be randomly arranged, B is independently hydrogen, $C_1$-$C_4$ alkyl or halogen group, δ is each independently an integer of 1 to 10, and ε is each independently an integer of 1 to 10.

2. The fluoropolyether group-containing polymer of claim 1, represented by the general formula (3):

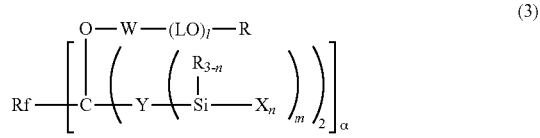

wherein Rf is a mono- or divalent fluorooxyalkylene group-containing polymer residue, Y is independently a di- to hexavalent hydrocarbon group which may contain a silicon atom and/or siloxane bond, W is independently a single bond, siloxane bond or silylene group, L is independently $C_1$-$C_4$ alkylene group, l is an integer of 1 to 20, R is independently $C_1$-$C_4$ alkyl or phenyl group, X is independently a hydroxyl or hydrolyzable group, n is an integer of 1 to 3, m is an integer of 1 to 5, and α is 1 or 2.

3. The fluoropolyether group-containing polymer of claim 2 wherein in formula (3), α is 1, and Rf is a group having the general formula (4):

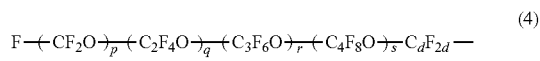

wherein p, q, r and s each are an integer of 0 to 200, p+q+r+s is 3 to 200, each of the repeating units associated with p, q, r and s may be linear or branched, individual repeating units may be randomly bonded, d is an integer of 1 to 3, the unit associated with d may be linear or branched.

4. The fluoropolyether group-containing polymer of claim 2 wherein in formula (3), α is 2, and Rf is a group having the general formula (5):

wherein p, q, r and s each are an integer of 0 to 200, p+q+r+s is 3 to 200, each of the repeating units associated with p, q, r and s may be linear or branched, individual repeating units may be randomly bonded, d is an integer of 1 to 3, the unit associated with d may be linear or branched.

5. The fluoropolyether group-containing polymer of any one of claims 2 to 4 wherein in formula (3), Y is a group selected from the group consisting of a $C_3$-$C_{10}$ alkylene group, an alkylene group containing $C_6$-$C_8$ arylene group, a divalent group having alkylene moieties bonded via a silalkylene structure or silarylene structure, a di- to tetravalent group having a $C_2$-$C_{10}$ alkylene moiety bonded to the valence bond of a di- to tetravalent linear organopolysiloxane residue of 2 to 10 silicon atoms, and a di- to tetravalent group having a $C_2$-$C_{10}$ alkylene moiety bonded to the valence bond of a di- to tetravalent branched or cyclic organopolysiloxane residue of 3 to 10 silicon atoms.

6. The fluoropolyether group-containing polymer of claim 2 wherein in formula (3), W is a group selected from the group consisting of a single bond, a di- to tetravalent linear organopolysiloxane residue of 2 to 10 silicon atoms, a di- to tetravalent branched or cyclic organopolysiloxane residue of 3 to 10 silicon atoms, a linear silalkylene residue of 2 to 10 silicon atoms, and a silarylene residue of 2 to 10 silicon atoms.

7. The fluoropolyether group-containing polymer of claim 2 wherein in formula (3), X is each independently selected from the group consisting of hydroxyl group, $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen group.

8. The fluoropolyether group-containing polymer of claim 2 wherein the polymer having formula (3) is selected from those having the following formulae:
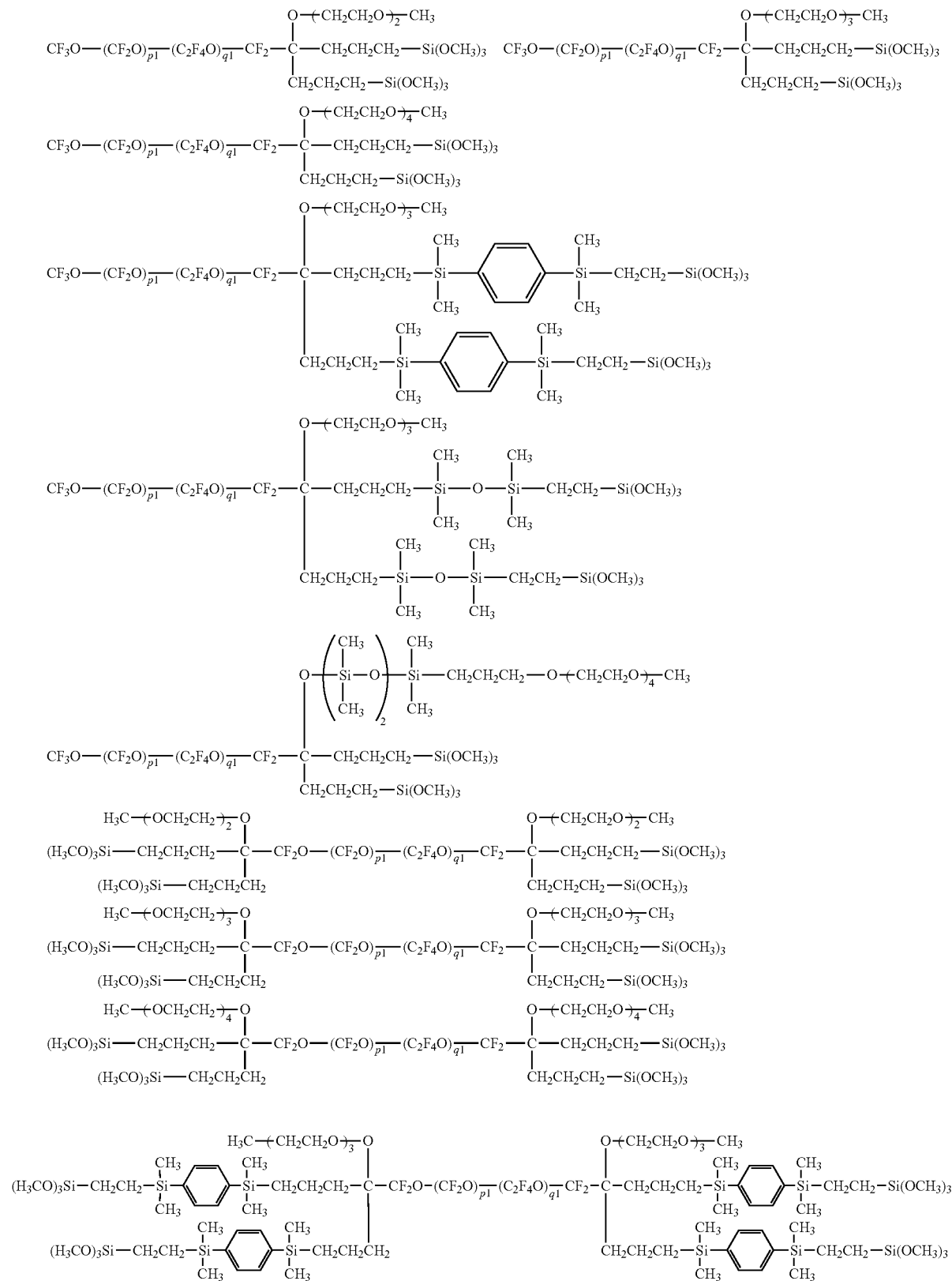

-continued

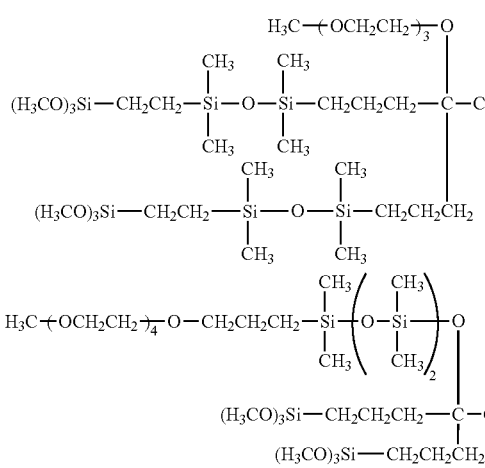
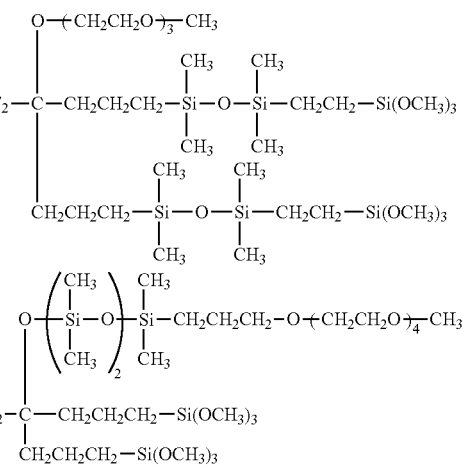

wherein p1 is an integer of 5 to 100, q1 is an integer of 5 to 100, and p1+q1 is an integer of 10 to 105.

9. A surface treating agent comprising a fluoropolyether group-containing polymer having a hydrolyzable group and a polyether group and/or a partial (hydrolytic) condensate thereof, the fluoropolyether group-containing polymer having a hydrolyzable group and a polyether group, represented by the general formula (1) or (2):

$$Rf^1-[N(V)_\beta(E)_\gamma]_\alpha \quad (1)$$

wherein $Rf^1$ is a mono- or divalent fluorooxyalkylene group-containing polymer residue, N is independently a carbon atom, silicon atom, nitrogen atom or a tri- to octavalent organic group which may be substituted with fluorine, V is independently a monovalent group terminated with a hydroxyl or hydrolyzable group, E is independently a monovalent group containing oxyalkylene group, $\alpha$ is 1 or 2, $\beta$ is an integer of 1 to 6, $\gamma$ is an integer of 1 to 6, $\beta+\gamma$ is an integer of 2 to 7, $$Rf^1-[Q-(G)_\delta-(E')_\epsilon-B]_\alpha \quad (2)$$

wherein $Rf^1$ and a are as defined above, Q is independently a single bond or divalent organic group, G is independently a divalent group having a hydroxyl or hydrolyzable group, E' is independently a divalent group containing oxyalkylene group, G and E' are linearly linked, G and E' may be randomly arranged, B is independently hydrogen, $C_1$-$C_4$ alkyl or halogen group, $\delta$ is each independently an integer of 1 to 10, and $\epsilon$ is each independently an integer of 1 to 10.

10. The surface treating agent of claim 9 wherein in the fluoropolyether group-containing polymer having a hydrolyzable group and a polyether group, the polyether group is a group containing a monovalent oxyalkylene group at the end of the molecular chain.

11. The surface treating agent of claim 9 wherein the fluoropolyether group-containing polymer having a hydrolyzable group and a polyether group is a fluoropolyether group-containing polymer represented by the general formula (1) or (2):

$$Rf^1-[N(V)_\beta(E)_\gamma]_\alpha \quad (1)$$

wherein $Rf^1$ is a mono- or divalent fluorooxyalkylene group-containing polymer residue, N is independently a carbon atom, silicon atom, nitrogen atom or a tri- to octavalent organic group which may be substituted with fluorine, V is independently a monovalent group terminated with hydrolyzable group, E is independently a monovalent group containing oxyalkylene group, $\alpha$ is 1 or 2, $\beta$ is an integer of 1 to 6, $\gamma$ is an integer of 1 to 6, $\beta+\gamma$ is an integer of 2 to 7, $$Rf^1-[Q-(G)_\delta-(E')_\epsilon-B]_\alpha \quad (2)$$

wherein $Rf^1$ and $\alpha$ are as defined above, Q is independently a single bond or divalent organic group, G is independently a divalent group having a hydroxyl or hydrolyzable group, E' is independently a divalent group containing oxyalkylene group, G and E' are linearly linked, G and E' may be randomly arranged, B is independently hydrogen, $C_1$-$C_4$ alkyl or halogen group, $\delta$ is each independently an integer of 1 to 10, and $\epsilon$ is each independently an integer of 1 to 10.

12. An article having a surface treated with the surface treating agent of any one of claims 9 to 11.

* * * * *